(12) United States Patent
Minemoto et al.

(10) Patent No.: US 6,188,569 B1
(45) Date of Patent: Feb. 13, 2001

(54) INFORMATION PROCESSING APPARATUS

(75) Inventors: Takeshi Minemoto, Sagamihara; Atsuhiko Urushihara, Kokubunji; Takeshi Hoshino, Kodaira; Taisuke Kashima, Urawa; Satoshi Hamazaki, Fujisawa; Masaaki Hiramatsu, Ebina, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/019,177

(22) Filed: Feb. 5, 1998

(30) Foreign Application Priority Data

Feb. 7, 1997 (JP) .................................................... 9-025276

(51) Int. Cl.[7] .............................. G06F 1/16; H05K 7/16; A47B 81/00
(52) U.S. Cl. ......................... 361/683; 361/681; 361/685; 312/223.2; 312/265.6; D14/107; D14/113; D14/114
(58) Field of Search ..................... 361/680–683, 361/685; 364/708.1; D14/107, 113, 114; 312/223.3, 265.6; 395/750.05

(56) References Cited

U.S. PATENT DOCUMENTS

| | | | |
|---|---|---|---|
| 4,617,640 | * | 10/1986 | Kishi et al. .................... 364/708.1 |
| 4,882,684 | * | 11/1989 | Ishigami et al. ................ 364/708.1 |
| 4,883,376 | * | 11/1989 | Iwase et al. .................... 634/708.1 |
| 5,021,922 | * | 6/1991 | Davis et al. .................... 361/680 |
| 5,247,428 | * | 9/1993 | Yu ................................. 361/683 |
| 5,452,950 | * | 9/1995 | Crenshaw et al. .............. 361/681 |
| 5,546,270 | * | 8/1996 | Konno et al. ................... 361/681 |
| 5,683,156 | * | 11/1997 | Chen et al. ..................... 361/683 |
| 5,752,049 | * | 5/1998 | Lee ............................... 364/708.1 |
| 5,815,369 | * | 9/1998 | Quesada ......................... 361/682 |
| 5,941,493 | * | 8/1999 | Cheng ............................ 361/681 |
| 5,978,211 | * | 11/1999 | Hong ............................. 361/683 |

FOREIGN PATENT DOCUMENTS

3935042 C1 * 3/1991 (DE) .

* cited by examiner

*Primary Examiner*—Leo P. Picard
*Assistant Examiner*—Lisa Lea-Edmonds
(74) *Attorney, Agent, or Firm*—Antonelli, Terry, Stout & Kraus, LLP

(57) ABSTRACT

Provided is an information processing apparatus in which a whole information processing apparatus system including a display device is compacted by making full use of thin and light characteristics of a liquid crystal display device, whereby space efficiency is improved and an ease of use is also acquired.

19 Claims, 40 Drawing Sheets

INFORMATION PROCESSING APPARATUS

BACKGROUND OF THE INVENTION

The present invention relates to an information processing apparatus, and more specifically to an information processing apparatus having a liquid crystal display device as a display device.

Since the liquid crystal display device is thinner and lighter than a CRT display device, it is mounted in a book type personal computer and a portable type computer such as a portable terminal and it widely spreads. The liquid crystal display device mounted in such a portable type computer has a relatively small screen.

On the other hand, due to recent advances in a manufacturing technique, the liquid crystal display device of a relatively large screen starts to spread. The information processing apparatus also starts a partial adoption of the large-screen liquid crystal display device. In the same manner as the conventional CRT display device, the liquid crystal display device is separated from an apparatus body so that a single liquid crystal display device may be commercialized.

As also disclosed in JP-A-6-250757, the liquid crystal display device is movably disposed on a front surface of a body apparatus through a tilting device.

As described above, when the liquid crystal display device is used separately from the apparatus body, the liquid crystal display device and the apparatus body can be advantageously installed in different places. However, space efficiency is disadvantageously low in a general view of an information processing apparatus system including the display device. Furthermore, when the liquid crystal display device is movably disposed on the body apparatus, although the body apparatus can be stably installed on an installing surface, it is not possible to make full use of characteristics of the liquid crystal display device, that is, thinness.

SUMMARY OF THE INVENTION

It is an object of the present invention to provide an information processing apparatus in which a whole information processing apparatus system including a display device is compacted by making full use of thin and light characteristics of a liquid crystal display device, whereby space efficiency is improved and an ease of use is also acquired.

In order to achieve the above object, in accordance with the present invention, there is provided an information processing apparatus comprising a body casing having a length in a depth direction shorter than a length in a height direction and a length in a transverse direction a disk drive device having a disk insert slot on a front surface, having a disk drive casing whose length in the height direction is shorter than a transverse width and a depth, and having a disk memory reading mechanism in the disk drive casing, and a liquid crystal display having the length in the depth direction shorter than the length in the height direction and the transverse width, wherein the disk insert slot is located on a front surface side of the body casing on a lower portion of the body casing, and the disk drive device is arranged so that the depth direction of the disk drive casing may be directed in the depth direction of the body casing, the liquid crystal display is vertically arranged in the body casing so that the front surface of the liquid crystal display may be located over the disk drive device and on the front surface side of the body casing.

DETAILED DESCRIPTION OF THE PREFERRED EMBODIMENTS

Embodiments of the present invention will be described below with reference to the accompanying drawings.

FIGS. 1–18 show an information processing apparatus according to a first embodiment of the present invention.

Figure 1:
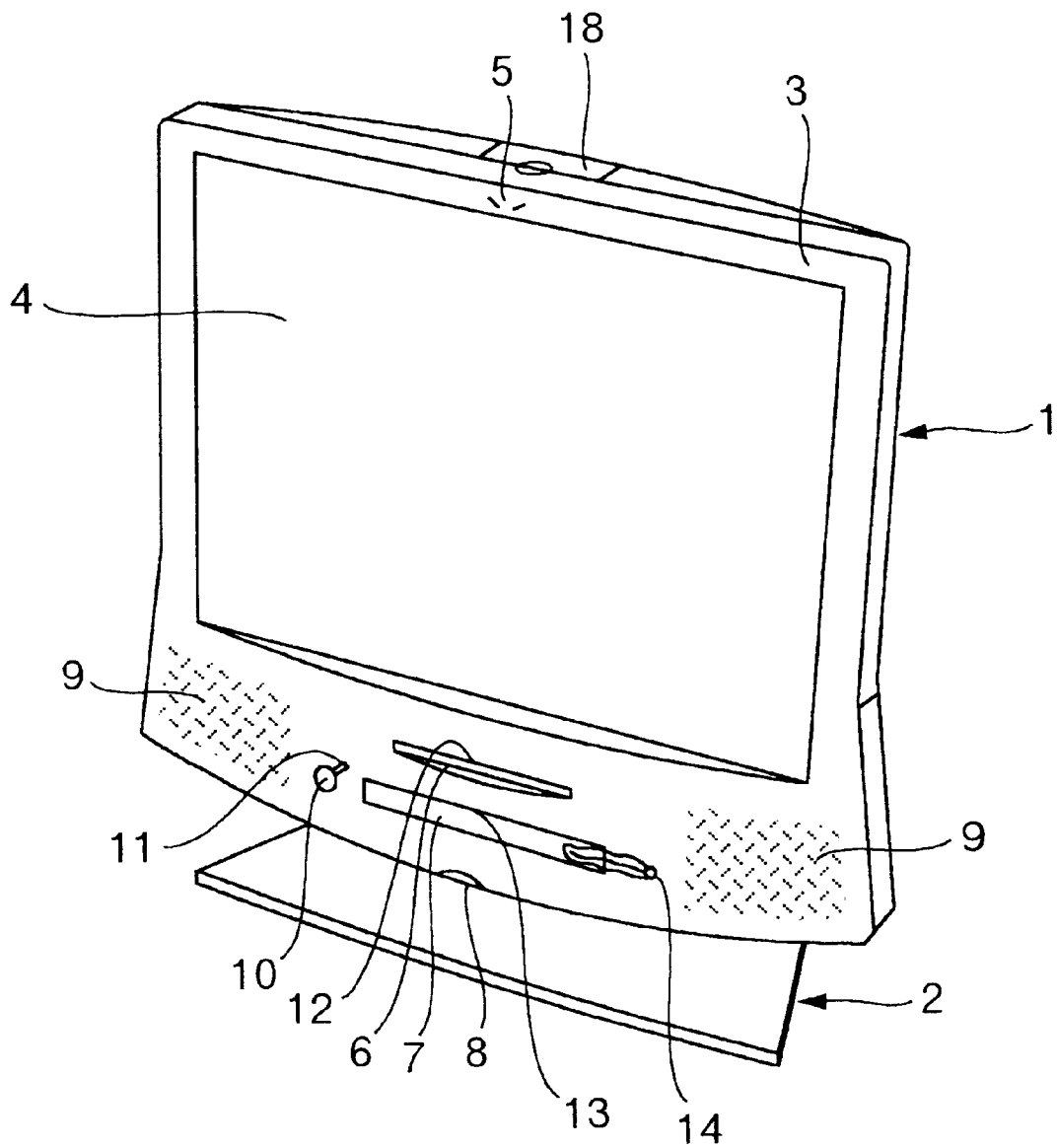
FIG. 1 is a perspective view of an information processing apparatus according to a first embodiment of the present invention seen from a front elevational side.
Figure 2:
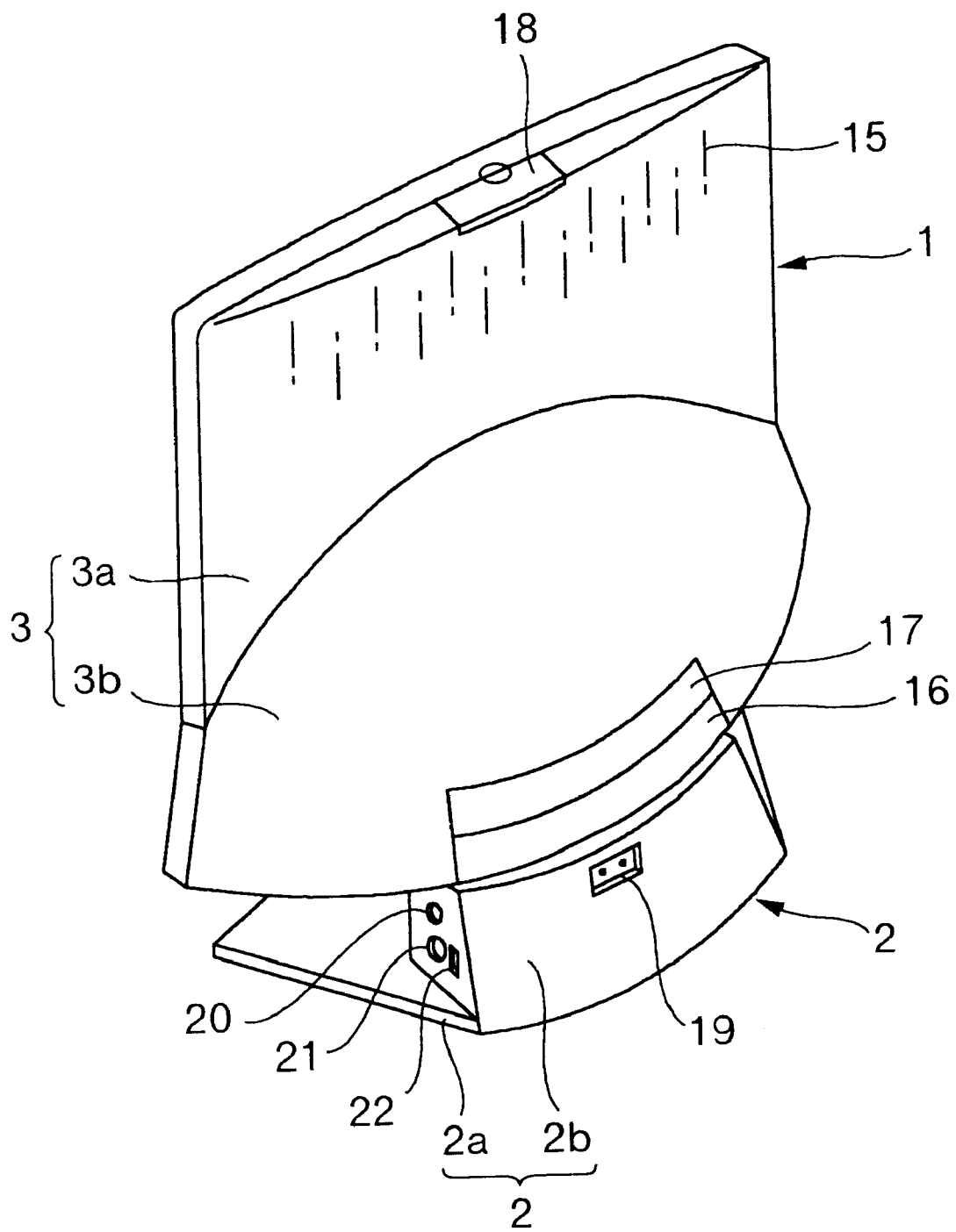
FIG. 2 is a perspective view of the information processing apparatus according to the first embodiment of the present invention seen from a back side.

FIG. 1 is a perspective view of the information processing apparatus of the first embodiment seen from a front elevational side. FIG. 2 is a perspective view of the information processing apparatus of the first embodiment seen from a back side.

In FIGS. 1 and 2, numeral 1 denotes a body portion. Numeral 2 denotes a stand portion for supporting the body portion 1. Numeral 3 denotes a casing constituting an outer box of the body portion 1.

As shown in FIG. 1, a liquid crystal display device 4 is arranged on a front surface side of the body portion 1. A microphone 5 is arranged at the center of an upper side of the liquid crystal display device 4. At the center of a lower side of the liquid crystal display device 4, a disk eject/insert slot 6 for a floppy disk drive incorporated in the body portion 1 is horizontally arranged. On the lower side of this disk eject/insert slot 6, a disk eject/insert slot 7 for a CD-ROM drive incorporated in the body portion 1 is horizontally arranged. On the lower side of this disk eject/insert slot 7 (at the center of a front lowest end of the casing 3), arranged is an infrared optical communication transmitting/receiving portion 8 for transmitting/receiving information to/from an external equipment by wireless and for inputting an instruction to a computer. The computer can be operated even when a keyboard and a mouse are not connected thereto. This infrared optical communication transmitting/receiving portion 8 may be an infrared light receiving portion for a reception only. Speakers 9, 9 are arranged on the right and left sides of the above-described two disk eject/insert slots 6 and 7, respectively. A stereo sound can be output from the speakers 9, 9.

In FIG. 1, numeral 10 denotes a power source button. Numeral 11 denotes a power source standby LED. Numeral 12 denotes a floppy disk access LED. Numeral 13 denotes a CD-ROM access LED. Numeral 14 denotes a CD-ROM eject button (in this embodiment, the floppy disk drive is an auto-slot-in/auto-eject type and is not provided with a floppy disk eject button).

As can be apparent from FIG. 2 seen from a back side, the casing 3 of the body portion 1 whose front surface is generally flat comprises an upper casing 3a and a lower casing 3b. The upper casing 3a has a little thicker rear surface at the center and is a thin box in shape. The lower casing 3b has a generally half-coned surface so that the sectional plane surface area thereof may be gradually reduced upward on the rear surface thereof. On an upper portion on the rear surface of the upper casing 3a, a plurality of radiating holes 15 are bored. On a lowest portion on the rear surface of the lower casing 3b, arranged is an openable/closable and removable cover 16 for covering a connector portion to be connected to the external equipment. On the upper side of this cover 16, arranged is an openable/closable and removable cover 17 covering an expansion board slot portion for attaching an expansion board therein.

On an upper surface of the casing 3 (on the upper surface of the upper casing 3a), as shown in FIGS. 1 and 2, arranged is an openable/closable and removable card slot cover 18 covering a card slot portion for attaching an IC card or the like therein and a USB connector (or an IEEE1394 connector).

As shown in FIG. 2, the stand portion 2 comprises a flat base portion 2a and a holding stand portion 2b. The flat base portion 2a has a predetermined area for stably supporting a total weight of the computer. The holding stand portion 2b vertically stands so that it may be integrally connected to the flat base portion 2a in a back portion (an inside) on the flat base portion 2a. On the rear surface of the holding stand portion 2b, a power source cord receptacle 19 is disposed. On a side surface of the holding stand portion 2b, a mouse connector 20, a keyboard connector 21 and a USB connector 22 are disposed.

Figure 3:
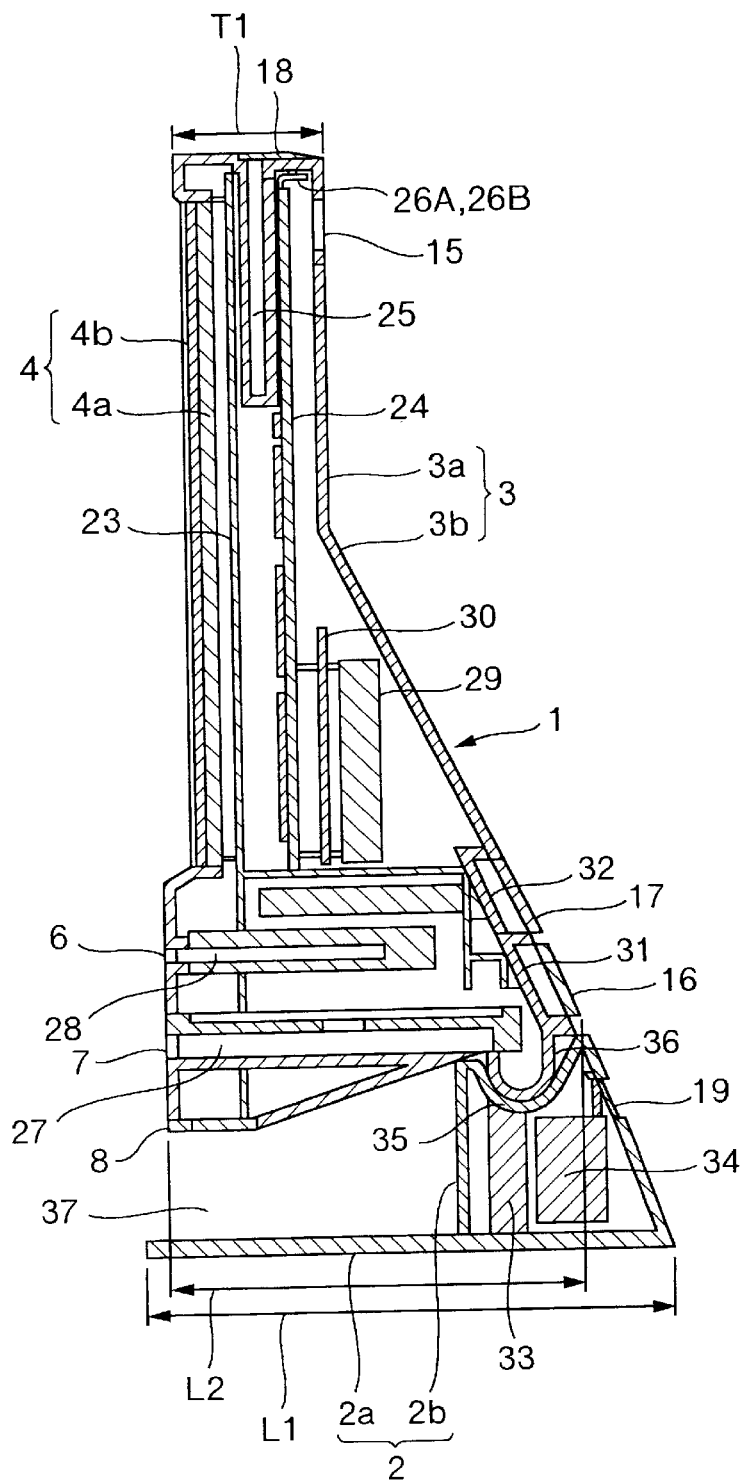
FIG. 3 is a center cross sectional view of the information processing apparatus according to the first embodiment of the present invention.

FIG. 3 is a center cross sectional view of the information processing apparatus according to the first embodiment.

As shown in FIG. 3, the liquid crystal display device 4 (a liquid crystal display element 4a and a liquid crystal protective glass 4b) is arranged on the front surface of the casing 3. On the rear surface side of the liquid crystal display device 4, a main chassis 23 is arranged in parallel and adjacent to the liquid crystal display device 4. On the back side of this main chassis 23, a main substrate 24, in which a main function of the computer is packaged, is arranged in parallel and adjacent to the main chassis 23. A card slot portion 25 for inserting the IC card or the like therein is also disposed on the upper portion between the main chassis 23 and the main substrate 24. USB connectors (or IEEE1394 connectors) 26A, 26B are disposed on the upper portion of the main substrate 24.

The liquid crystal display device 4 and the main substrate 24 are arranged in parallel to each other in such a manner, whereby a depth dimension of the whole apparatus can be reduced, compared to a conventional horizontal arrangement of the main substrate. More specifically, in this embodiment, a thickness dimension (depth dimension) T1 of the upper casing 3a can be thinned as much as possible. The weight of the upper casing 3a can be also lightened. Therefore, since the upper portion is lighter with respect to the whole apparatus, the whole apparatus can be easily constructed so that it may be dynamically stable.

On the lower side in the lower casing 3b, a CD-ROM drive 27 is transversely arranged (horizontally arranged). A CD-ROM can be inserted into the CD-ROM drive 27 from the disk eject/insert slot 7. On the upper side of the CD-ROM drive 27, a floppy disk drive 28 is transversely arranged. A floppy disk can be inserted into the floppy disk drive 28 from the disk eject/insert slot 6. On the upper side of the floppy disk drive 28, a hard disk drive 29 is vertically arranged. When necessary, an expansion substrate 30 is arranged between the hard disk drive 29 and the main substrate 24 so that it may be located in parallel to the main substrate 24. The CD-ROM drive 27, the floppy disk drive 28, the hard disk drive 29 and the expansion substrate 30 are arranged as described above so that they may be housed in the lower casing 3b. Numeral 31 denotes the connector portion covered with the cover 16. Numeral 32 denotes the expansion board slot portion covered with the cover 17.

In such a manner, the CD-ROM drive 27 larger than the floppy disk drive 28 is horizontally arranged 25 on the lower side in the lower casing 3b. The floppy disk drive 28 smaller than the CD-ROM drive 27 is horizontally arranged on the CD-ROM drive 27. The large-capacity hard disk drive 29 as an internal disk drive is vertically arranged on the floppy disk drive 28. Thus, as described above, the disk drives 27, 28 and 29 can be efficiently housed in the lower casing 3b which has the generally half-coned surface so that the sectional plane surface area thereof may be gradually reduced upward on the rear surface thereof. The apparatus can be also dynamically balanced. Furthermore, a maximum depth dimension L2 of the lower casing 3b can be set to such a small value that it is a little larger than the depth dimension of the CD-ROM drive 27.

The horizontally arranged CD-ROM drive 27 and floppy disk drive 28 are arranged adjacent to each other and at two vertical stages. Thus, a height of the whole apparatus can be also suppressed without expanding a horizontal dimension of the whole apparatus. Moreover, the drive for the small-sized disk is arranged on the upper portion, and the drive for the large-sized disk is arranged on the lower portion. Therefore, the apparatus can be constructed so that it may have excellent handling properties without difficulty in handling during an insertion/removal of the disk.

The rear surface of the holding stand portion 2b of the stand portion 2 is a generally partially coned surface in shape so that the sectional plane surface area thereof may be gradually reduced upward. The rear surface is also the generally partially coned surface in shape so that it may be connected to the rear surface of the lower casing 3b. In the stand portion 2b, a hinge base 33 and a power source unit 34 are disposed. The power source unit 34 is connected to an electric system in the casing 3 by appropriate connecting means so that it can supply a power to each portion in the casing 3.

The upper surface of the holding stand portion 2b and the deeper bottom surface of the casing 3 (the lower casing 3b) are connected to each other by hinge portions 35, 36. In this embodiment, the casing 3 (the body portion 1) can be tilted (oscillated backward and forward) and be swung (oscillated leftward and rightward) with respect to the holding stand portion 2b of the stand portion 2. The hinge portions 35, 36 can be replaced by a universal joint means so that the casing 3 (the body portion 1) can be freely rotated.

A housing space 37 is also provided between the flat base portion 2a of the stand portion 2 and the bottom surface of the casing 3 (the lower casing 3b). A keyboard device can be housed in this housing space 37 (described below).

A maximum depth dimension L1 of the stand portion 2 is also the maximum depth dimension of the whole apparatus. In this embodiment, L1 is set to L1=180 mm. The whole apparatus is thus relatively thin, whereby the apparatus has excellent installation space properties in a depth direction.

Figure 4:
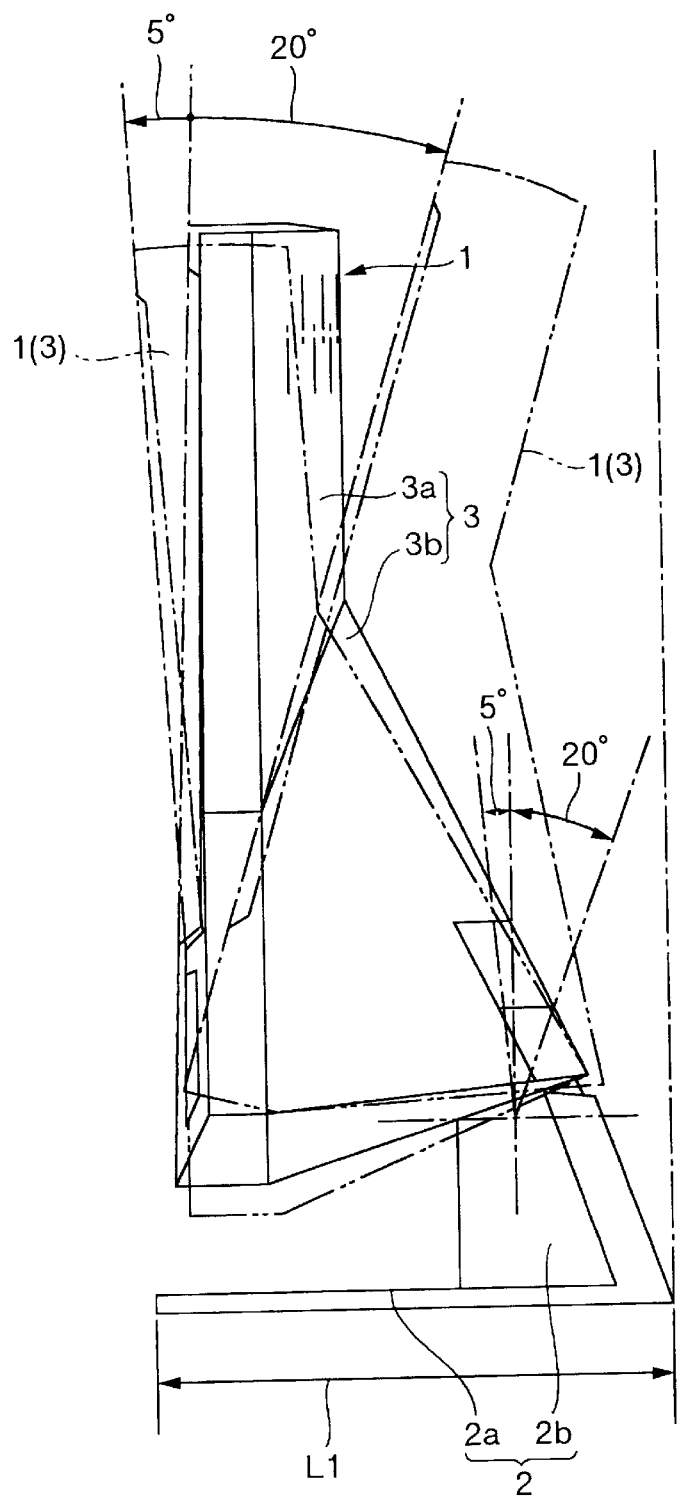
FIG. 4 is an illustration showing a tilt operation of the information processing apparatus according to the first embodiment of the present invention.

FIG. 4 is an illustration showing a tilt operation of the information processing apparatus of this embodiment.

In this embodiment, the body portion 1 (the casing 3) can be angularly adjusted backward and forward within a range from 5° forward to 20° backward with respect to the stand portion 2. Even when the body portion 1 (the casing 3) is tilted backward at maximum 20°, it is positioned with allowance more forward than the most back position of the stand portion 2 which is the most back position of the whole apparatus. That is, the maximum depth dimension L1 of the whole apparatus is arranged so that it may be constant regardless of a tilt position of the body portion 1.

Figure 5:
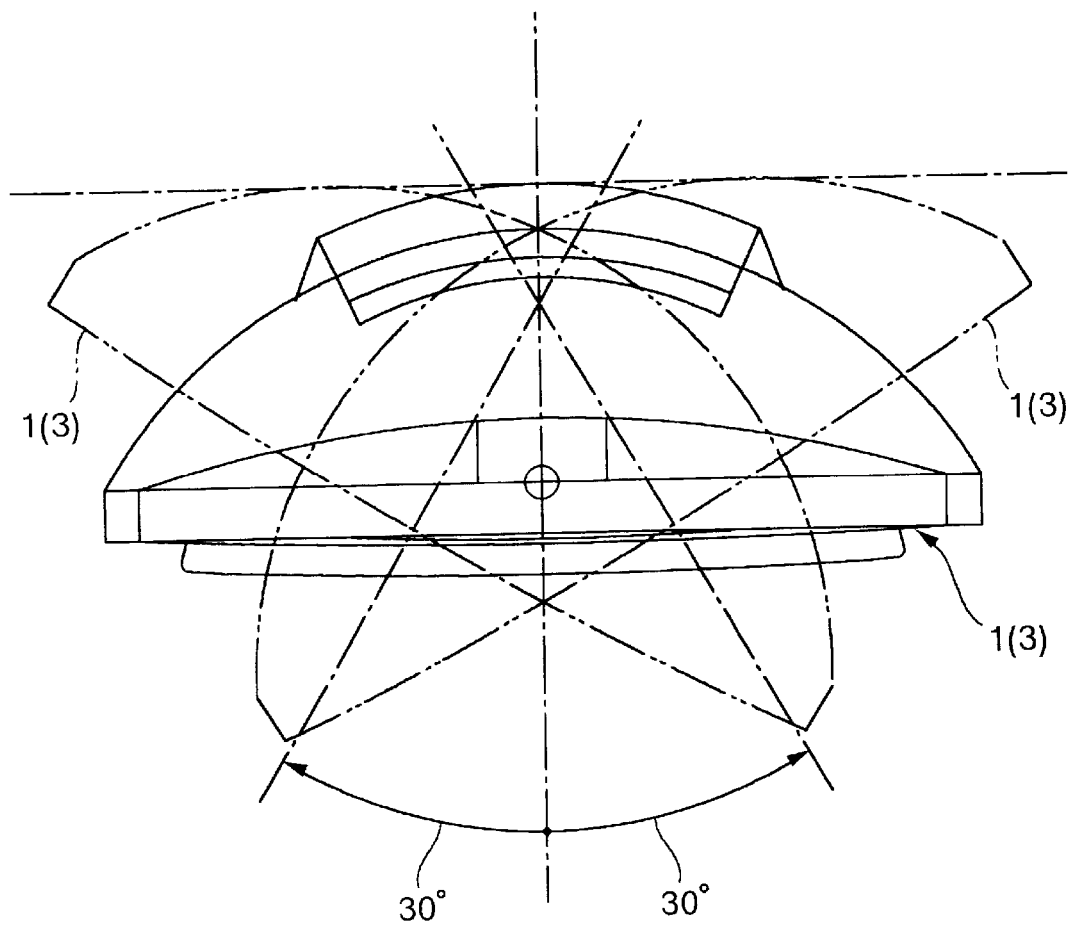
FIG. 5 is an illustration showing a swing operation of the information processing apparatus according to the first embodiment of the present invention.

FIG. 5 is an illustration showing a swing operation of the information processing apparatus of this embodiment.

In this embodiment, the body portion 1 (the casing 3) can be angularly adjusted leftward and rightward within the range of 30° each leftward and rightward with respect to the stand portion 2. Even when the body portion 1 (the casing 3) is swung at maximum 30° rightward or leftward, it is arranged so that it may be positioned at the position equal to the most back position of the stand portion 2 which is the most back position of the whole apparatus.

That is, in this embodiment, even when the apparatus is located so that the most back position thereof may be in contact with a wall or the like (it is located so that the most excellent installation space properties may be obtained in the depth direction), attention is paid in such a manner the tilt operation and the swing operation are not prevented.

Figure 6:
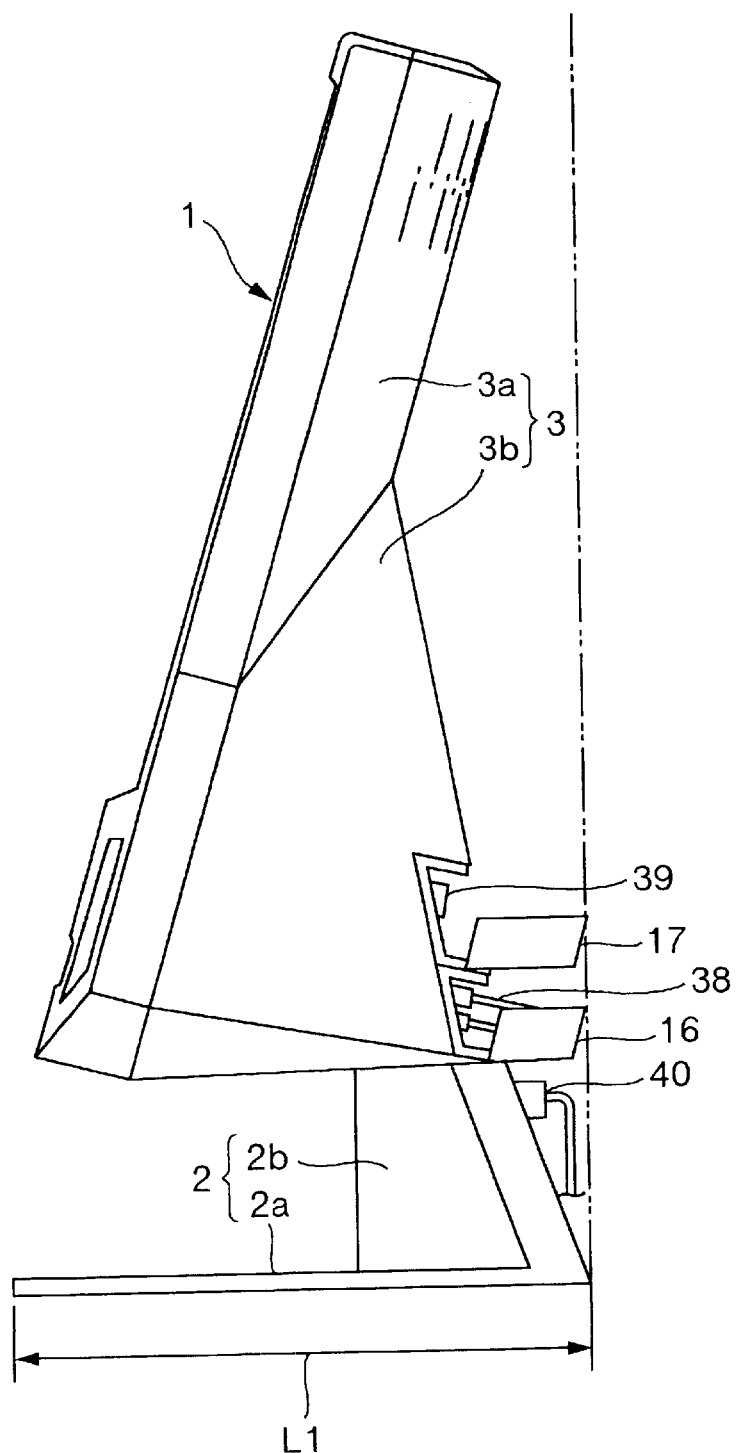
FIG. 6 is an illustration showing a body portion which is rearwardly tilted at a maximum angle when covers positioned on a lower side of a rear surface of a casing are opened in the information processing apparatus according to the first embodiment of the present invention.

FIG. 6 is an illustration showing the body portion 1 (the casing 3) which is rearwardly tilted at maximum 2° when the covers 16, 17 positioned on the lower side of the rear surface of the casing 3 (the lower casing 3b) are opened in the information processing apparatus of this embodiment.

As shown in FIG. 6, in this embodiment, even when the above-mentioned covers 16, 17 are horizontally opened and the body portion 1 (the casing 3) is rearwardly tilted at maximum 20°, the covers 16, 17 are arranged so that they may be positioned at the position equal to the most back position of the stand portion 2 which is the most back position of the whole apparatus. Thus, even when the apparatus is located so that the most back position thereof may be in contact with the wall or the like (it is located so that the most excellent installation space properties may be obtained in the depth direction), the covers 16, 17 are opened whereby a connector 38 from the external equipment can be connected to the connector portion 31 or an expansion board 39 can be attached to the expansion board slot 32. In this point of view, the installation space properties is also excellent in the depth direction. In FIG. 6, numeral 40 denotes a power source cord. Needless to say, a connecting point of this power source cord 40 is also arranged so that it may be positioned more forward than the most back position of the stand portion 2 which is the most back position of the whole apparatus.

As described above, even when the apparatus is located so that the most back position thereof may be in contact with the wall or the like (it is located so that the most excellent installation space properties may be obtained in the depth direction), the tilt operation can be performed. When the covers 16, 17 on the rear surface of the body portion 1 (the casing 3) are opened, the apparatus can be used for the following reason. That is, the upper casing 3a positioned on a front upper portion of the body portion 1 (the casing 3) is the thin box in shape, and the rear surface of the lower casing 3b is the generally half-coned surface in shape so that the sectional plane surface area thereof may be gradually reduced upward.

Figure 7:
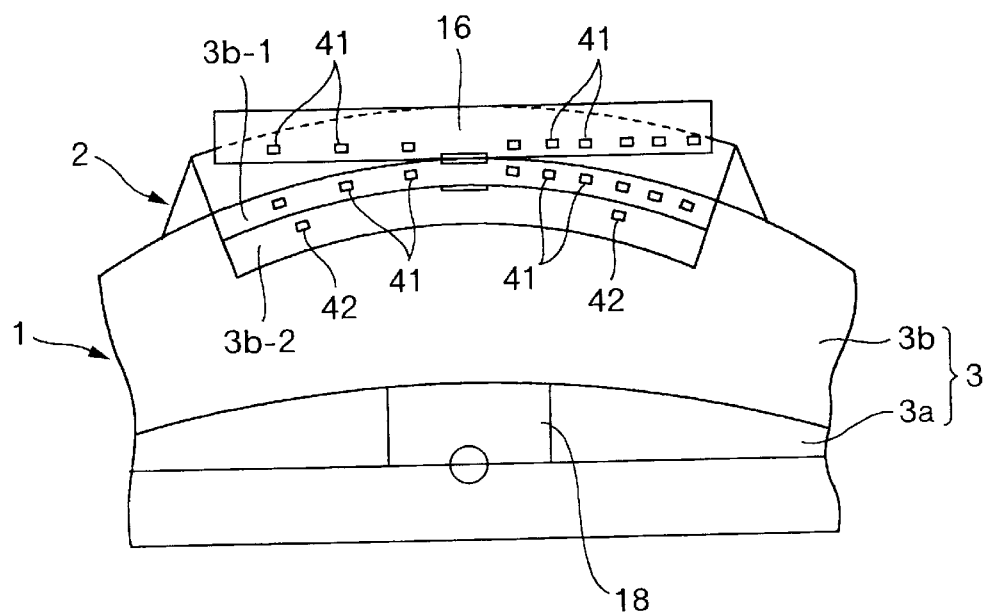
FIG. 7 is a partial plan view when an upper cover and a lower cover of two covers located on the rear surface of the casing are removed and opened, respectively, in the information processing apparatus according to the first embodiment of the present invention.
Figure 8:
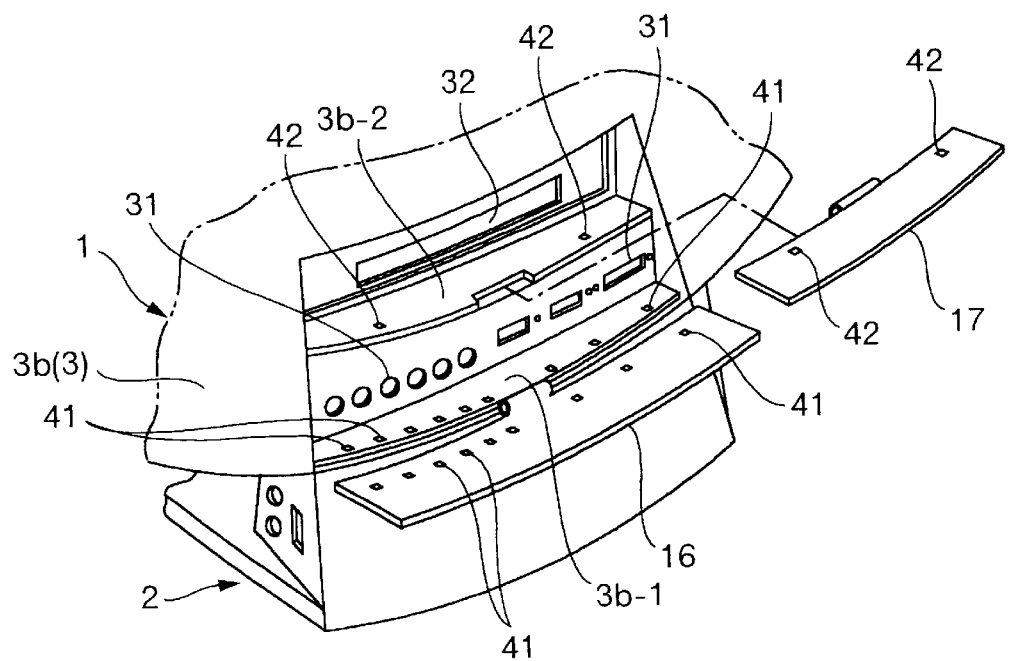
FIG. 8 is a partial perspective view when the upper cover and the lower cover of the two covers located on the rear surface of the casing are removed and opened, respectively, in the information processing apparatus according to the first embodiment of the present invention.

FIG. 7 is a partial plan view when the upper cover 17 and the lower cover 16 of the two covers 16, 17 located on the rear surface of the casing 3 (the lower casing 3b ) are removed and opened, respectively, in the information processing apparatus of this embodiment. FIG. 8 is a partial perspective view when the upper cover 17 and the lower cover 16 of the two covers 16, 17 located on the rear surface of the casing 3 (the lower casing 3b) are removed and opened, respectively, in the information processing apparatus of this embodiment.

As shown in FIGS. 7 and 8, when the two covers 16, 17 located on the rear surface of the lower casing 3b are opened, they are arranged so that the rear surfaces thereof may be turned upward (the opened cover 17 not shown). The covers 16, 17 are arranged so that they can be removed (the removed cover 16 not shown). On the rear surface of the cover 16, marked are characters or symbols 41 as to various connector terminals of the connector portion 31. On the rear surface of the cover 17, marked are characters or symbols 42 as to the expansion board slot 32. The apparatus is seen from the upper side, whereby these characters or symbols can be visibly recognized (the type and position of the connecting portion can be identified).

The characters or symbols 41 as to various connector terminals of the connector portion 31 are marked on a horizontal surface 3b-1 of the lower casing 3b which is exposed when the cover 16 is opened or removed. The characters or symbols 42 as to the expansion board slot 32 are marked on a horizontal surface 3b-2 of the lower casing 3b which is exposed when the cover 17 is opened or removed. The apparatus is seen from the upper side, whereby these characters or symbols can be visibly recognized (the type and position of the connecting portion can be identified).

More specifically, as shown in FIGS. 7 and 8, when the upper cover 17 is removed and the lower cover 16 is opened, the characters or symbols 42 on the horizontal surface 3b-2 and the characters or symbols 41 on the rear surface of the cover 16 and on the horizontal surface 3b-1 can be visibly recognized from the upper side. Thus, the ease of use is acquired.

As various connector terminals of the connector portion 31, optional types of terminals can be disposed within an allowable range of a space factor. For example, the terminals for an image signal, an audio signal, a telephone/LAN or the like can be appropriately disposed as required.

Figure 9:
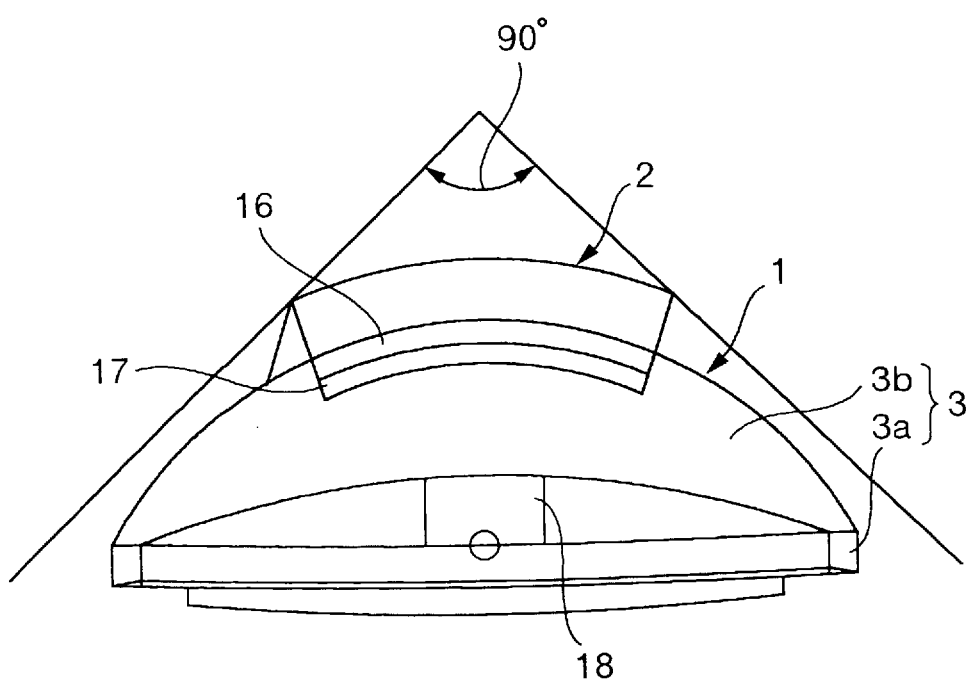
FIG. 9 is an illustration seen from an upper side showing the information processing apparatus according to the first embodiment of the present invention located at a 90° corner.

FIG. 9 is an illustration seen from the upper side showing the information processing apparatus of this embodiment located at a 90° corner.

The apparatus (computer apparatus) of this embodiment has the aforementioned-shaped rear surface. Thus, as shown in FIG. 9, the whole apparatus is generally fan-shaped seen from the upper surface. The whole apparatus can be pushed into the 90° corner as much as possible so that both sides of the back side of the whole apparatus may be substantially located along wall surfaces at the 90° corner. Therefore, the apparatus has excellent locatable properties at the 90° corner.

Figure 10:
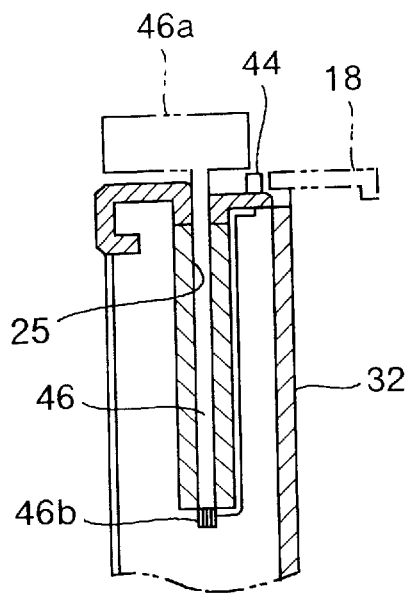
FIG. 10 is a cross sectional view when a card slot cover on the upper surface of the casing of the information processing apparatus according to the first embodiment of the present invention is opened and an IC card with a camera portion is attached into a card slot.
Figure 11:
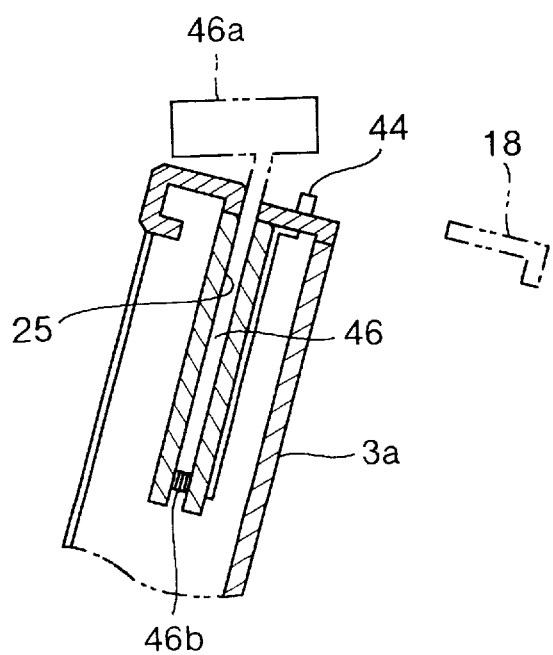
FIG. 11 is a cross sectional view when the card slot cover on the upper surface of the casing of the information processing apparatus according to the first embodiment of the present invention is removed, the IC card with the camera portion is attached into the card slot and the body portion is rearwardly tilted.
Figure 12:
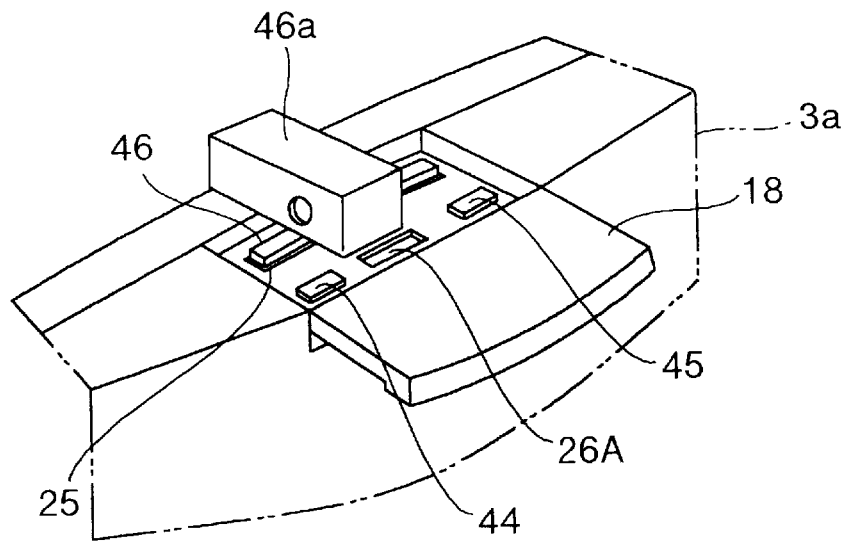
FIG. 12 is a partial perspective view corresponding to a state shown in FIG. 10.
Figure 13:
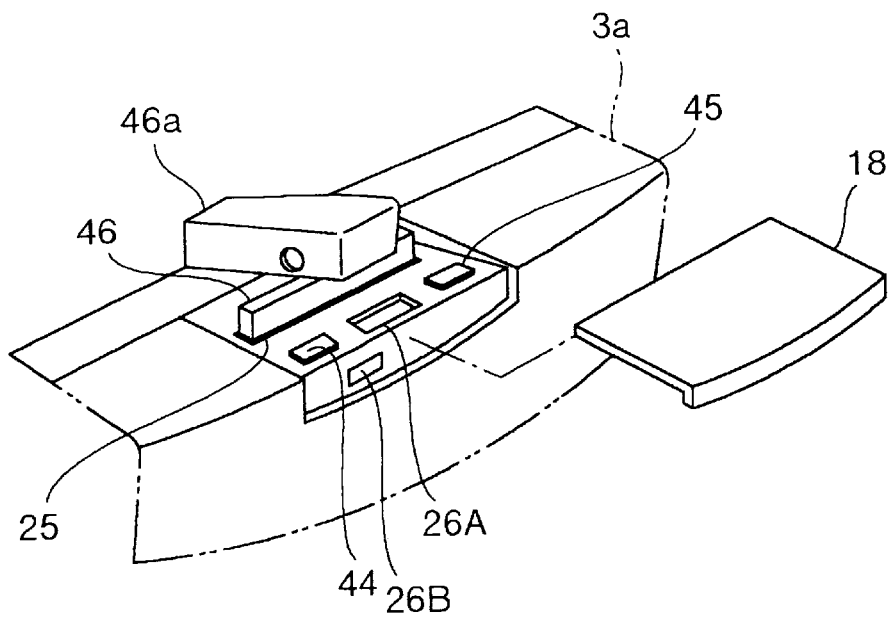
FIG. 13 is a partial perspective view corresponding to the state shown in FIG. 11.

FIG. 10 is a cross sectional view when the card slot cover 18 on the upper surface of the casing 3 (the upper casing 3a) of the information processing apparatus of this embodiment is opened and the IC card with a camera portion is attached into card slot portion 25. FIG. 11 is a cross sectional view when the card slot cover 18 on the upper surface of the casing 3 (the upper casing 3a) of the information processing apparatus of this embodiment is removed, the IC card with the camera portion is attached into the card slot portion 25 and the body portion 1 is rearwardly tilted. FIG. 12 is a partial perspective view corresponding to a state shown in FIG. 10. FIG. 13 is a partial perspective view corresponding to the state shown in FIG. 11.

As shown in FIGS. 10 and 12, the card slot cover 18 on the upper surface of the upper casing 3a is slid, whereby it takes an open position. Furthermore, as shown in FIGS. 11 and 13, the cover 18 can be removed from the open position. When the cover 18 is opened, the card slot portion 25, a button 44 for vertically moving the card, a button 45 for removing the card and the USB connector (or IEEE1394 connector) 26A are exposed. When the cover 18 is removed, the USB connector (or IEEE1394 connector) 26B is exposed.

When the cover 18 is opened or removed, various IC cards can be inserted into the card slot portion 25. In this example shown in FIGS. 10–13, an IC card 46 with a camera portion 46a is inserted into the card slot portion 25. A main image processing is performed by the computer or the like such as this embodiment, whereby such an IC card 46 with the camera portion 46a seems to be accomplishable in the near future. By the use of this IC card 46 with the camera portion 46a, a self-portrait of an operator or the like can be picked up. Since the IC card 46 is thus applied to a television telephone or the like, it is very useful.

On the other hand, when the IC card 46 with the camera portion 46a is inserted into the card slot portion 25 from the upper surface of the upper casing 3a, when the body portion 1 (the casing 3) is tilted as described above, an angular adjustment of the camera portion 46a is required. Therefore, in this example, the camera portion 46a of the IC card 46 is arranged so that it may be tiltable with respect to the IC card 46. When the camera portion 46a of the IC card 46 is thus arranged so that it may be tiltable, the IC card 46 must be vertically moved in accordance with the tilt position of the camera portion 46a. This vertical movement is accomplished by means of an appropriate mechanism by operating the button 44 for vertically moving the card. The vertical movement of the IC card 46 allows a contact portion 46b of the IC card 46 to be also vertically moved. Thus, the contact portion of the card slot portion 25 is vertically moved by means of the appropriate mechanism in accordance with the operation of the button 44 for vertically moving the card. The card slot portion 25 and the IC card 46 may be integrally moved to a vertical direction.

When the IC card 46 with the camera portion 46a is inserted into the card slot portion 25 from the upper surface of the upper casing 3a, such an arrangement allows the camera portion 46a to be angularly adjusted in accordance with a tilt angle of the body portion 1 (the casing 3), whereby the ease of use is improved.

Figure 14:
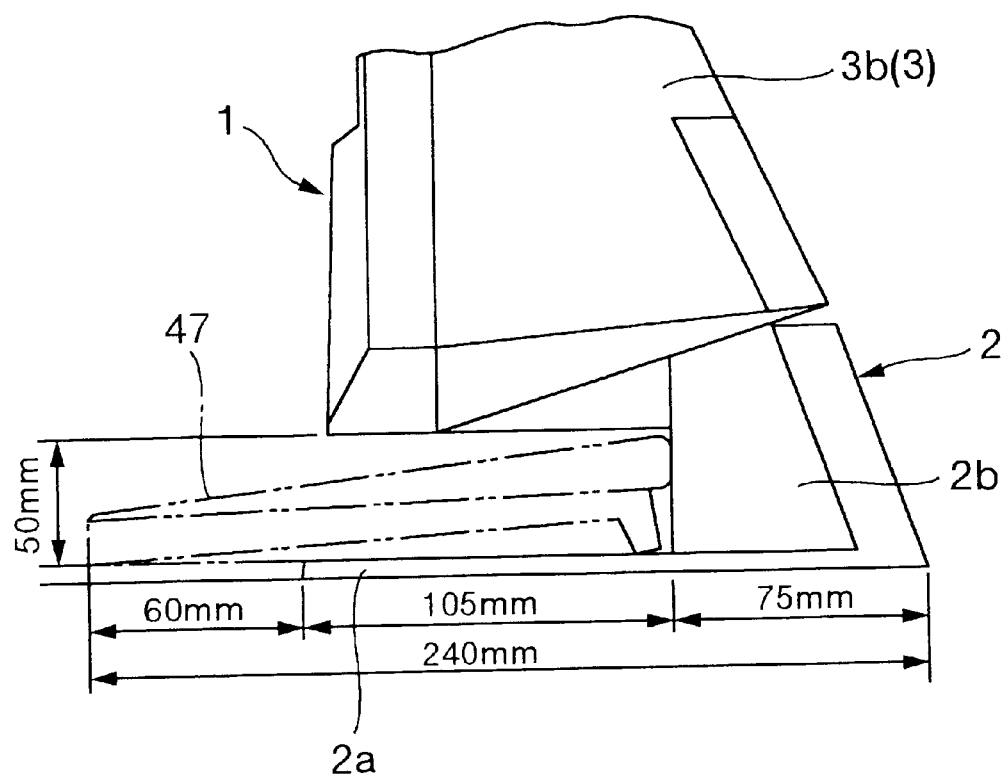
FIG. 14 is an illustration when a general-purpose keyboard device is housed in a housing space between a flat base portion of a stand portion and a bottom surface of the casing in the information processing apparatus according to the first embodiment of the present invention.
Figure 15:
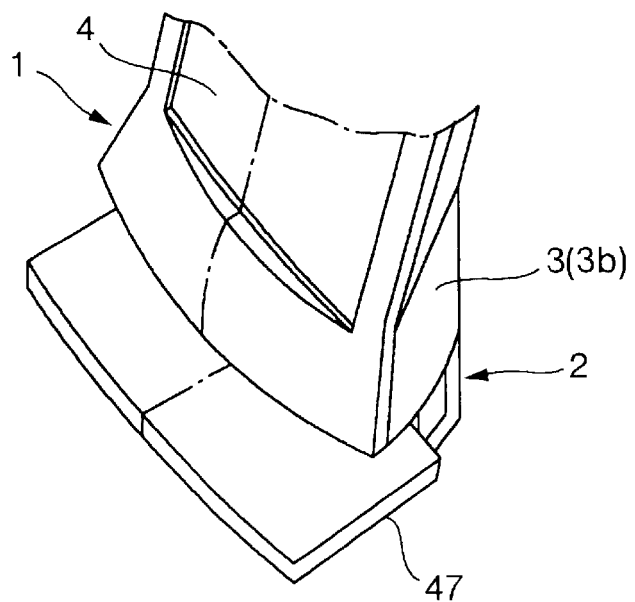
FIG. 15 is a partial perspective view corresponding to FIG. 14.
Figure 16:
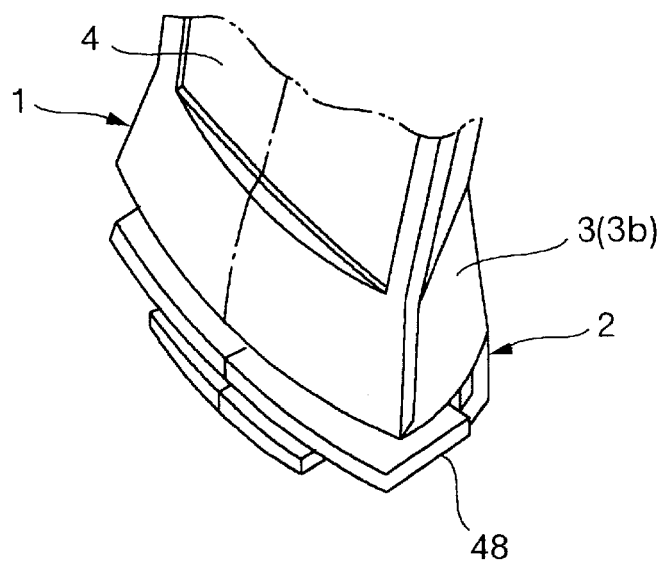
FIG. 16 is a partial perspective view when an exclusive small-sized keyboard device is housed in the housing space between the flat base portion of the stand portion and the bottom surface of the casing in the information processing apparatus according to the first embodiment of the present invention.

FIG. 14 is an illustration when a general-purpose keyboard device is housed in the housing space 37 between the flat base portion 2a of the stand portion 2 and the bottom surface of the casing 3 (the lower casing 3b) in the information processing apparatus of this embodiment. FIG. 15 is a partial perspective view corresponding to FIG. 14. FIG. 16 is an illustration when an exclusive small-sized keyboard device is housed in the housing space 37 between the flat base portion 2a of the stand portion 2 and the bottom surface of the casing 3 (the lower casing 3b) in the information processing apparatus of this embodiment.

A general-purpose keyboard device 47 and an exclusive small-sized keyboard device 48 can be housed in the housing space 37 between the flat base portion 2a of the stand portion 2 and the bottom surface of the casing 3 (the lower casing 3b). When the general-purpose keyboard device 47 is housed in the housing space 37, a dimensional relationship of each portion is as shown in FIG. 14 in this example. The general-purpose keyboard device 47 is housed in the housing space 37 up to a little more than 60% of the depth dimension thereof. When the exclusive small-sized keyboard device 48 is housed in the housing space 37, as shown in FIG. 16, the exclusive small-sized keyboard device 48 is completely housed in the housing space 37.

In this embodiment, when the connected keyboard device is not used, it can be thus housed in the housing space 37. Thus, the space efficiency is excellent.

Figure 17:
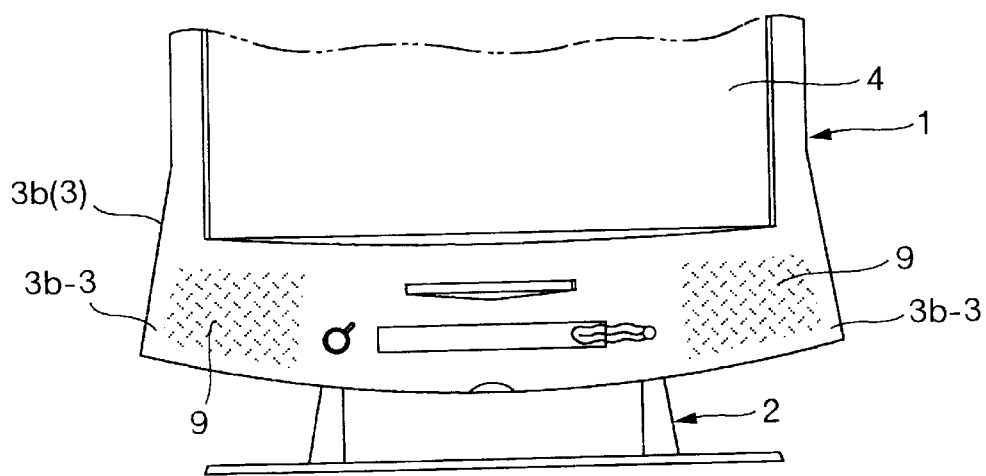
FIG. 17 is a partial front elevational view showing a lower portion of the casing (a lower casing) in the information processing apparatus according to the first embodiment of the present invention.
Figure 18:
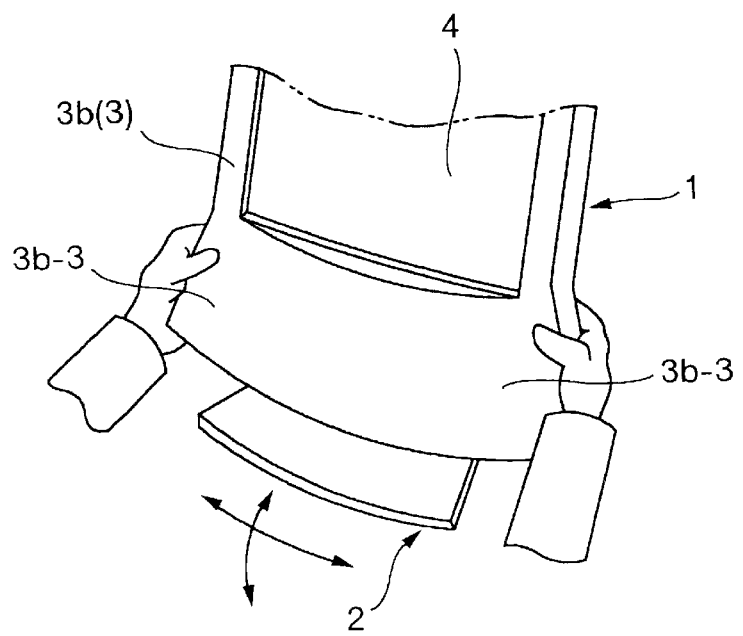
FIG. 18 is an illustration when the body portion is tilted or swung in the information processing apparatus according to the first embodiment of the present invention.

FIG. 17 is a front elevational view of the lower portion of the casing 3 (the lower casing 3b) in the information processing apparatus of this embodiment. FIG. 18 is an illustration when the body portion 1 (the casing 3) of the information processing apparatus of this embodiment is tilted or swung.

As shown in FIG. 17, in this embodiment, at the left and right of the lower portion of the lower casing 3b, overhang portions 3b-3, 3b-3 to be held by hands are provided. These overhang portions 3b-3 are provided, whereby hold properties for holding by hand is excellent. Operability is improved during the tilt operation or the swing operation.

As described above, in this embodiment, by making full use of thin and light characteristics of the liquid crystal display device, it is possible to accomplish a whole information processing apparatus system including the display device which is thin/compact and has the excellent space efficiency and the excellent ease of use.

Figure 19:
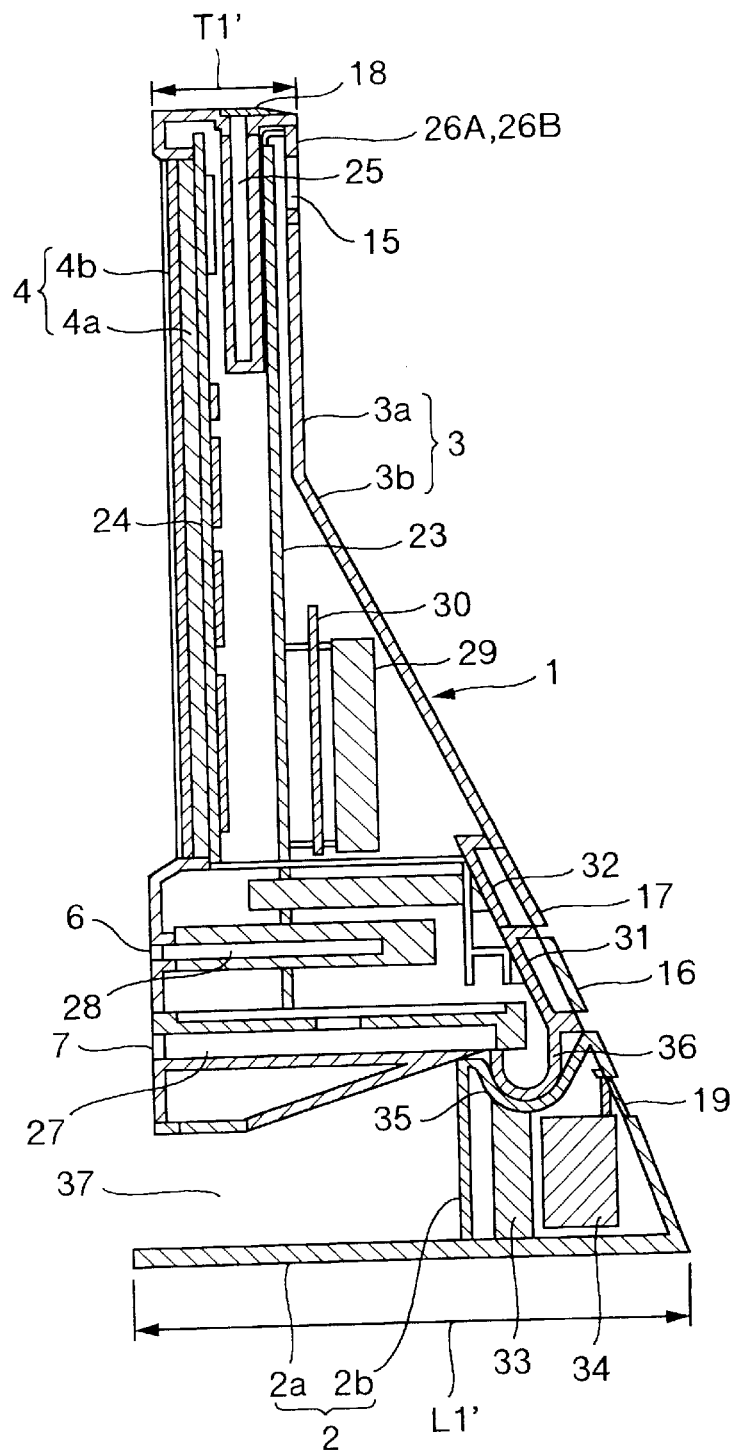
FIG. 19 is a center cross sectional view of the information processing apparatus according to a second embodiment of the present invention.

FIG. 19 is a center cross sectional view of the information processing apparatus according to a second embodiment of the present invention.

The arrangement of the second embodiment is substantially the same as that of the first embodiment. A difference between the first and second embodiments is that the main chassis 23 and the main substrate 24 are replaced by each other whereby the main substrate 24 and the liquid crystal display device 4 are bonded to/integrated with each other.

In this embodiment of such an arrangement, a thickness dimension (depth dimension) T1' of the upper casing 3a can be smaller than T1 of the first embodiment. This also allows a maximum depth dimension L1' of the stand portion 2 to be smaller than L1 of the first embodiment. The depth dimension of the whole apparatus can be thus more reduced.

Figure 20:
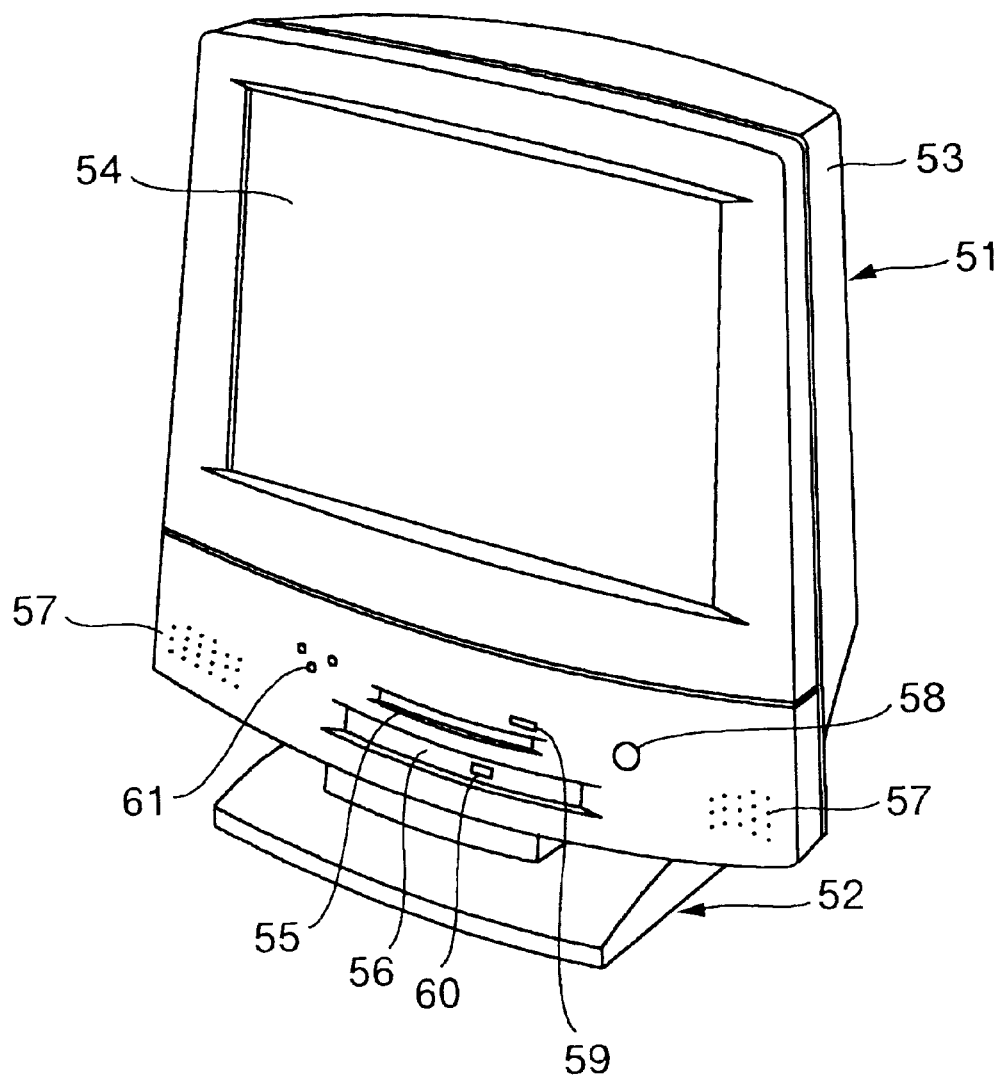
FIG. 20 is a perspective view of the information processing apparatus according to a third embodiment of the present invention seen from the front elevational side.
Figure 21:
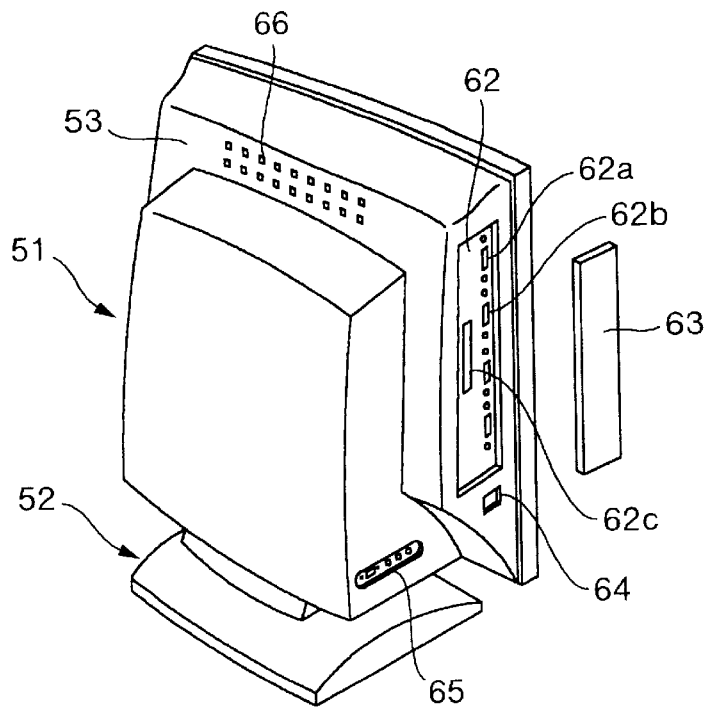
FIG. 21 is a perspective view of the information processing apparatus according to the third embodiment of the present invention seen from the back side.
Figure 22:
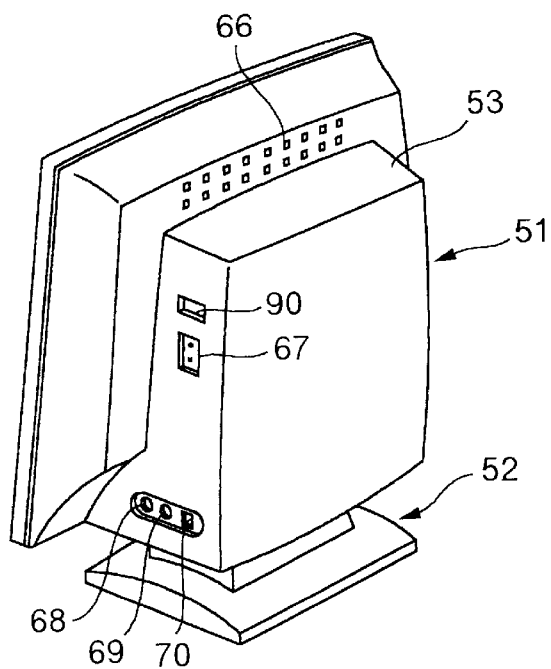
FIG. 22 is a perspective view of the information processing apparatus according to the third embodiment of the present invention seen from the back side at the different angle from FIG. 21.
Figure 23:
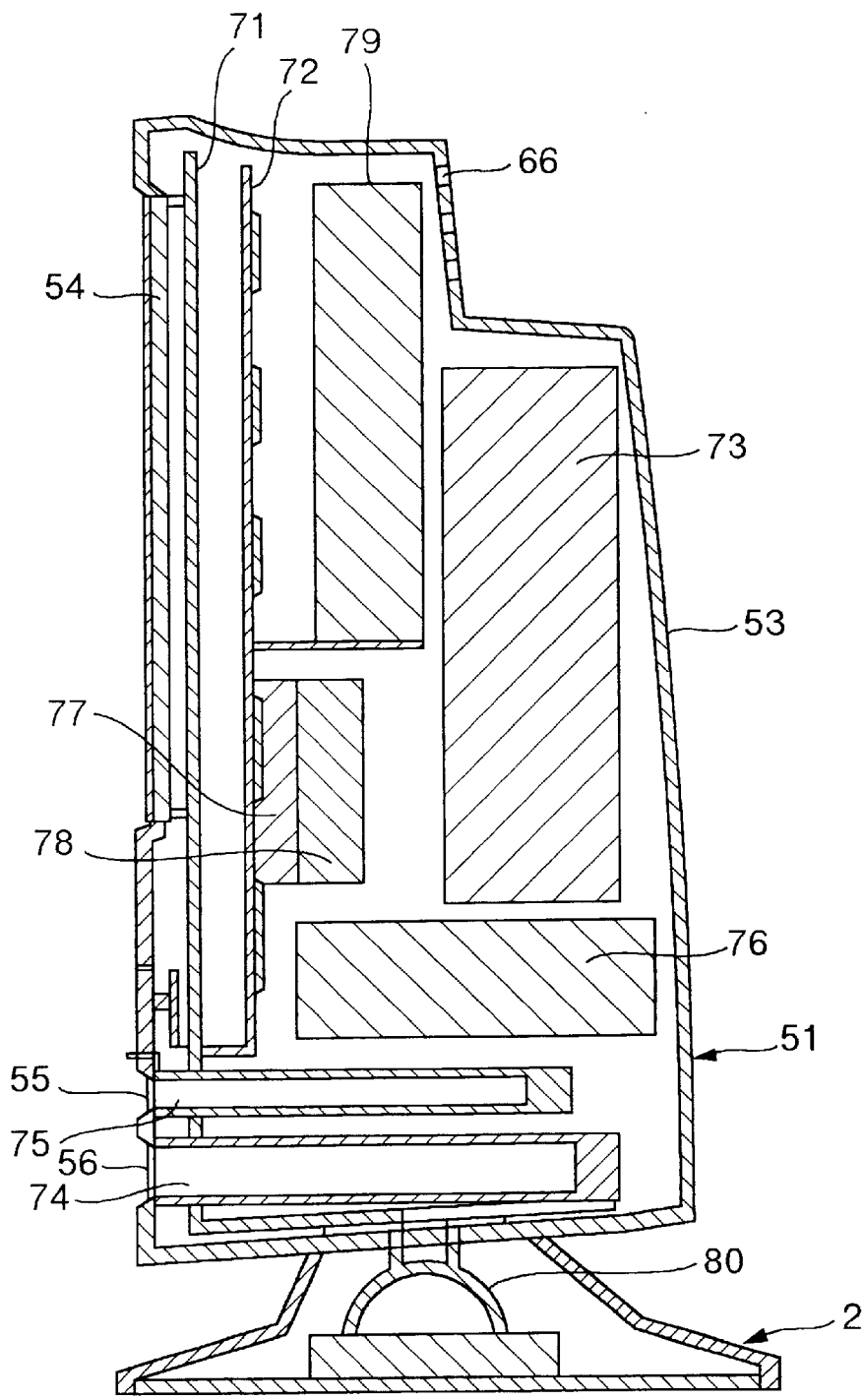
FIG. 23 is a center cross sectional view of the information processing apparatus according to the third embodiment of the present invention.

FIGS. 20–23 show the information processing apparatus according to a third embodiment of the present invention. FIG. 20 is a perspective view of the information processing apparatus of this embodiment seen from the front elevational side. FIG. 21 is a perspective view of the information processing apparatus of this embodiment seen from the back side. FIG. 22 is a perspective view of the information processing apparatus of this embodiment seen from the back side at the different angle from FIG. 21. FIG. 23 is a center cross sectional view of the information processing apparatus of this embodiment.

In FIGS. 20–23, numeral 51 denotes the body portion. Numeral 52 denotes the stand portion for supporting the body portion 51. Numeral 53 denotes the casing constituting the outer box of the body portion 51.

As shown in FIG. 20, a liquid crystal display 54 is arranged on the front surface of the body portion 51. At the center of the lower side of the liquid crystal display 54, a disk eject/insert slot 55 for the floppy disk drive incorporated in the body portion 51 is horizontally arranged. On the lower side of this disk eject/insert slot 55, a disk eject/insert slot 56 for the CD-ROM drive incorporated in the body portion 51 is arranged. Speakers 57, 57 are arranged on the right and left sides of the above-described two disk eject/insert slots 55 and 56, respectively. The stereo sound can be output from the speakers 57, 57. In FIG. 20, numeral 58 denotes the power source button. Numeral 59 denotes the floppy disk eject button. Numeral 60 denotes the CD-ROM eject button. Numeral 61 denotes an LED.

As shown in FIG. 21, on a left side surface of the body portion 51 (the casing 53), arranged is an openable/closable and removable cover 63 for covering a connector portion 62 to be connected to the external equipment, the expansion board or the like. The connector portion 62 is provided with a 9-pin serial port 62a, 25-pin parallel port 62b, an ISA/PC slot 62c or the like. On the lower side of the connector portion 62, a telephone/LAN connector 64 is disposed. On the back side of the telephone/LAN connector 64, arranged is a connector portion 65 having an audio signal output terminal, an image signal input/output terminal, a MIDI/joystick connector or the like. In FIG. 21, numeral 66 denotes the radiating holes bored on the upper portion on the rear surface of the casing 53. As shown in FIG. 22, on a right side surface of the body portion 51 (the casing 53), a power source receptacle 67, a power source button 90, a keyboard connector 68, a mouse connector 69, a telephone/LAN connector 70 or the like are also disposed.

As shown in FIG. 23, the liquid crystal display 54 is arranged on the front surface of the casing 53. On the rear surface side of the liquid crystal display 54, a chassis 71 is arranged in parallel and adjacent to the liquid crystal display 54. On the back side of this chassis 71, a main substrate 72 is arranged in parallel and adjacent to the chassis 71. On a rear upper side in the casing 53, a power source unit 73 is disposed. On the lower side in the casing 53, a CD-ROM drive 74 is horizontally arranged. On the upper side of the CD-ROM drive 74, a floppy disk drive 75 is horizontally arranged. On the upper side of the floppy disk drive 75, a hard disk drive 76 is horizontally arranged. In the casing 53 shown in FIG. 23, numeral 77 denotes a CPU. Numeral 78 denotes a fan. Numeral 79 denotes a PCI/ISA slot portion.

In the stand portion 52, a hinge support portion 80 for connecting and supporting the body portion 51 is disposed so that the body portion 51 can be tilted and swung. This allows the body portion 51 to be tilted and swung with respect to the stand portion 52.

In this embodiment of such an arrangement, the main substrate 72 is also arranged in parallel to the back side of the liquid crystal display 54. Thus, the depth dimension of the whole apparatus can be reduced, compared to the conventional horizontal arrangement of the main substrate. Furthermore, the horizontally arranged CD-ROM drive 74 and floppy disk drive 75 are arranged adjacent to each other and at two vertical stages. Thus, the height of the whole apparatus can be also suppressed without expanding the horizontal dimension of the whole apparatus. Moreover, the drive for the small-sized disk is arranged on the upper portion, and the drive for the large-sized disk is arranged on the lower portion. Therefore, the apparatus can be constructed so that it may have excellent handling properties without difficulty in handling during the insertion/removal of the disk. Furthermore, the size of the liquid crystal display 54 of this embodiment is 12-inch type smaller than the size of other embodiments of the present invention (where it is assumed that the size is 15 inch-type). Compared to the first and second embodiments, a casing portion corresponding to the upper portion of the liquid crystal display 54 is not upward extruded. The whole casing 53 of the body portion 51 can be generally box-shaped and compacted.

Figure 24:
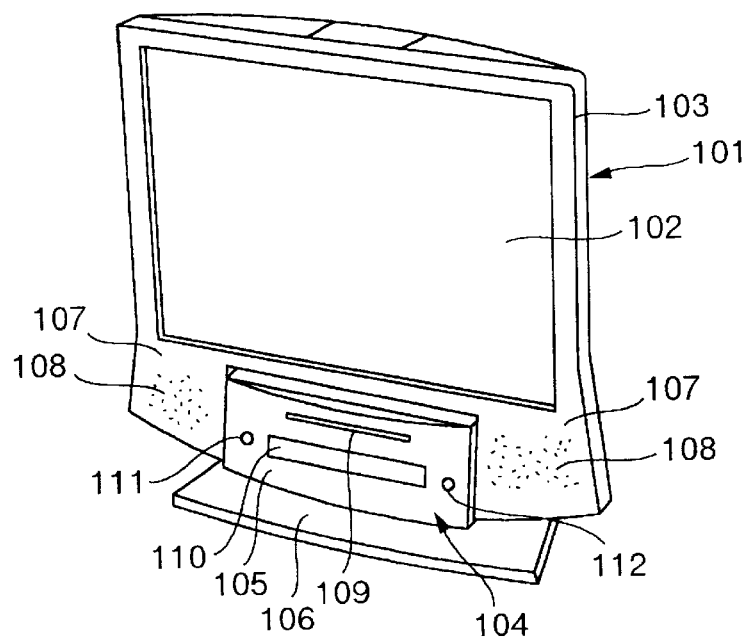
FIG. 24 is a perspective view of the information processing apparatus according to a fourth embodiment of the present invention seen from the front elevational side.
Figure 25:
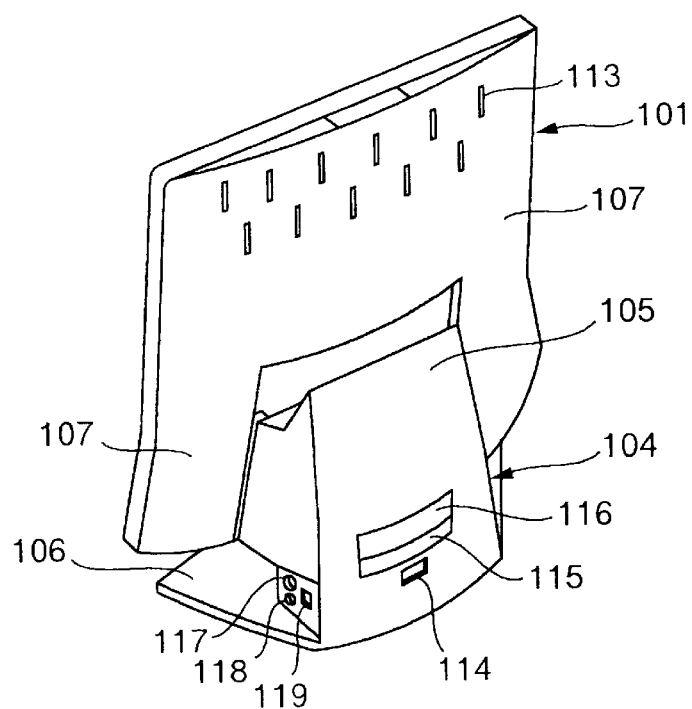
FIG. 25 is a perspective view of the information processing apparatus according to the fourth embodiment of the present invention seen from the back side.
Figure 26:
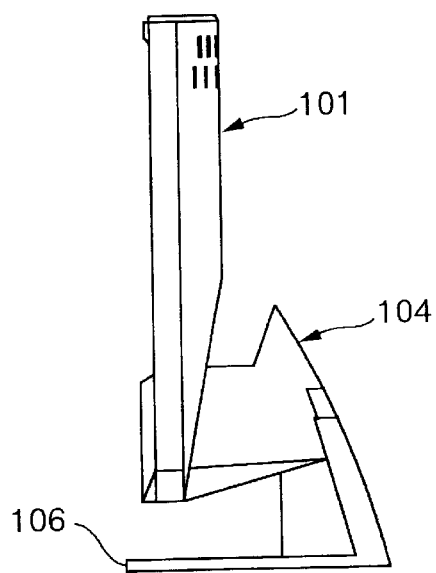
FIG. 26 is a side view of the information processing apparatus according to the fourth embodiment of the present invention.
Figure 27:
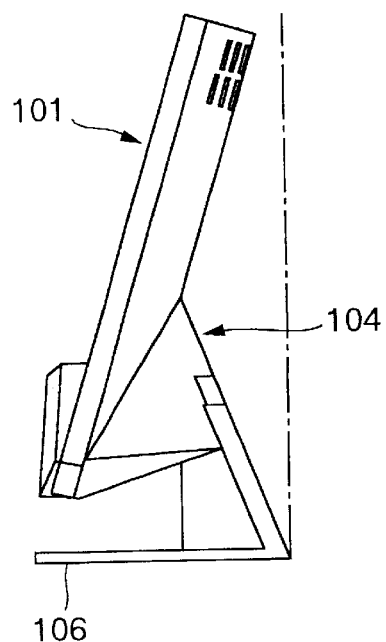
FIG. 27 is a side view when the information processing apparatus according to the fourth embodiment of the present invention is tilted.

FIGS. 24–27 show the information processing apparatus of a fourth embodiment of the present invention. FIG. 24 is a perspective view of the information processing apparatus of this embodiment seen from the front elevational side. FIG. 25 is a perspective view of the information processing apparatus of this embodiment seen from the back side. FIG. 26 is a side view of the information processing apparatus of this embodiment. FIG. 27 is a side view when the information processing apparatus of this embodiment is tilted.

In FIGS. 24–27, numeral 101 denotes a thin display portion having a liquid crystal display device 102. Numeral 103 denotes the casing of the display portion 101. Numeral 104 denotes the body portion (apparatus body) for supporting the display portion 101. Numeral 105 denotes the casing of the body portion 104. Numeral 106 denotes a support base portion of the body portion 104. It should be noted that the body portion 104 does not always include a main CPU but is the base of the mechanism (this is the same as the embodiments described below).

As shown in FIG. 24, the liquid crystal display device 102 is arranged on the front surface of the display portion 101. On the left and right sides of the lower portion of the casing 103 of the display portion 101, a pair of lower overhang portions 107, 107 are formed so that they may be located outside both the side surfaces of the body portion 104. The display portion 101 (the casing 103) is arranged so that it may be located across the body portion 104. Speakers 108, 108 are arranged in the lower overhang portions 107, 107. On the front surface of the body portion 104, a disk eject/insert slot 109 for the floppy disk drive incorporated in the body portion 104 is horizontally arranged so that it may be located just under the center of the liquid crystal display device 102 of the display portion 101. On the lower side of this disk eject/insert slot 109, a disk eject/insert slot 110 for the CD-ROM drive incorporated in the body portion 104 is horizontally arranged. In FIG. 24, numeral 111 denotes the power source button. Numeral 112 denotes the CD-ROM eject button.

As shown in FIG. 25, radiating holes 113 are bored on the upper portion on the rear surface of the display portion 101. On the rear surface of the body portion 104, a power source receptacle 114, a cover 115 for covering the connector portion, a cover 116 for covering the expansion board slot portion or the like are disposed. On the side surface of the body portion 104, a keyboard connector 117, a mouse connector 118, a USB connector 118 or the like are disposed.

In the casing 103 of the display portion 101, the main substrate is arranged/incorporated in parallel to the back side of the liquid crystal display 102. On the lower side in the casing 105 of the body portion 104, the CD-ROM drive is horizontally arranged. On the upper side of the CD-ROM drive, the floppy disk drive is horizontally arranged. On the upper side of the floppy disk drive, the hard disk drive is horizontally arranged.

The thin/light display portion 101 is connected and supported to the body portion 104 so that it can be tilted. The display portion 101 can be moved from a vertically standing state shown in FIG. 26 to a rearwardly tilted state shown in FIG. 27. In this state shown in FIG. 27, the display portion 101 is rearwardly tilted at maximum. At this time, the display portion 101 is positioned with allowance more forward than the most back position of the whole apparatus. That is, the maximum depth dimension of the whole apparatus is arranged so that it may be constant regardless of the tilt position of the display portion 101.

In this embodiment of such an arrangement, by making full use of thin and light characteristics of the liquid crystal display device, the whole information processing apparatus system including the display device can be thinned/compacted and have the excellent installation space properties. Furthermore, since the thin/light display portion 101 alone is tilted, the operability of the tilt operation is excellent. The horizontally arranged CD-ROM drive and floppy disk drive are also located adjacent to each other at two vertical stages. Thus, the height of the whole apparatus can be also suppressed without expanding the horizontal dimension of the whole apparatus. In addition, the drive for the small-sized disk is arranged on the upper portion, and the drive for the large-sized disk is arranged on the lower portion. Therefore, the apparatus can be constructed so that it may have excellent handling properties without difficulty in handling during the insertion/removal of the disk. Furthermore, the disk eject/insert slot is not moved with the tilt operation but is constantly positioned (That is, in the above-described embodiments, since the disk eject/insert slot and the disk drive are inclined due to the tilt operation, a direction of disk insertion is inclined. On the other hand, in this embodiment, since the disk drive remains horizontal, the direction of disk insertion is horizontal at all times). Thus, the operability is excellent for the insertion/removal of the disk.

Figure 28:
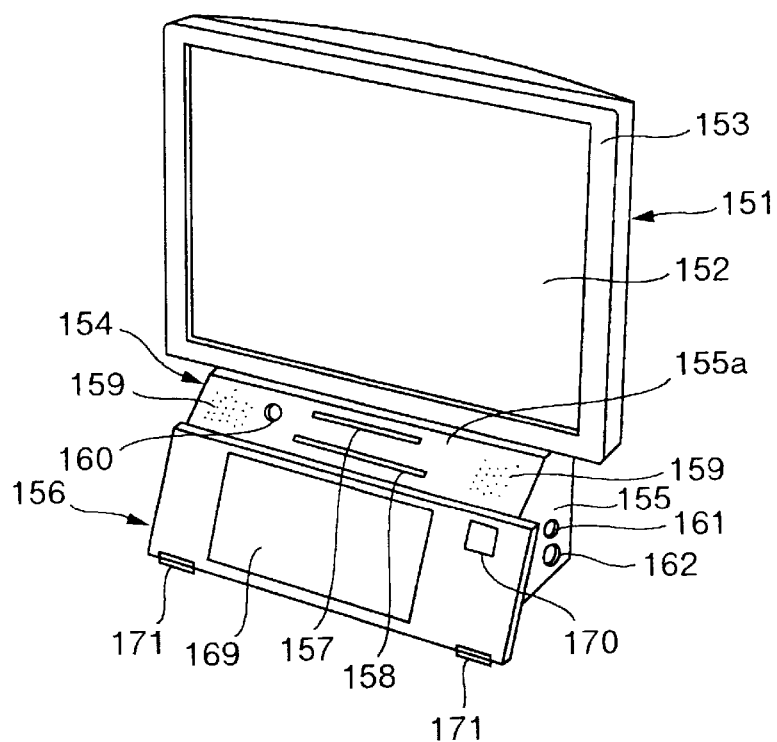
FIG. 28 is a perspective view seen from the front elevational side when an input board device is leaned against the information processing apparatus according to a fifth embodiment of the present invention.
Figure 29:
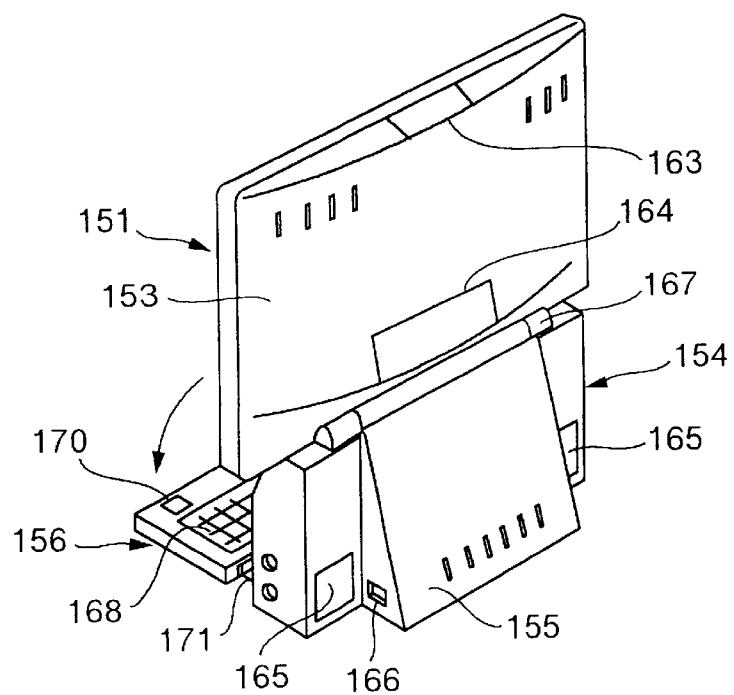
FIG. 29 is a perspective view seen from the back side when the input board device is laid in front of the information processing apparatus according to the fifth embodiment of the present invention.
Figure 30:
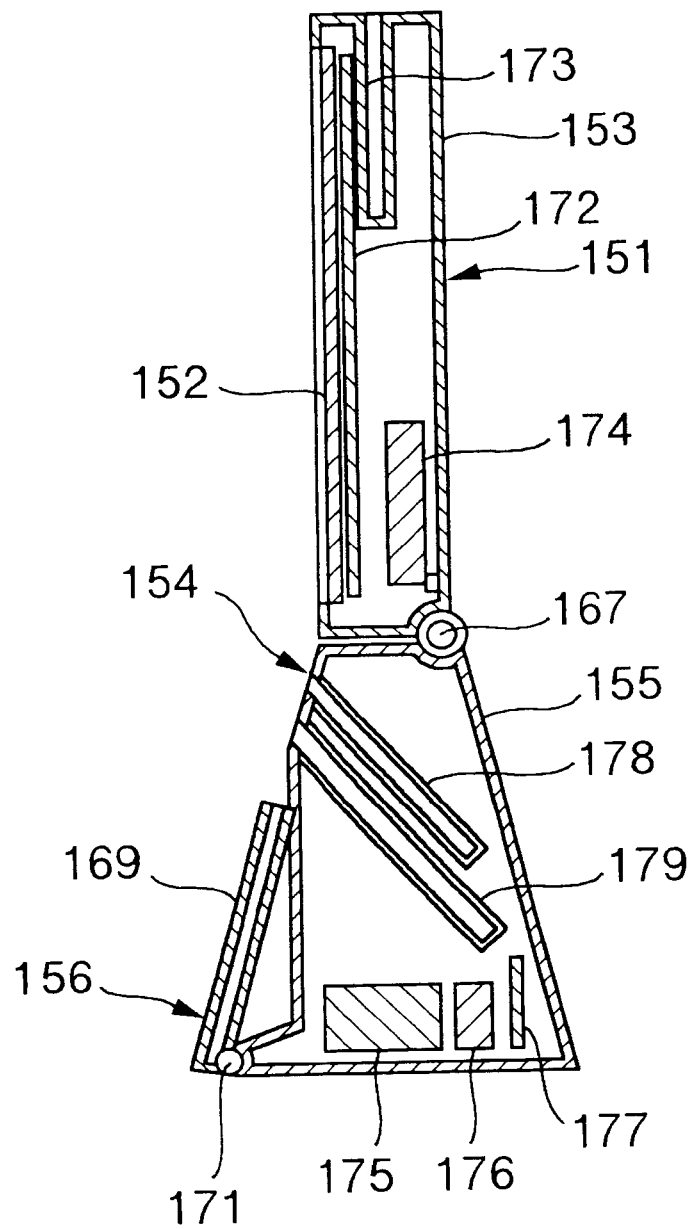
FIG. 30 is a cross sectional view when the input board device is leaned against the information processing apparatus according to the fifth embodiment of the present invention.
Figure 31:
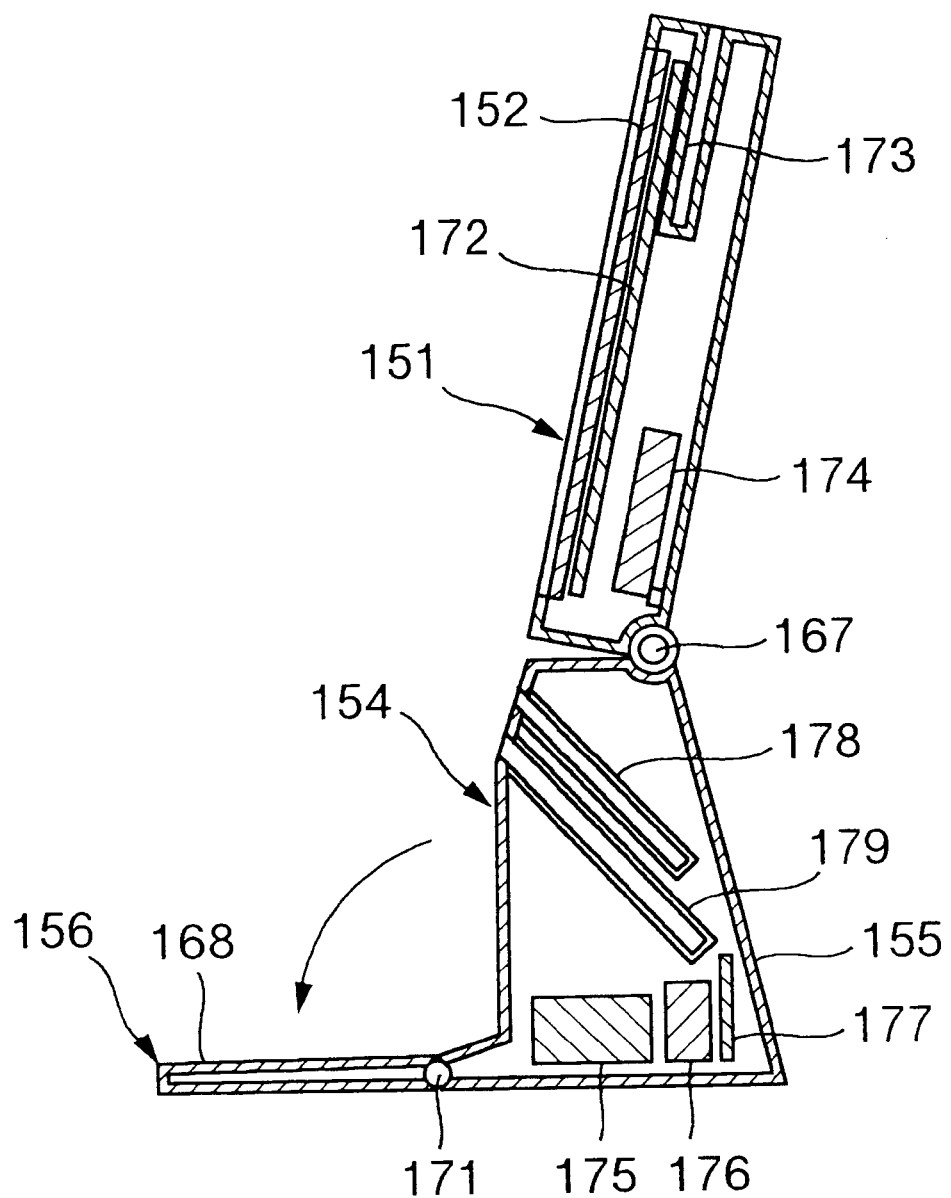
FIG. 31 is a cross sectional view when the input board device is laid in front of the information processing apparatus according to the fifth embodiment of the present invention.
Figure 32:
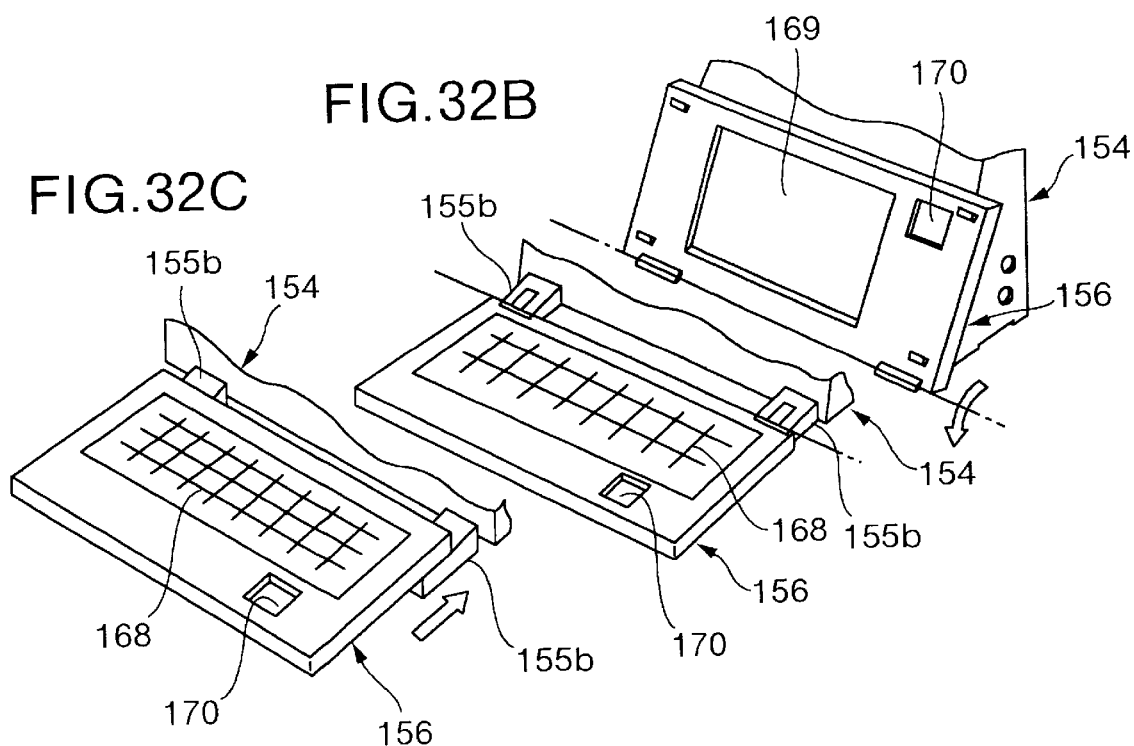
FIGS. 32A–32C are illustrations showing possible attitudes of the input board device in the information processing apparatus according to the fifth embodiment of the present invention.

FIGS. 28–32 show the information processing apparatus according to a fifth embodiment of the present invention. FIG. 28 is a perspective view seen from the front elevational side when an input board device is leaned against the information processing apparatus of this embodiment. FIG. 29 is a perspective view seen from the back side when the input board device is laid in front of the information processing apparatus of this embodiment. FIG. 30 is a cross sectional view when the input board device is leaned against the information processing apparatus of this embodiment. FIG. 31 is a cross sectional view when the input board device is laid in front of the information processing apparatus of this embodiment. FIGS. 32A–32C are illustrations showing possible attitudes of the input board device in the information processing apparatus of this embodiment.

In FIGS. 28–31, numeral 151 denotes the thin display portion having a liquid crystal display device 152. Numeral 153 denotes the casing of the display portion 151. Numeral 154 denotes the body portion (apparatus body) for supporting the display portion 151. Numeral 155 denotes the casing of the body portion 154. Numeral 156 denotes the input board device connected to the body portion 154 by the appropriate connecting means (not shown).

As shown in FIG. 28, the liquid crystal display device 152 is arranged on the front surface of the display portion 151. On the upper portion on the front surface of the casing 155 of the body portion 154, an inclined surface 155a declining frontward is provided. On the center upper portion of this inclined surface 155a, a disk eject/insert slot 157 for the floppy disk drive incorporated in the body portion 154 is horizontally arranged. On the lower side of the disk eject/insert slot 157, a disk eject/insert slot 158 for the CD-ROM drive incorporated in the body portion 154 is arranged. Speakers 159, 159 are arranged on the left and right sides of the two disk eject/insert slots 157, 158, respectively. A power source button 160 is also disposed on the inclined surface 155a. On the right side surface of the casing 155 of the body portion 154, a mouse connector 161, a telephone/LAN connector 162, a keyboard connector (not shown) or the like are disposed.

As shown in FIG. 29, on the upper surface of the casing 153 of the display portion 151, a cover 163 for covering an IC card slot portion is disposed. On the lower portion of the rear surface of the casing 153, a cover 164 for covering an ISA card slot portion is disposed. On the rear surface side of the casing 155 of the body portion 154, a cover 165 for covering the expansion board slot portion, a power source receptacle 166 or the like are disposed.

The display portion 151 is also connected/held to the body portion 154 by a hinge portion 167 so that it can be tilted (see FIG. 31).

The input board device 156 is arranged so that it may be a both-sided input type. As shown in FIG. 29, a key input portion 168, which is the same as the normal keyboard device, is disposed on the one side. As shown in FIG. 28, a touch pointing input portion 169 such as a touch tablet is disposed on the other side. A both-sided input type track pad portion 170 is also disposed on the input board device 156. This input board device 156 is rotatably connected to the body portion 154 by a hinge/slidable connecting portion 171. When the input board device 156 is laid, it is slidable by about a predetermined amount by means of the hinge/slidable connecting portion 171.

As shown in FIGS. 30 and 31, the liquid crystal display device 152 is arranged on the front surface of the casing 153 of the display portion 151. A main substrate 172 is arranged in parallel and adjacent to the liquid crystal display device 152 on the rear surface side of the liquid crystal display device 152. An IC card slot portion 173 is also disposed on the upper portion in the casing 153. A PC/ISA card slot portion 174 is disposed on the lower portion in the casing 153. On the lower side in the casing 155 of the body portion 154, a hard disk drive 175, a power source unit 176, an expansion board 177 or the like are arranged. On the upper side in the casing 155, a floppy disk drive 178 is arranged so that it may be inclined downward. On the lower side of the floppy disk drive 178, a CD-ROM drive 179 is arranged in parallel to the floppy disk drive 178 so that it may be inclined downward.

As described above, in this embodiment, the input board device 156 is rotatably connected to the body portion 154 by the hinge/slidable connecting portion 171. The input board device 156 can be leaned against the front surface of the body portion 154 as shown in FIGS. 28 and 30 and can be laid in front of the body portion 154 as shown in FIGS. 29 and 31. When the input board device 156 is leaned against the body portion 154, the touch pointing input portion 169 and the track pad portion 170 can be operated for input. Thus, a relatively simple operation such as a CD-ROM regeneration can be performed while the input board device 156 remains stood. In this case, the disk eject/insert slots 157, 158 and the speakers 159 are positioned on the inclined surface 155a of the casing 155 of the body portion 154. These are exposed even when the input board device 156 remains stood. Thus, the insertion/removal of the disk can be facilitated. Furthermore, a sound output performance is not deteriorated.

On the other hand, when the input board device 156 is laid in front of the body portion 154, the key input portion 168 and the track pad portion 170 can be operated for the input. This allows various operations to be performed in the same manner as a typical computer system.

When the input board device 156 is laid, it is slidable by about a predetermined amount by means of the hinge/slidable connecting portion 171. As shown in FIG. 32C, the back portion of the input board device 156 can be placed on forward projected support portions 155b disposed on the lower portion on the front surface side of the casing 155 of the body portion 154. Thus, the input board device 156 whose cross section has the same thickness can be operated for the input with the operability equal to the operability of the arrangement in which the back portion is a little higher than the front portion in the same manner as the typical keyboard device.

As shown in FIGS. 32A–32C, the input board device 156 is changed from a leaned attitude to a laid attitude. From the laid attitude, the back portion of the input board device 156 is then placed on the forward projected support portions 155b.

In this embodiment of such an arrangement, by making full use of thin and light characteristics of the liquid crystal display device, the whole information processing apparatus system including the display device can be thinned/compacted and have the excellent installation space properties. Furthermore, since the thin/light display portion 151 alone is tilted, the operability of the tilt operation is excellent. By the use of the both-sided input type input board device 156 having the key input portion on the one side and the touch pointing input portion 169 on the other side, when the input board device 156 is leaned, an input operation can be performed by the touch pointing input portion. When the input board device 156 is laid, the input operation can be performed by the key input portion 168. Therefore, when the input board device 156 is leaned, that is, even when the space factor is excellent, the input operation can be performed in a simple input form. This allows the ease of use to be greatly improved. Furthermore, when the input board device 156 is not used, the input board device 156 is leaned, whereby the space efficiency is improved.

Figure 33:
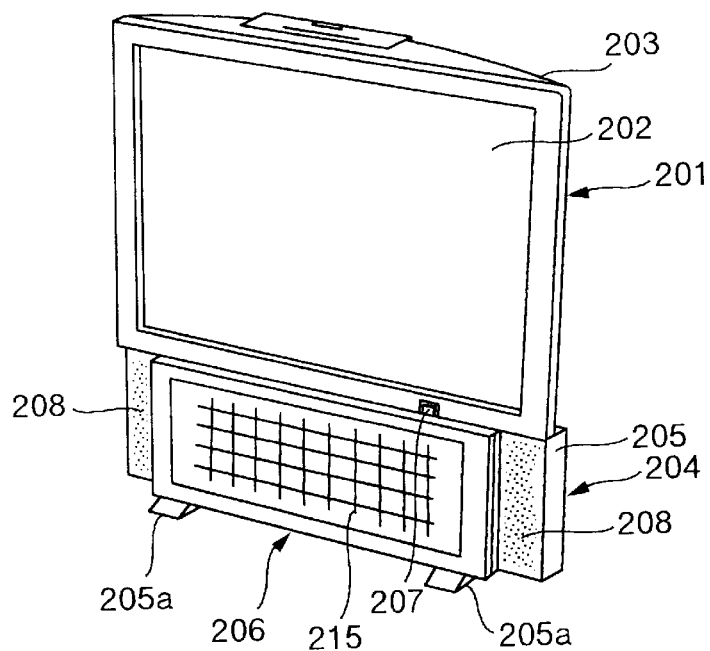
FIG. 33 is a perspective view seen from the front elevational side when the keyboard device is leaned against the information processing apparatus according to a sixth embodiment of the present invention.
Figure 34:
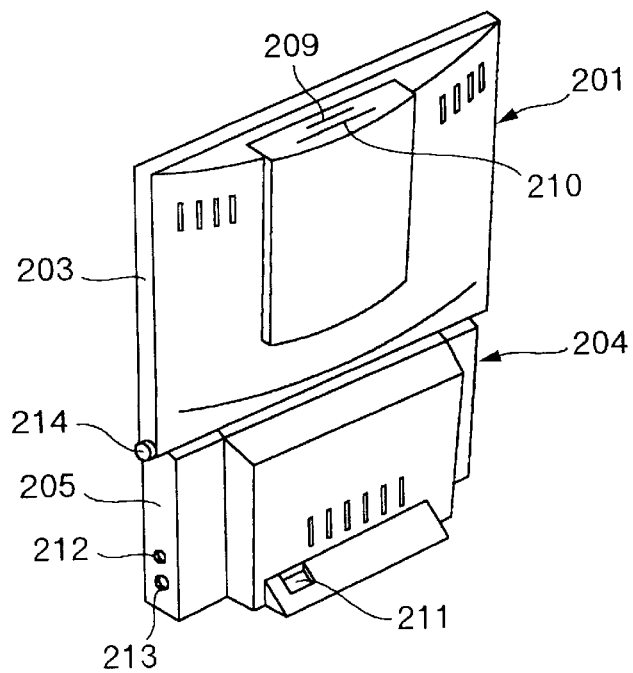
FIG. 34 is a perspective view seen from the back side when the keyboard device is leaned against the information processing apparatus according to the sixth embodiment of the present invention.
Figure 35:
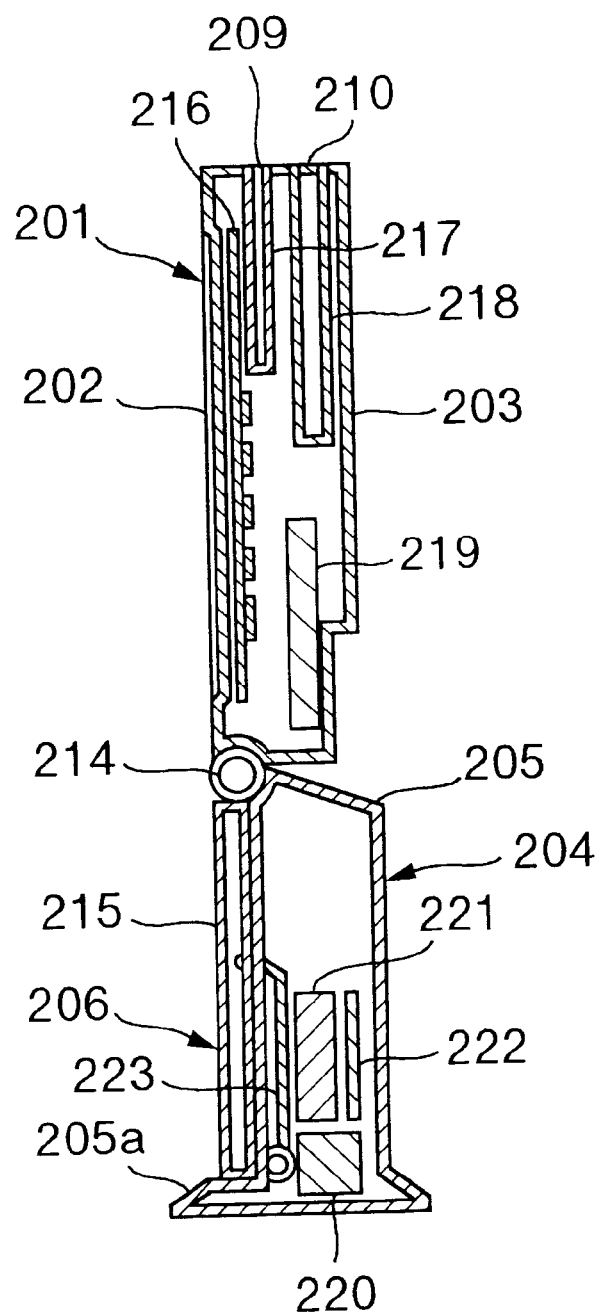
FIG. 35 is a cross sectional view when the keyboard device is leaned against the information processing apparatus according to the sixth embodiment of the present invention.
Figure 36:
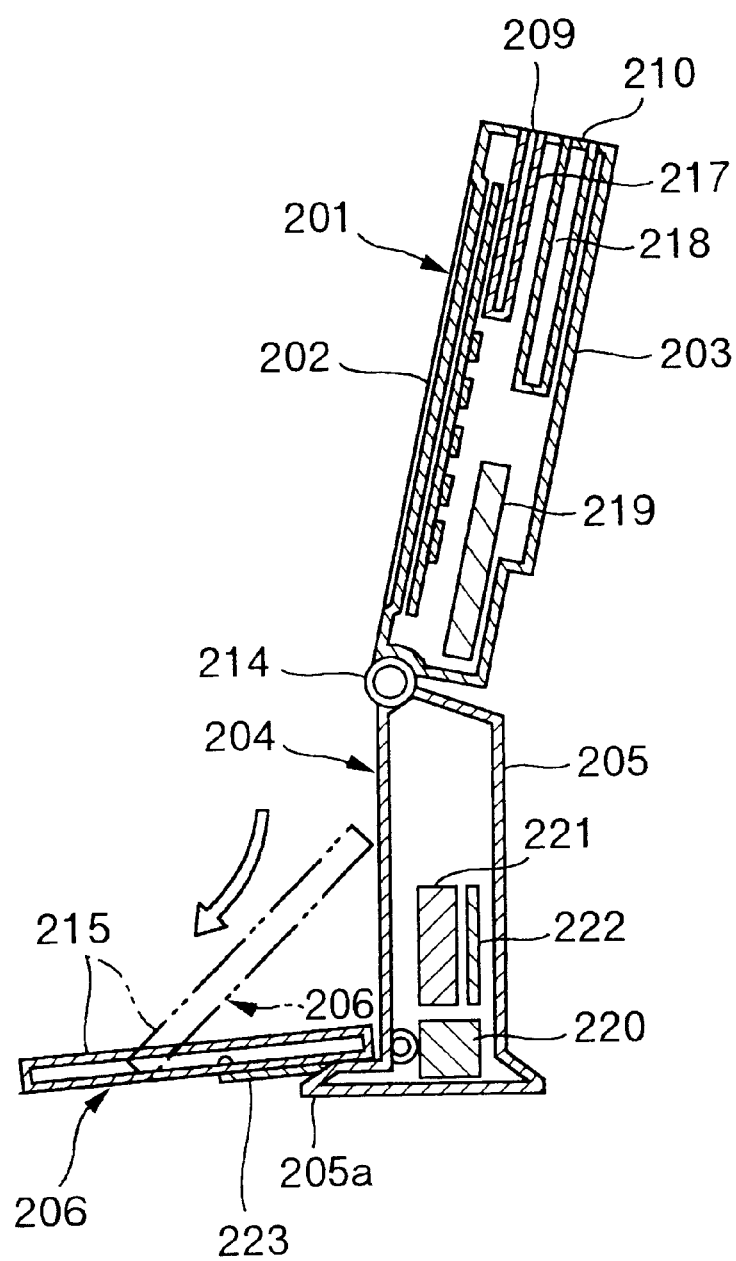
FIG. 36 is a cross sectional view when the keyboard device is laid in front of the information processing apparatus according to the sixth embodiment of the present invention.

FIGS. 33–36 show the information processing apparatus according to a sixth embodiment of the present invention. FIG. 33 is a perspective view seen from the front elevational side when the keyboard device is leaned against the information processing apparatus of this embodiment. FIG. 34 is a perspective view seen from the back side when the keyboard device is leaned against the information processing apparatus of this embodiment. FIG. 35 is a cross sectional view when the keyboard device is leaned against the information processing apparatus of this embodiment. FIG. 36 is a cross sectional view when the keyboard device is laid in front of the information processing apparatus of this embodiment.

In FIGS. 33–36, numeral 201 denotes the display portion having a liquid crystal display device 202. Numeral 203 denotes the casing of the display portion 201. Numeral 204 denotes the body portion (apparatus body) for supporting the display portion 201. Numeral 205 denotes the casing of the body portion 204. Numeral 206 denotes the keyboard device connected to the body portion 204 by the appropriate connecting means (not shown).

As shown in FIG. 33, the liquid crystal display device 202 is arranged on the front surface of the display portion 201. A power source button 207 is disposed on a right lower side of the liquid crystal display device 202. Speakers 208, 208 are disposed on the left and right sides on the front surface of the body portion 204. As described below, even when the keyboard device 206 is leaned against the front surface of the body portion 204, the speakers 208, 208 are exposed. On the lower portion on the front surface side of the casing 205 of the body portion 204, forward projected support portions 205a, 205a are disposed.

As shown in FIG. 34, on the upper surface of the casing 203 of the display portion 201, a disk eject/insert slot 209 for the floppy disk drive incorporated in the display portion 201 is arranged in parallel to a display surface of the liquid crystal display device 202. A disk eject/insert slot 210 for the CD-ROM drive incorporated in the display portion 201 is arranged adjacent to the disk eject/insert slot 209 so that it may be located in parallel to the display surface of the liquid crystal display device 202. On the rear surface of the casing 205 of the body portion 204, a power source receptacle 211 or the like are disposed. On the side surface of the casing 205, a mouse connector 212, a telephone/LAN connector 213, a keyboard connector (not shown) or the like are disposed.

The display portion 201 is also connected/supported to the body portion 204 by a hinge portion 214 so that it can be tilted (see FIG. 36).

The keyboard device 206 is connected to the body portion 204 so that it can be leaned against the front surface side of the body portion 204 and can be laid in front of the body portion 204. A key input portion 215 disposed on the one side of the keyboard device 206 is exposed outward whether the keyboard device 206 is leaned or laid, whereby the key input portion 215 can be operated for the input.

As shown in FIGS. 35 and 36, the liquid crystal display device 202 is arranged on the front surface of the casing 203 of the display portion 201. A main substrate 216 is arranged in parallel and adjacent to the liquid crystal display device 202 on the rear surface side of the liquid crystal display device 202. At a rear upper position of the main substrate 216, a floppy disk drive 217 is vertically arranged in parallel and adjacent to the main substrate 216. On the back side of the floppy disk drive 217, a CD-ROM drive 218 is arranged in parallel and adjacent to the floppy disk drive 217. On the lower portion of the casing 203 of the display portion 201, a PC/ISA card slot portion 219 is disposed. In the casing 205 of the body portion 204, a power source unit 220, a hard disk drive 221, an expansion board 222 or the like are also arranged.

In this embodiment, the keyboard device 206 can be leaned and laid. In any state, the key input portion 215 is exposed outward. Thus, the keyboard device 206 is connected to the body portion 204 by a keyboard arm 223 so that it can be slid and rotated with respect to the body portion 204. The keyboard device 206 is slid and rotated in a direction of an arrow shown in FIG. 36 through the attitude shown by a two-dotted line of FIG. 36 from the leaned attitude shown in FIG. 35. The keyboard device 206 is then laid as shown by a solid line of FIG. 36. A movement from the laid attitude to the leaned attitude is the opposite of this operation.

When the keyboard device 206 is laid, as shown in FIG. 36, the back portion of the keyboard device 206 can be placed on the forward projected support portions 205a disposed on the lower portion on the front surface side of the casing 205 of the body portion 204. Thus, the keyboard device 206 whose cross section has the same thickness can be operated for the input with the operability equal to the operability of the arrangement in which the back portion is a little higher than the front portion in the same manner as the typical keyboard device.

In this embodiment of such an arrangement, by making full use of thin and light characteristics of the liquid crystal display device, the whole information processing apparatus system including the display device can be thinned/compacted and have the excellent installation space properties. In the display portion 201, the floppy disk drive 217 and the CD-ROM drive 218 are also arranged in parallel to the display surface. Thus, even when the floppy disk drive 217 and the CD-ROM drive 218 are incorporated in the display portion 201, the display portion 201 can be thinned. Therefore, it is not necessary to incorporate the floppy disk drive 217 and the CD-ROM drive 218 in the body portion 204 supporting the display portion 201. Thus, the body portion 204 can be thinned. Accordingly, the whole apparatus can be thinned. Whether the keyboard device 206 is leaned or laid, the input operation can be performed by the key input portion 215. Thus, when the keyboard device 206 is leaned, that is, even when the space factor is excellent, the input operation can be performed in the simple input form. This allows the ease of use to be greatly improved. Furthermore, when the keyboard device 206 is not used, the keyboard device 206 is leaned, whereby the space efficiency can be improved.

Figure 37:
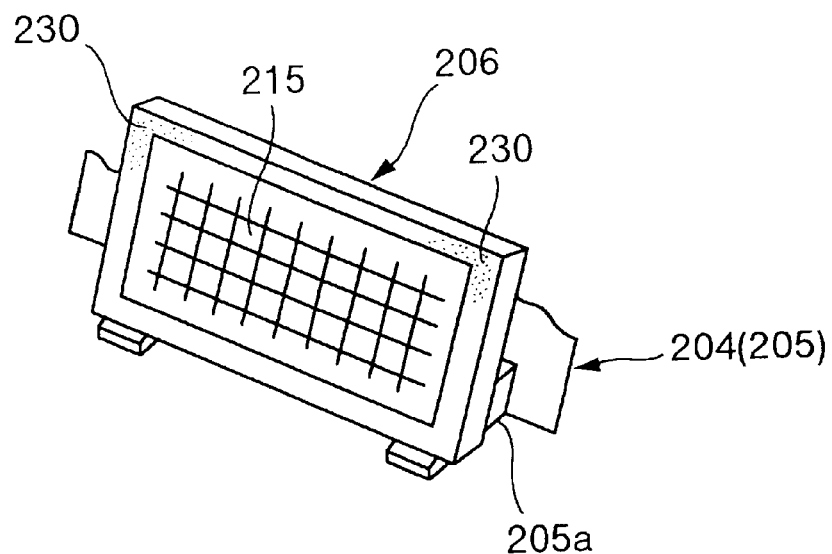
FIG. 37 is a partial perspective view seen from the front elevational side when the keyboard device is leaned against the information processing apparatus according to a seventh embodiment of the present invention.
Figure 38:
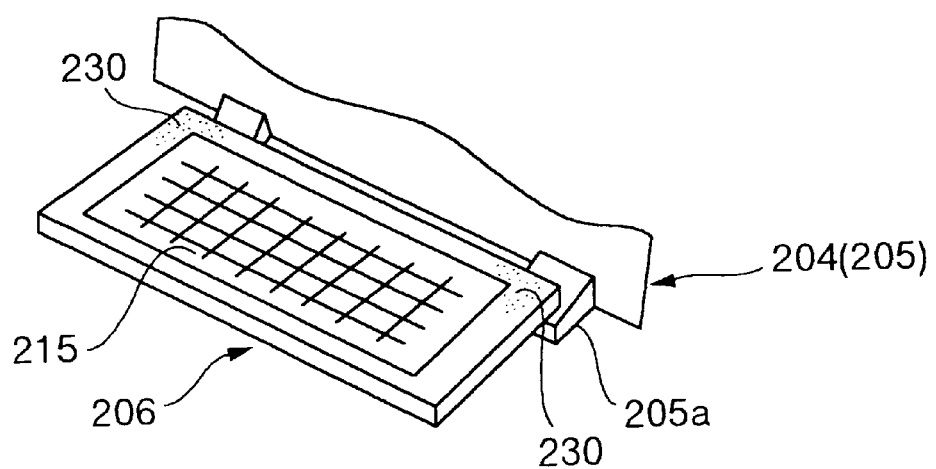
FIG. 38 is a partial perspective view seen from the front elevational side when the keyboard device is laid in front of the information processing apparatus according to the seventh embodiment of the present invention.

FIGS. 37 and 38 show the information processing apparatus according to a seventh embodiment of the present invention. FIG. 37 is a partial perspective view seen from the front elevational side when the keyboard device is leaned against the information processing apparatus of this embodiment. FIG. 38 is a partial perspective view seen from the front elevational side when the keyboard device is laid in front of the information processing apparatus of this embodiment.

This embodiment is a variation of the sixth embodiment. The difference between the seventh and sixth embodiments is that speakers 230, 230 are disposed on the left and right sides on the surface on which the key input portion 215 of the keyboard device 206 is disposed whereby the speakers 208, 208 on the body portion 204 (the casing 205) are eliminated.

In this embodiment of such an arrangement, the similar functional effect to the effect of the sixth embodiment is obtained. Whether the keyboard device 206 is leaned or laid, sound output portions of the speakers 230 are exposed. Thus, in any state, the sound output performance is not deteriorated. Since the speakers do not require to be disposed on the body portion 204, the width of the body portion 204 can be reduced.

The arrangements of the sixth and seventh embodiments are combined with each other. That is, the speakers 208, 208 are disposed on the left and right sides on the front surface of the body portion 204, and the speakers 230, 230 are disposed on the left and right sides on the surface on which the key input portion 215 of the keyboard device 206 is disposed. In this case, since four small-sized speakers are provided, a surround effect is obtained. This does not prevent a thin formation of the whole apparatus.

Figure 39:
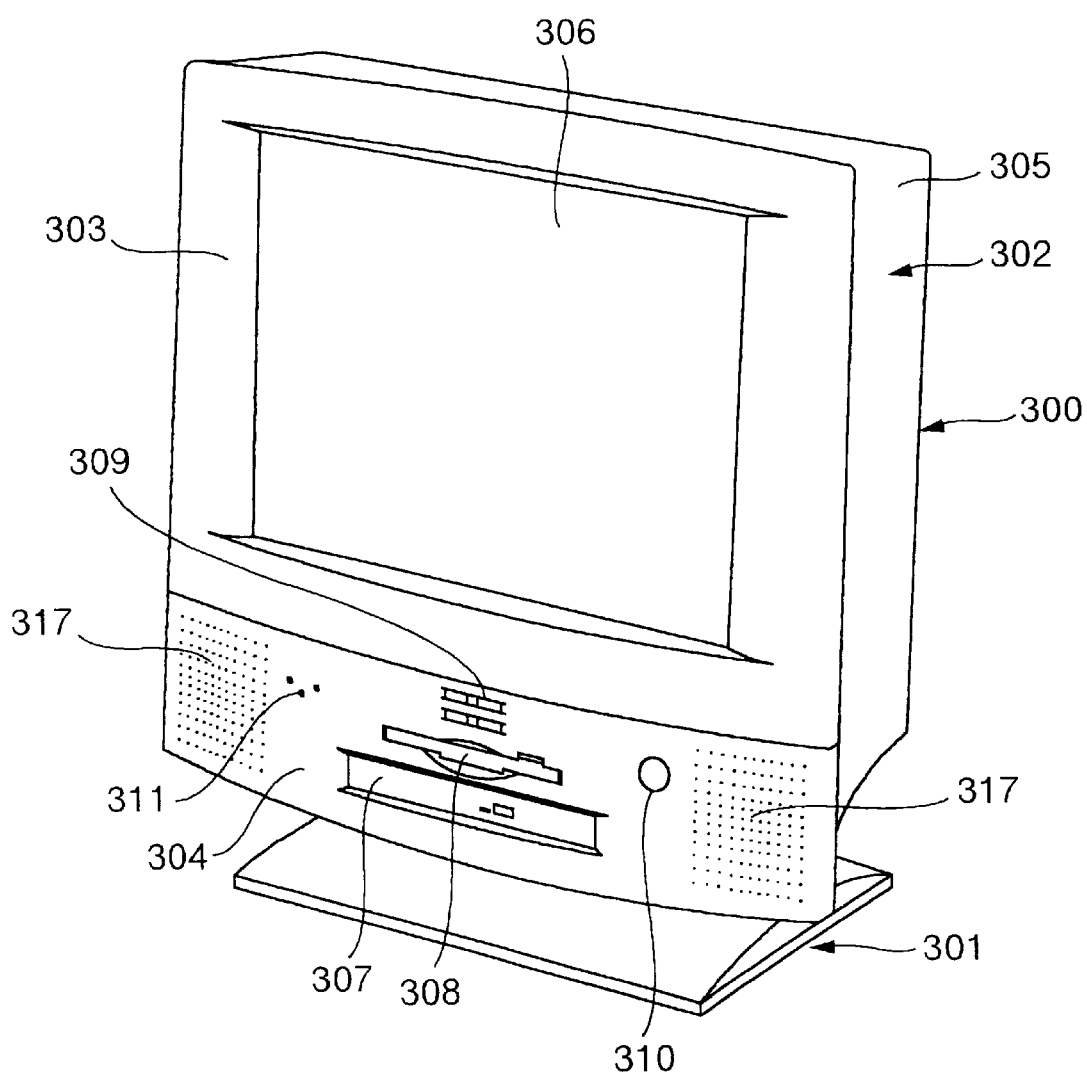
FIG. 39 is a perspective view of the information processing apparatus according to an eighth embodiment of the present invention seen from the front elevational side.
Figure 40:
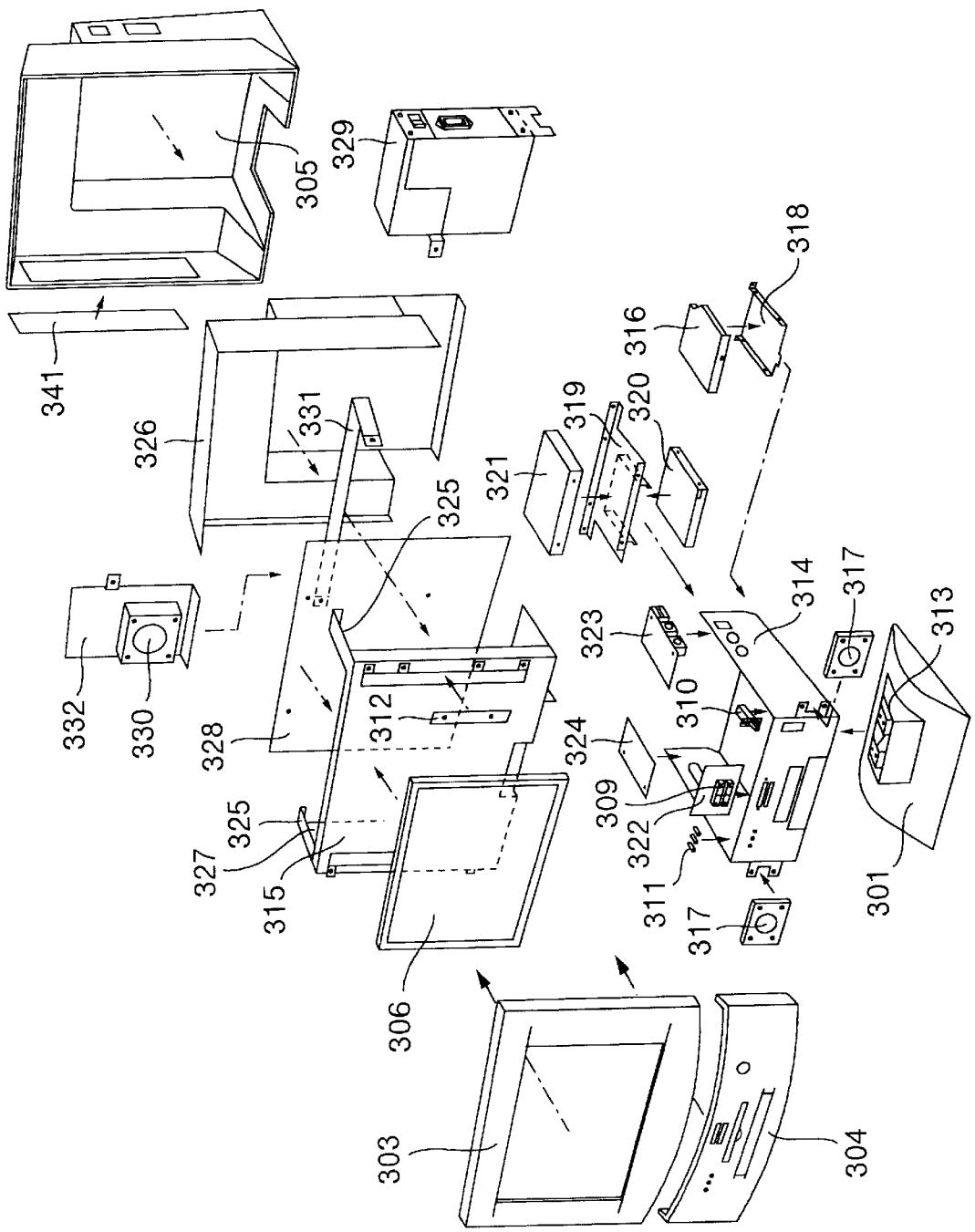
FIG. 40 is an illustration showing an arrangement of components of the information processing apparatus according to the eighth embodiment of the present invention.
Figure 41A:
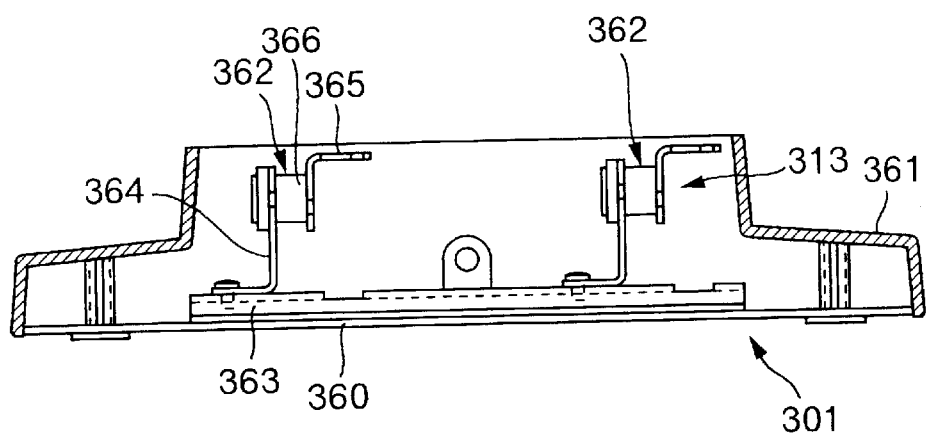
FIGS. 41A and 41B are cross sectional views of the stand portion of the information processing apparatus according to the eighth embodiment of the present invention.
Figure 41B:
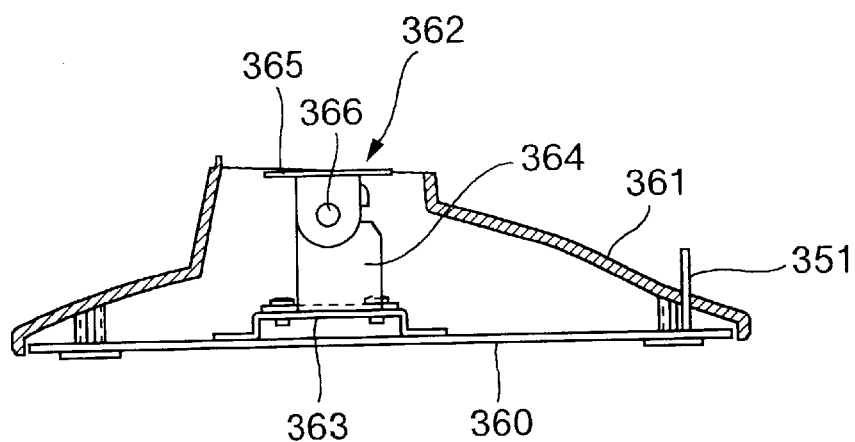
Figure 45:
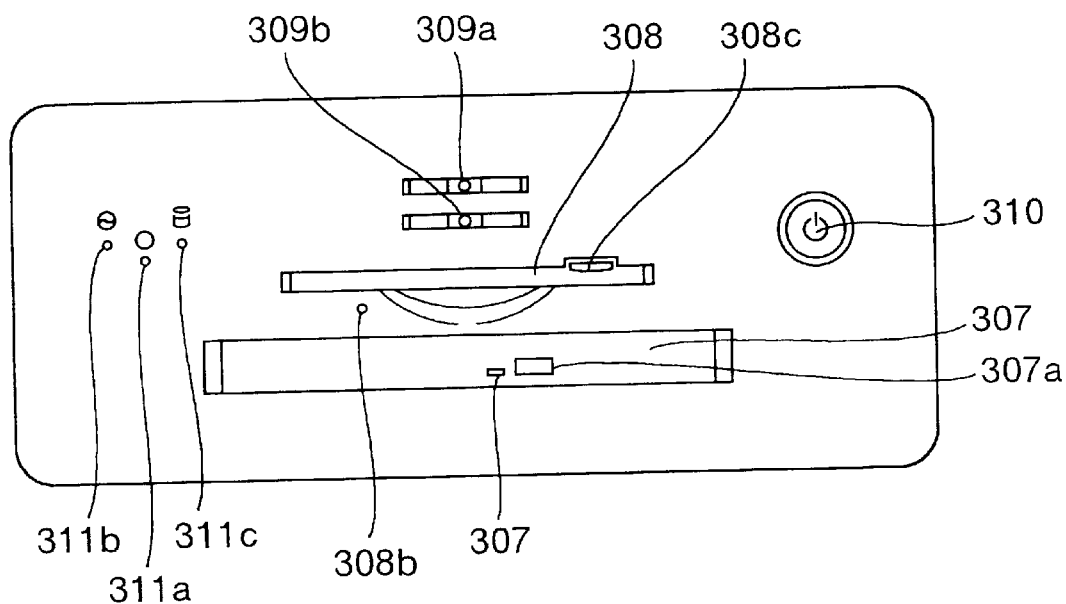
FIG. 45 is an enlarged view near a disk insert slot of the information processing apparatus according to the eighth embodiment of the present invention.
Figure 46A:
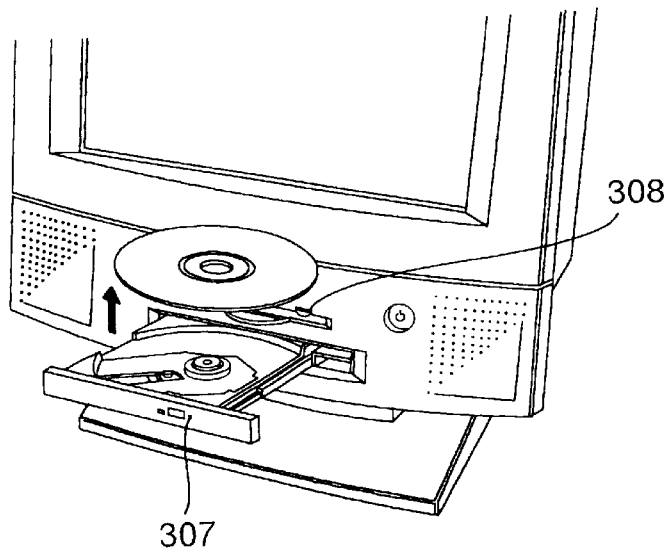
FIGS. 46A and 46B are partial enlarged perspective views of the information processing apparatus according to the eighth embodiment of the present invention with a disk inserted.
Figure 46B:
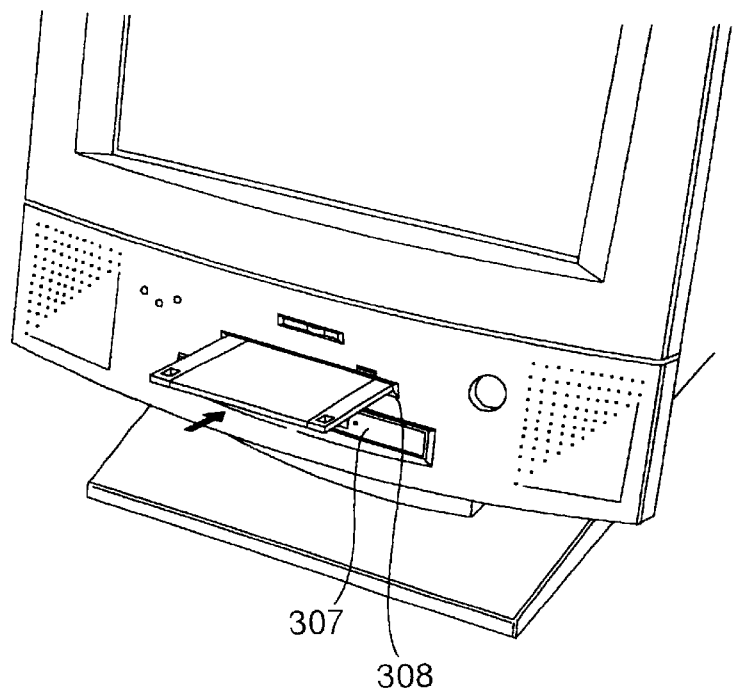
Figure 47:
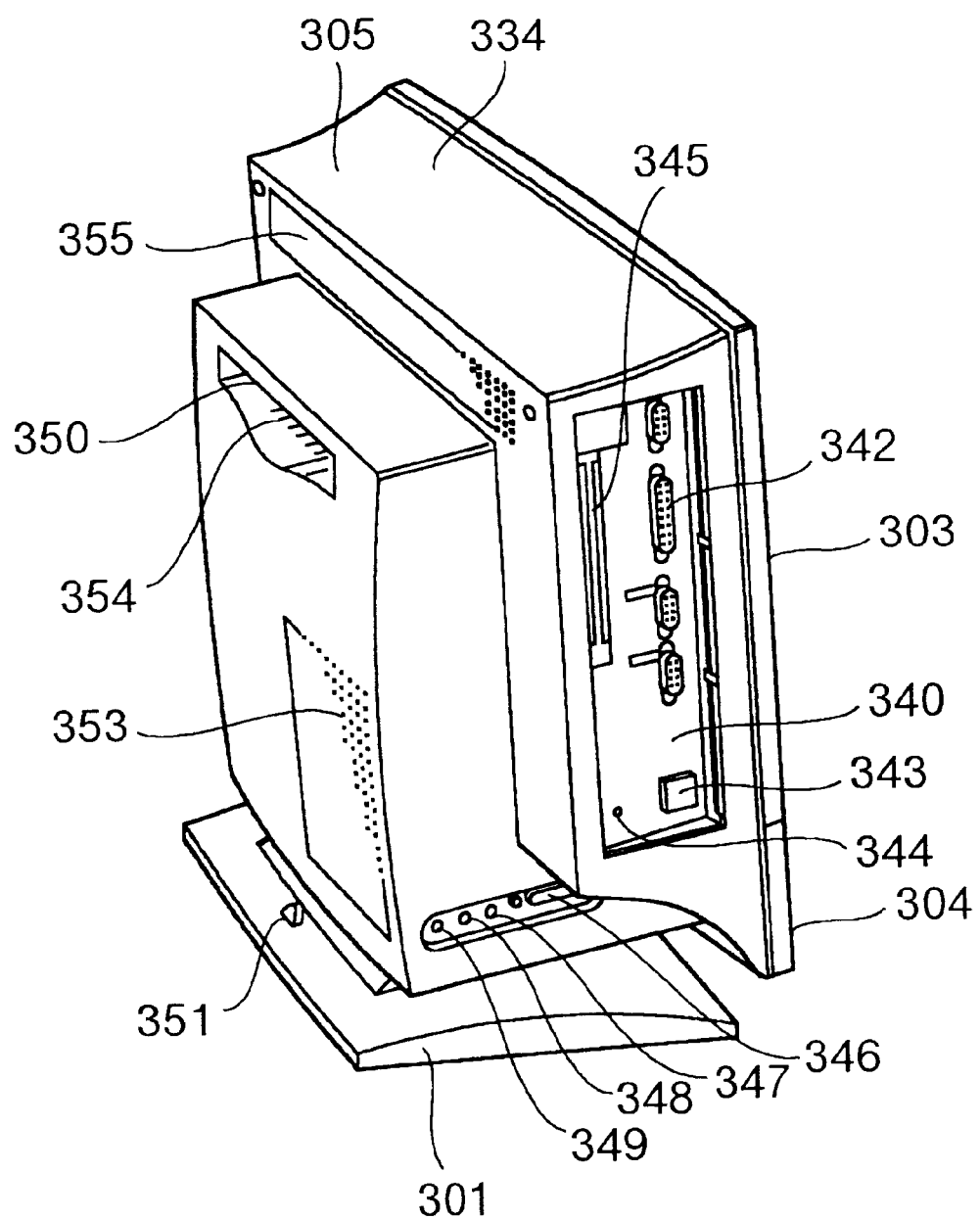
FIG. 47 is a rear perspective view showing the arrangement of the components of the information processing apparatus according to the eighth embodiment of the present invention.
Figure 48:
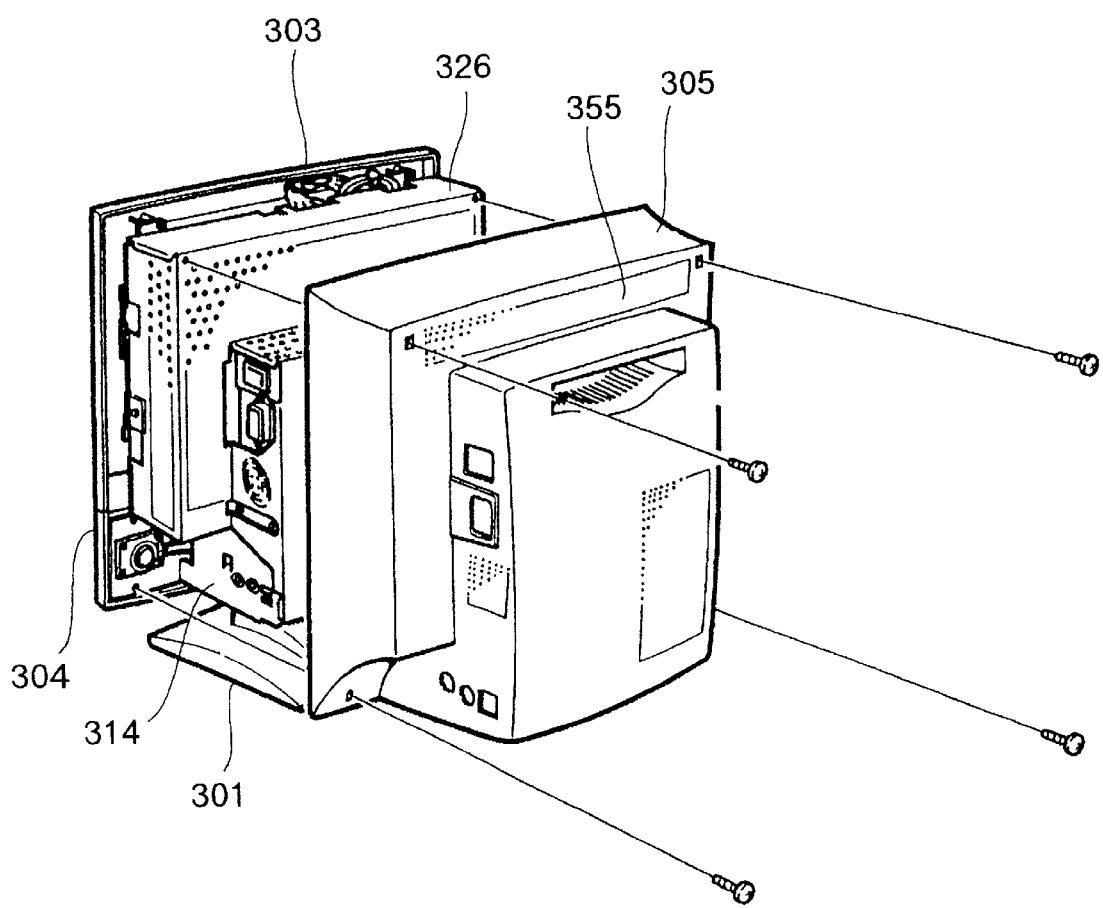
FIG. 48 is a rear perspective view showing the arrangement of the components of the information processing apparatus according to the eighth embodiment of the present invention.
Figure 49:
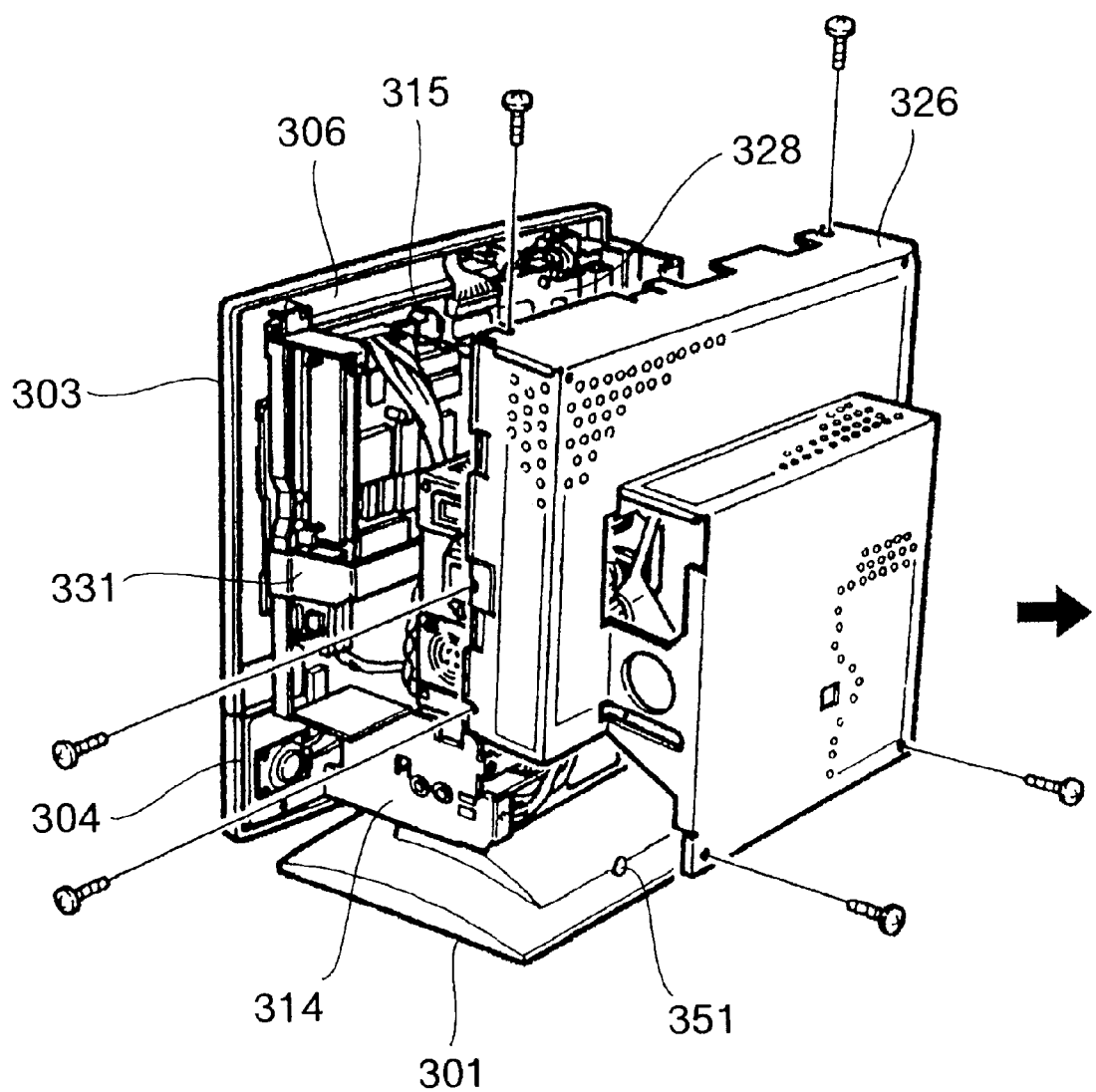
FIG. 49 is a rear perspective view showing the arrangement of the components of the information processing apparatus according to the eighth embodiment of the present invention.
Figure 50:
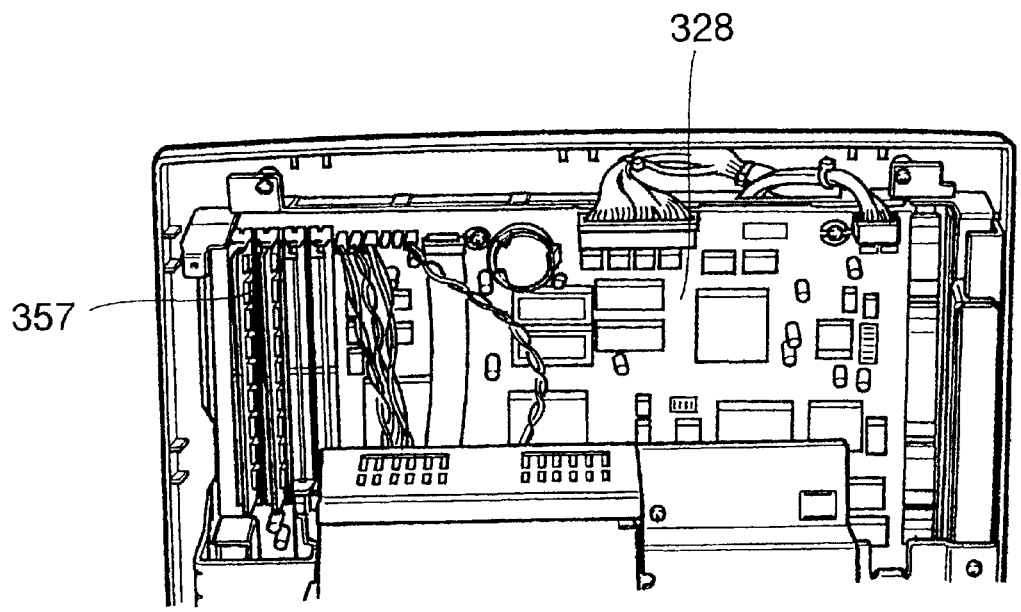
FIG. 50 is a partial enlarged view of an inner portion of the information processing apparatus according to the eighth embodiment of the present invention.
Figure 51:
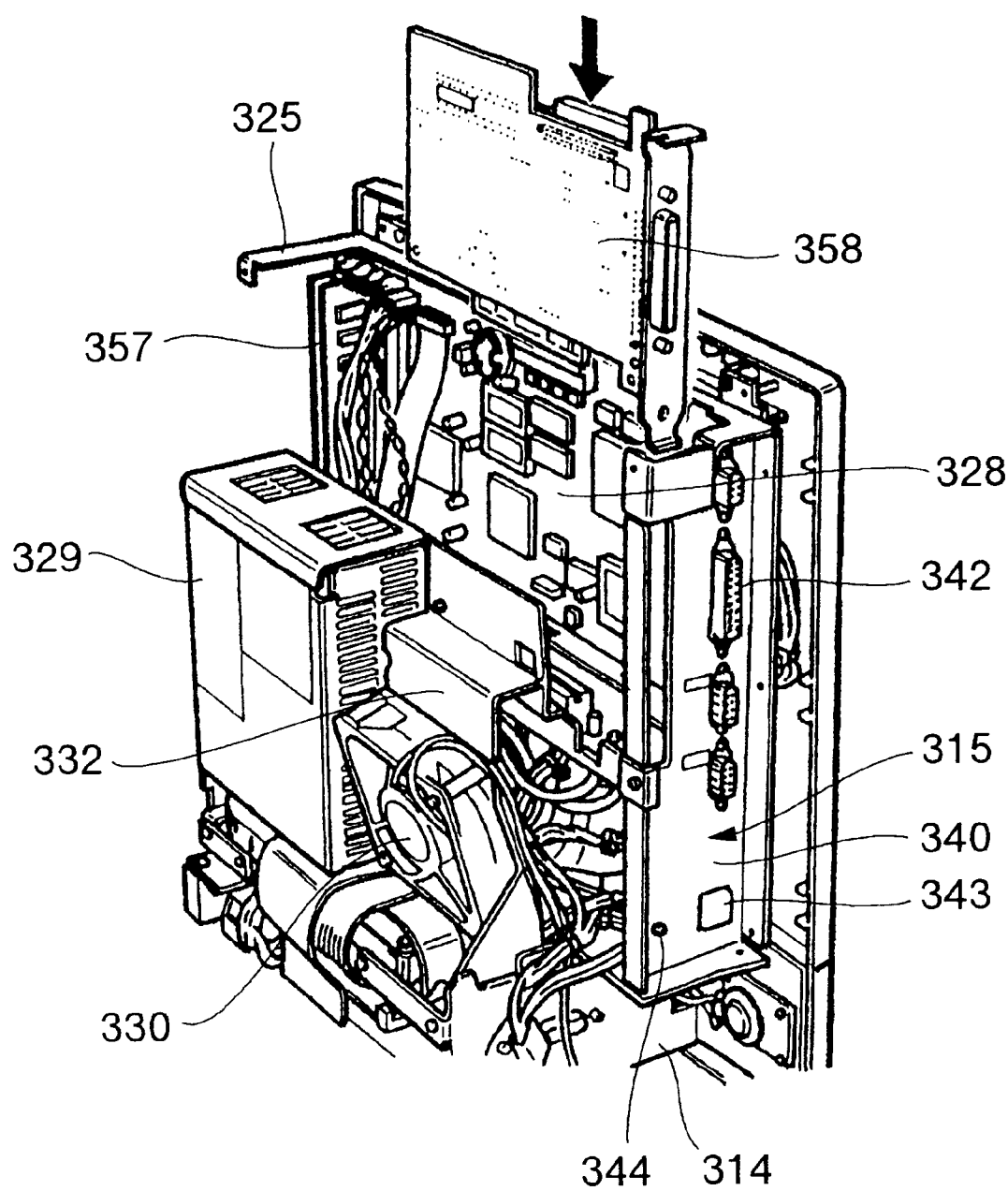
FIG. 51 is a rear perspective view showing an inner layout of the information processing apparatus according to the eighth embodiment of the present invention.

FIGS. 39–51 show the information processing apparatus according to an eighth embodiment of the present invention. FIG. 39 is a perspective view of the information processing apparatus of this embodiment seen from the front elevational side. FIG. 40 is an illustration showing the arrangement of components. FIGS. 41A and 41B are cross sectional views of the stand portion. FIGS. 42A–42D are external views when an outer cover of the body portion is removed. FIGS. 43A–43D are external views. FIGS. 44A–44D are external views when a large-sized liquid crystal display device is attached. FIG. 45 is an enlarged view near a disk insert slot. FIGS. 46A and 46B are partial enlarged perspective views when the disk is inserted. FIG. 47 is a rear perspective view. FIGS. 48 and 49 are rear perspective views showing the arrangement of the components. FIG. 50 is a partial enlarged view of an inner portion. FIG. 51 is a rear perspective view showing an inner layout.

In the information processing apparatus according to this embodiment, by making full use of thin and light characteristics of the liquid crystal display device, the whole information processing apparatus system including the display device can be thinned/compacted and have the excellent installation space properties. The ease of use is also improved. The apparatus can be also adapted for a series production with mass-production efficiency and various screen sizes of the liquid crystal display device.

In the first place, in FIG. 39, the information processing apparatus according to this embodiment comprises a body portion 300 whose outer box is covered with a casing 302 and a stand portion 301 for supporting the body portion 300. The casing 302 of the body portion 300 comprises a front surface upper cover 303, a front surface lower cover 304 and a rear cover 305. The cover 303 is resin-molded and thin for covering the upper portion of the front surface of the body portion 300. The cover 304 is resin-molded for covering the lower portion of the front surface. The cover 305 is resin-molded and has a small depth dimension for covering the rear portion of the body portion 300.

At the center of the front surface upper cover 303, a liquid crystal display device 306 is arranged. On the front surface lower cover 304, centralized are operating switches and various devices which are more frequently used. These switches and devices comprise disk eject/insert slots 307, 308 for the two disk drives horizontally arranged at vertical two stages; a volume switch 309 for adjusting the liquid crystal display device 306 arranged on the upper portion of the disk eject/insert slots 307, 308; a power source switch 310 and an LED 311 arranged on both the sides of the volume switch 309; and speakers 312 arranged on both the sides of the disk eject/insert slots 307, 308. The rear cover 305 incorporates therein various devices together with the thin front surface upper cover 303 and the front surface lower cover 304, whereby it constitutes the body portion 300 whose depth dimension is small. The stand portion 301 is connected to the body portion 300 through a tilt mechanism portion 313, whereby the body portion 300 is supported so that it can be forwardly/rearwardly tilted.

In such a manner, according to the information processing apparatus of this embodiment, the whole information processing apparatus system can be housed in the thin/compact body portion 300. The body portion 300 is stably supported so that it can be tilted. Thus, installation properties is excellent. The ease of use can be also improved. More specifically, in this embodiment, the front surface of the body portion 300 is divided into the front surface upper cover 303 and the front surface lower cover 304. The liquid crystal display device 306 is arranged on the front surface upper cover 303. Other devices and switches to be highly frequently used are arranged on the front surface lower cover 304. Thus, the front surface upper cover 303 is replaced, whereby it is possible to locate the liquid crystal display device 306 of a different screen size. Therefore, this permits the series production with various screen sizes without a great change in design. In addition, since the devices and switches to be highly frequently used are arranged on the front surface lower cover 304, a main operation can be performed with the least possible movement of user's eyes. By this operation, the operation can be performed without a loss of visibility of the liquid crystal display device 306.

Referring to FIGS. 40–51, the information processing apparatus according to this embodiment will be described below.

In the first place, the component arrangement of this embodiment will be described with reference to FIG. 40. In FIG. 40, in the information processing apparatus according to this embodiment, the outer cover thereof comprises the front surface upper cover 303, the front surface lower cover 304 and the rear cover 305 which constitute the body portion 300, and the stand portion 301.

The body portion 300 incorporates therein a horizontally arranged/box-shaped lower chassis 314 and a thin box-shaped upper chassis 315 vertically arranged on the front surface of the lower chassis 314. Various devices and the casing 302 for covering the body portion 300 are mounted to the two chassises 314, 315.

The lower chassis 314 is shaped so that it may be a horizontally arranged box whose upper and rear portions are opened and whose depth is greater. On the front wall surface and both the wall surfaces of the lower chassis 314, the disk eject/insert slots 307, 308 for disk drive devices and a plurality of openings for outward exposing the switches or various devices such as various connector are provided. In this embodiment, the height of the lower chassis 314 is substantially the same as that of the front surface lower cover 304. This increases stiffness on the lower portion of the body portion 300 requiring strength. The depth of the lower chassis 314 is set to a dimension capable of housing a CD-ROM disk drive 316 which is deepest. The horizontal width of the lower chassis 314 is also smaller than that of the front surface lower cover 304 by compactly arranging internal devices. Speakers 317 are arranged on outer front portion on both the wall surfaces of the lower chassis 314, whereby it is possible to accomplish an ease-to-use and compact layout of various devices and switches to be more frequently used and arranged on the front elevational surface. This also permits a compact shape of the rear cover 305 described below. In this embodiment, although the speakers 317 are separated from the lower chassis 314, for example, the front wall surface alone of the lower chassis 314 may be extended toward both the sides so as to thereby locate the speakers 317 on the front wall surface formed by this extension. This allows the number of components to be reduced and also allows assembly efficiency to be improved.

In the lower chassis 314, the CD-ROM disk drive 316 is mounted through a CD support member 318 so that it may be horizontally positioned. In the lower chassis 314, a floppy disk drive 320 and a hard disk drive 321 are also mounted through a HD-FD support member 319 so that they may be horizontally positioned. Furthermore, the volume switch 309 for adjusting the liquid crystal display device 306, the power source switch 310, an interface unit 323 and an audio substrate 324 are mounted in the lower chassis 314 through the LED 311 and an LCD-PK 322. The horizontal floppy disk drive 320 and the horizontal hard disk drive 321 are mounted on and under a plate member of the HD-FD support member 319, respectively, whereby the number of components are reduced and the assembly efficiency is also improved. Moreover, each of the three disk drives includes an individual box. Therefore, the support member is mounted to this box, whereby each disk drive is mounted in the lower chassis.

The upper chassis 315 is shaped so that it may be a thin box whose upper, right side and rear portions are opened and whose depth dimension is small. More specifically, the upper portion of the upper chassis 315 is provided with overhang portions 325 on both the sides so that the center may be opened. Shield metals 326 are mounted on rear ends on both the sides of the overhang portions 325. Thus, a heat generated inside is released upward and outside the device, while the housing space for the incorporated devices is ensured and the apparatus is all so lightened. The center of the right side is opened, whereby the apparatus is lightened. The side wall is provided on the left side, whereby various connectors and expansion board inserts described below are disposed on the side wall. The lower portion of the upper chassis 315 is provided with the wall surface on the outer side of the lower chassis 314 so that the upper chassis 315 may be stably supported on the lower chassis 314 and the vertical attitude may be fixed. The lower portion of the upper chassis 315 is also notched on the inner side so that the lower chassis 314 and the upper chassis 315 may form the continuous housing space. In such a manner, the upper chassis 315 is mounted to the lower chassis 314.

An inverter 312 for the liquid crystal display device is buried in the both sides of the front surface of the upper chassis 315. The liquid crystal display device 306 is also mounted adjacent to the upper chassis 315. In this embodiment, a space is provided between the liquid crystal display device 306 and the upper chassis 315. By the use of this space, a wiring is performed in the liquid crystal display device 306 and the internal devices. Therefore, according to the this embodiment, the liquid crystal display device 306 alone is mounted on the front surface of the upper chassis 315. The front surface upper cover 303 constituting the outer cover of the device 306 is independently constructed. Thus, even when the liquid crystal display device 306 is replaced by the liquid crystal display device 306 of other display size and different resolution or other thin display device, this has little influence on the layout, strength, wiring or the like of other device. Accordingly, the series production of various display devices can be accomplished only by changing this liquid crystal display device 306 and the front surface upper cover 303 covering the device 306 without the considerable change in design.

On the other hand, a mother board 328 is adjacently mounted inside the upper chassis 315. The mother board 328 is arranged so that various devices and connecting portions to be mounted to the mother board 328 may be mounted on the rear surface side of the apparatus. This allows the wiring or the like to be improved during a maintenance and an expansion. Behind the mother board 328, ensured is the housing space for housing an increased memory, the expansion board or the like in the upper chassis 315. Therefore, on the rear surface side of the mother board 328, it is possible to centralize various chips such as the CPU, the connector for the increased memory or the board for mounting the expansion board. This facilitates the maintenance.

On the rear lower portion of the upper chassis 315, a power source unit 329 and a fan 330 are mounted through an L-shaped support member 331 mounted to the upper chassis 315. The lower portion of the fan 330 mounted to the power source unit 329 and a fan support member 332 is mounted to the lower chassis 314. The upper portion of the fan 330 is mounted to the L-shaped support member 331. In such a manner, the upper chassis 315 and the lower chassis 314 are connected to each other, whereby the entire strength is improved.

The shield metals 326 are mounted to the upper chassis 315 and the lower chassis 314 so that the power source unit 329, the fan 330, the upper chassis 315 and the rear portion of the lower chassis 314 may be covered. This allows the entire strength to be increased, while a radio wave is shielded. In order to maintain the radio wave shield and to improve the heat release, the shield metals 326 are provided with a plurality of small holes whose size is set so as not to leak the radio wave outside the device. In this embodiment, although a diameter of the small hole is set to 6 mm, the similar effect can be obtained within the range of 4 to 7 mm in view of a heat release effect and a shield effect.

In this embodiment, the front surface upper cover 303, the front surface lower cover 304 and the rear cover 305 are mounted so that they may cover the internal devices mounted to the upper chassis 315 and the lower chassis 314. The stand portion 301 is protruded in a convex circular arc shape at the center on the upper surface seen from the side surface. At the center of the stand portion 301, provided is a protrusion which is box-shaped with the upper portion opened. The tilt mechanism portion 313 is disposed in the protrusion. The tilt mechanism portion 313 is mounted on the bottom surface of the lower chassis 314, whereby the body portion 300 is tightly supported on the stand portion 301. This will be described in further detail with reference to FIGS. 41A and 41B.

In FIGS. 41A and 41B, the stand portion 301 comprises a bottom plate 360, the tilt mechanism portion 313 and a stand cover 361. The bottom plate 360 constitutes the bottom surface of the stand portion 301 and is a strong member. The tilt mechanism portion 313 is mounted on the upper portion of the bottom plate 360. The stand cover 361 covers the upper portion of the stand portion 301 and is made of a resin material. FIG. 41A is a cross sectional view seen from the front elevational side. FIG. 41B is a cross sectional view seen from the right side. As shown in the drawings, the tilt mechanism portion 313 comprises a pair of mechanical portions 362 arranged on the left and right sides. Each of the mechanical portions 362 comprises a lower arm portion 364 mounted on the bottom plate 360 through a mounting plate 363, an upper arm portion 365 mounted on the lower chassis 314 and a connecting portion 366 having a spring member for connecting the lower arm portion 364 and the upper arm portion 365 so as to be tiltable. The stand cover 361 is opened at the center on the upper surface. The stand cover 361 is formed so that the periphery of this opening may be spread downward. The stand cover 361 is mounted on the bottom plate 360.

Figure 42A:
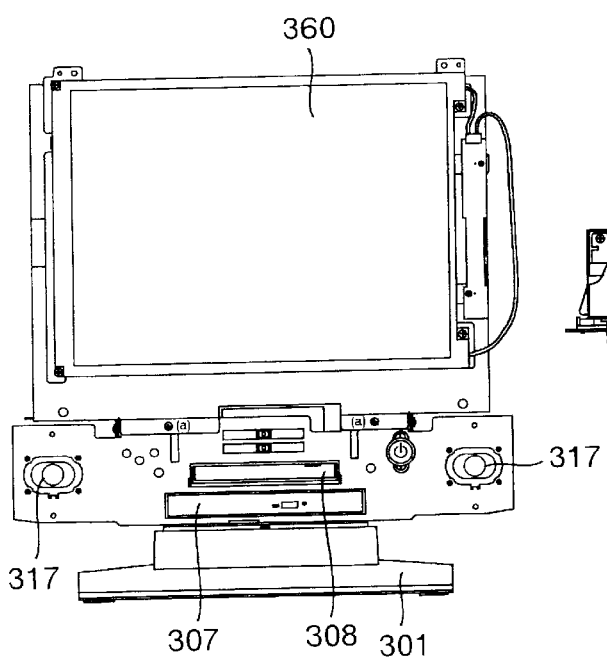
FIGS. 42A–42D are external views when an outer cover of the body portion of the information processing apparatus according to the eighth embodiment of the present invention is removed.
Figure 42B:
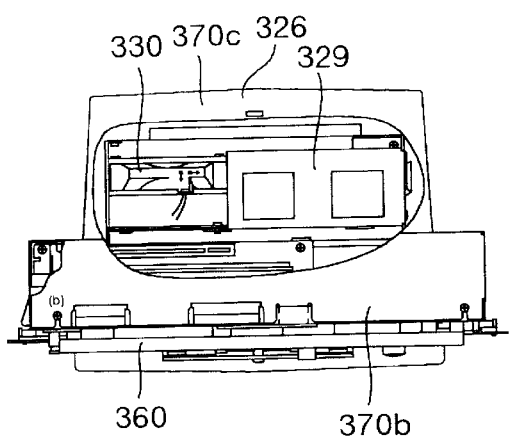
Figure 42C:
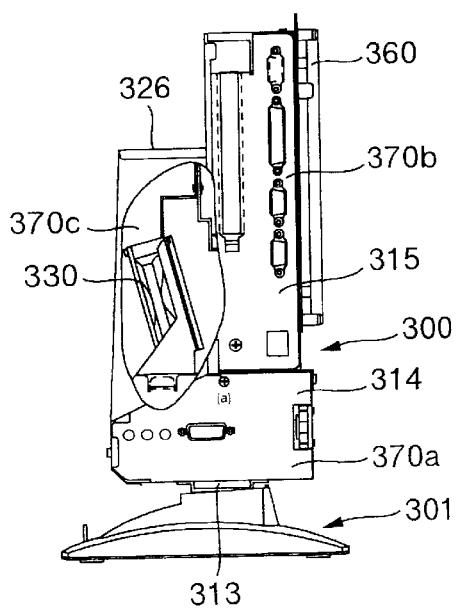
Figure 42D:
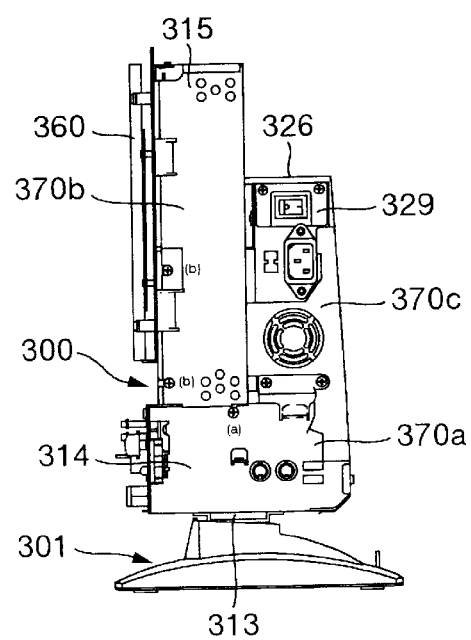

FIGS. 42A–42D are external views when the casing 302 comprising the front surface upper cover 303, the front surface lower cover 304 and the rear cover 305 constituting the outer box is removed. FIG. 42A is a front elevational view. FIG. 42B is a plan view. FIG. 42C is a left side view. FIG. 42D is a right side view. In the embodiment shown in FIGS. 42A–42D, shown is a structure in which the front surface wall of the lower chassis 314 is extended toward both the sides so that the speakers 317 may be mounted on the extended wall.

As can be seen from the drawings, in this embodiment, the internal devices in the body portion 300 are covered with the horizontal lower chassis 314 located on the lower portion of the body portion 300, the vertical upper chassis 315 located on the front portion on the upper surface of the lower chassis 314 and the shield cover 326 covering the rear portion including a partial side surface of the lower chassis 314 and the upper chassis 315. This can prevent the radio wave from leaking outward. The entire strength is also improved.

Furthermore, in this embodiment, the shield cover 326 is formed so that the rear lower portion thereof may be overhung rearward, whereby the device housing space is provided. In this housing space, the power source unit 329 and the fan 330 are arranged so that they may be vertically located. That is, in this embodiment, a device housing space 370 in the body portion 300 comprises a first device housing space 370a oblongly formed by the lower chassis 314, a second device housing space 370b lengthwise formed by the upper chassis 315 and a third device housing space 370c lengthwise formed by the shield cover 326. The liquid crystal display device 306 alone is located in front of the second device housing space 370b. The horizontal devices such as the disk drives are located in the first device housing space 370a. The large mother board 328 associated with the liquid crystal display device 306 and the devices associated with this mother board 328 are vertically located in the second device housing space 370b. The power source unit 329 and the fan 330 are vertically located in the third device housing space 370c.

Thus, in this embodiment, without enlarging the device size, the disk eject/insert slots 307, 308 can be located on the lower portion on the front surface of the body portion 300 which is most easily handled by the user and has excellent operability. The liquid crystal display device 306 can be also arranged on the upper portion of the body portion 300. Therefore, the devices required by the user can be centralized on the front side of the body portion 300. Moreover, the second device housing space 370b is arranged in parallel to the liquid crystal display device 306, whereby the thin formation can be accomplished, a wire can be shortened and excellent exhaust can be performed by a chimney effect. The first device housing space 370a and the third device housing space 370c are formed so that the horizontal width and the height thereof may be smaller those of the second device housing space 370b. The first and third device housing spaces 370a, 370c are also arranged at the center. Thus, the rear portion of the body portion 300 can be formed smaller than the front portion thereof. Therefore, the rear portion of the body portion is hidden by the rear portion, whereby this can give the user an impression that the device is thinner.

Since the body portion 300 is supported on the stand portion 301 by connecting the lower chassis 314 supporting the body portion 300 on the lower portion thereof and the tilt mechanism portion 313, the strength of the whole device can be improved. Furthermore, since the disk drive housed in the lower chassis 314 is horizontally arranged near the tilt mechanism portion 313, the stable performance of the disk drive can be also expected.

Arranged are the lower chassis 314 horizontally located on the lower portion of the disk drive, the upper chassis 315 vertically located on the front portion on the upper surface of the lower chassis 314 and the power source unit 329 and the fan 330 vertically located on the rear portion on the upper surface of the lower chassis 314.

As described above, in this embodiment, the strong member comprises the deeper/horizontal/box-shaped lower chassis 314 and the shallower/vertical upper chassis 315. Thus, the whole strength can be improved. The internal devices are mounted in the two chassises 314, 315 and the shield cover 326, whereby the whole device can be compacted. The vertically-positioned liquid crystal display device 306 and mother board 328 are mounted in the upper chassis 315, whereby the upper portion of the body portion 300 is thinned. The three horizontally-positioned disk drives 316, 320, 321 are housed in the lower chassis 314, whereby the height is lowered and thus the depth is reduced. This permits a compact layout arrangement whose lower portion is stable. More specifically, in this embodiment, there is provided the stand portion 301 for tiltably supporting the body portion 300. Thus, the horizontal arrangement based lower chassis 314 is arranged near the tilt mechanism portion 313. The upper chassis 315 is vertically separated from the tilt mechanism portion 313. This allows the device to be stabilized and also allows the tilt mechanism portion 313 to be miniaturized. Furthermore, in this embodiment, the longer/vertical upper chassis 315 is arranged in front of the connecting portion of the lower chassis 314 to the tilt mechanism portion 313. The shorter/vertical power source unit 329 and fan 330 are arranged at the back of the connecting portion. The tilt mechanism portion 313 can be thereby arranged in the position near a center of gravity of the device. A balance of weight is improved, whereby a further miniaturization of the tilt mechanism portion 313 is achieved. As a result, the whole device is thinned and miniaturized.

An external appearance of this embodiment will be described below with reference to FIGS. 43A–47. In FIGS. 43A–43D, as can be seen from the right side view of FIG. 43B, the external appearance of the body portion 300 comprises a rear casing 333 accommodated and formed in a projected area of the lower chassis 314 (see FIG. 40) mounted on the stand portion 301 and a front casing 334 formed on the front surface of the rear casing 333 and extruded from the rear casing 333 toward both the sides and upward. The front casing 334 is formed so that an upper surface 334a, both sides 334b and both lower surfaces 334c may be tapered rearward. A draft is thus maintained during a manufacturing of the rear cover 305. It is also difficult for the user to find the rear cover 305. Accordingly, the user can have the impression that the whole device is thinner. As shown in FIG. 43C, the width of the rear portion of the body portion 300 is smaller than that of the front portion.

Therefore, when the device is installed at the corner of a partition, a dead space is reduced, whereby installation properties can be improved. In this embodiment, since various connectors are disposed on both the side surfaces of the rear casing 333 whose width is smaller, the cords connected to the connectors are hidden from the height of user's eyes by the front casing 334. The appearance is therefore improved during the installation. It is also possible to reduce a visual noise (a line and a figure around the screen coming into a visual angle of the user) troubling the user looking at the screen.

In this embodiment, the body portion 300 is shaped so that it may be spread on the lower portion and be gradually thinner on the upper portion, whether it is seen from the front elevational or side surfaces. More specifically, in the front elevational view of FIG. 43A, the width of the lower portion is larger than that of the upper portion. A front circular arc on the lower portion on the front surface constituting the front surface is also larger than the front circular arc on the upper portion. Thus, the user gets the impression that the whole device is stable. The effect of visual correction can be also expected on the upper portion near the height of eyes and the lower portion apart from the height of eyes. The front circular arc on the lower portion on the front surface is enlarged, whereby the stereo effect of the speakers 317 arranged on both the sides is improved. It is also possible to improve visibility and operability of the eject slots 307, 308 and the switches located on the center extruded portion or the display portion. In the side view of FIG. 43B, the rear portion of the rear casing 333 is formed so that it may be upward thinned in large circular arc shape. In this embodiment, the body portion 300 can be forward tilted at 5° and rearward tilted at 15° with respect to a surface perpendicular to an installed surface. Therefore, in this embodiment, even when the body portion 300 is rearwardly tilted, a rearward overhang of a rear upper end 333a of the rear casing 333 is reduced. Thus, the depth space can be reduced during the installation. More specifically, in this embodiment, the body portion 300 is inclined backward, while the rear upper end 333a of the rear casing 333 is accommodated in the projected area of the overhang of the rear portion of the stand portion 301. Thus, even when a rear end 301a of the stand portion 301 is installed so that it may be pressed against the partition or the like during the installation, the body portion 300 can be rearward tilted at 15° as described above. The above-mentioned arrangement also allows stability to be ensured during the installation.

In this embodiment, as described above, since the speakers 312 are mounted on the front portion on both the sides of the lower chassis 314, the rear portion of the lower end 334c of the front casing 334 can be greatly cut off. Thus, the thin appearance of the whole device can be improved. A large space is ensured around input/output connectors separately located on both the sides on the lower portion of the rear casing 333. Therefore, since a work space for connecting various connectors is ensured, maintainability is improved. In addition, since the cut portion of the rear portion of the lower end 334c is thinly formed on the lower portion on the both the sides of the body portion 300, the device and the left and right installed surfaces of the speakers 317 can be held by hands from the front surface of the device. Accordingly, the device can be easily moved on a desk without, for example, changing the left and right angles of the device or the user's getting up from a chair.

FIGS. 44A–44D are external views when the liquid crystal display device 306 is replaced by the large-sized display device. In this embodiment, a liquid crystal display device 306*a,* a front surface upper cover 303*a* covering the device 306*a* and a rear surface cover 303*b* of the front surface upper cover 303*a* alone are changed. In the embodiment shown in FIGS. 43A–43D, the front surface is formed by a continuous circular arc surface and both the sides are linearly formed, whereby the device looks like small size as an integrated form. In the embodiment shown in FIGS. 44A–44D, both the sides and the upper portion of the front surface upper cover 303*a* are overhung, and the front portion thereof is daringly overhung more forward than the front surface of the front surface lower cover 304. Thus, since the whole device looks like a deeper one, the enlargement of the device size due to an adoption of the large-sized liquid crystal display device 306*a* is suppressed. Moreover, the user has the impression that the display size is large and the device is compact.

In FIG. 45, at the center on the lower side of the liquid crystal display 306, the disk eject/insert slot 308 for the floppy disk drive 320 incorporated in the body portion 300 is horizontally arranged. On the lower side of the disk eject/insert slot 308, the disk eject/insert slot 307 for the CD-ROM disk drive 316 incorporated in the body portion 300 is arranged. On the left and right sides of the two disk eject/insert slots 307, 308, the speakers 312 are arranged so that the stereo sound can be output.

On the upper portion of the disk eject/insert slot 308 for the floppy disk drive 320, a volume switch 309*a* for adjusting a contrast of the liquid crystal display device 306 and a volume switch 309*b* for adjusting a brightness are arranged. On both the sides of the switches, the power source switch 310 and the LED 311 are arranged. On the front surface of the disk eject/insert slot 307, a CD-ROM eject button 307*a* and an access lamp 307*b* are disposed. Near the disk eject/insert slot 308, a floppy disk eject button 308*a* and an access lamp 309*b* are disposed. Thus, the user does not search for the switches. The operation is easily confirmed. Furthermore, a power source lamp 311*b* and a hard disk access lamp 311*c* located on both the sides of a main power source lamp 311*a* are shifted upward from the main power source lamp 311*a* located at the center. Therefore, a mistake of one lamp for other lamp is reduced, whereby visibility is excellent.

Thus, the next shorter disk eject/insert slot 308 is disposed at the position higher than the disk eject/insert slot 307 for the large CD-ROM disk drive 316. Shorter volume switches 309 are also disposed at the position higher than the disk eject/insert slot 308. By such a generally triangular arrangement, the appearance looks like the stable arrangement. The power source switch 310 and the LED 311 are arranged by the use of the space on both the sides at the position higher than the triangular arrangement, whereby the arrangement having excellent packaging efficiency is obtained.

FIG. 46A shows the use of the horizontally arranged CD-ROM disk drive 316. FIG. 46B shows the use of the floppy disk drive 320. As can be seen from the drawing, when the largest CD-ROM disk drive 316 is used, the whole operating devices including the upper small floppy disk drive 320 are recognized while the operation can be performed. In this embodiment, the CD-ROM disk drive 316 is located at the position higher than the height of the keyboard located near the front portion of the information apparatus. Therefore, during the eject/insertion of the disk, since a tray to be forward projected is not interfered by the keyboard, the eject/insertion of the disk is not interfered. More specifically, in this embodiment, the body portion 300 is arranged on the upper portion of the stand portion 301 so that it can be tilted.

Thus, the position of the tray can be set at the higher position, compared to the prior art in which the display device is tiltably arranged on the body portion. Of course, in the prior art, the tray can be positioned at the higher position. However, since other devices are located lower than the higher-positioned tray in order to miniaturize the whole device, the ease of use of other devices and the change in design are considerably influenced. In this embodiment, the tray is also disposed on the tiltable body portion 300. Therefore, even when the higher keyboard is used, the tilt angle is increased whereby the keyboard can be used in front of the body portion 300. In this embodiment, both of the liquid crystal display device 306 and the disk eject/insert slots 307, 308 can be also tilted at the same angle correspondingly to the height of user's eyes.

In this embodiment, when the 13.3-inch liquid crystal display device 306 is adopted, the information processing apparatus is set so that the total height may be 399 mm, the length may be 385 mm and the depth may be 190 mm. The height is set to 59 mm from the installed surface to the lower end of the disk eject slot 307 (the tray). The height is set to 85 mm from the installed surface to the lower end of the disk eject slot 308.

When the floppy disk drive 320 is operated, the presence of the large CD-ROM disk drive 316 is recognized and other operating devices are recognized while the operation can be performed. In such a manner, in this embodiment, the two disk drives 316, 320 are arranged adjacent to each other at vertical two stages at an appropriate height. Thus, without extending the horizontal dimension of the whole device, the total length of the device can be suppressed. In addition, the drive for the small-sized disk is arranged on the upper portion, and the drive for the large-sized disk is arranged on the lower portion. Therefore, the apparatus can be constructed so that it may have excellent handling properties without difficulty in handling during the insertion/removal of the disk.

According to the above-mentioned arrangement, the most associated volume switches 309, LED 311 and power source switch 310 are arranged near the liquid crystal display device 306 which the user most carefully gazes at. Therefore, the positions of these switches are clearly recognized whereby operability can be improved. Since the switches are also arranged near the lower portion of the liquid crystal display device 306, the hand operating the switches does not interfere the visual angle of the liquid crystal display device 306. In the same manner, since the switches are arranged upper than the two disk drives 316 and 320, this arrangement reduces a possibility that the switches are out of sight due to the operation of these disk drives. More specifically, in this embodiment, the LED 311 to be more frequently used are disposed on the left side of the disk eject/insert slot 308, and the power source switch 310 to be less frequently used is disposed on the right side. This reduces a possibility that the LED 311 to be more frequently used are out of sight by the right hand in case of the operation by the right hand.

In such a manner, according to this embodiment, when the device is placed on a table, the liquid crystal display device 306 requiring visibility is arranged on the upper portion of the front surface in front of the height of user's eyes. The disk eject/insert slot 307 for the CD-ROM disk drive 316 to be excellently seen from the higher position is arranged on the lower portion on the front surface. The shorter disk eject/insert slot 308 for the floppy disk drive 320 and the various switches to be more frequently used are arranged between the liquid crystal display device 306 and the disk eject/insert slot 307. The speakers 312 requiring to be separated on the left and right sides for the stereo effect are arranged on both the sides on the lower portion on the front surface. In such a manner, in this embodiment, the various switches and devices to be more frequently used are arranged at the center on the front surface. Thus, the least possible movement of user's eyes can be achieved. For example, unlike the prior art, it is not necessary to feel for the switch located on the side surface. Therefore, operability can be improved. Furthermore, the switches, the devices or the like are efficiently arranged on the optimum positions in view of the frequency of use, the size or the function. Accordingly, it is possible to further improve operability and to promote the miniaturization of the whole device.

Figure 43A:
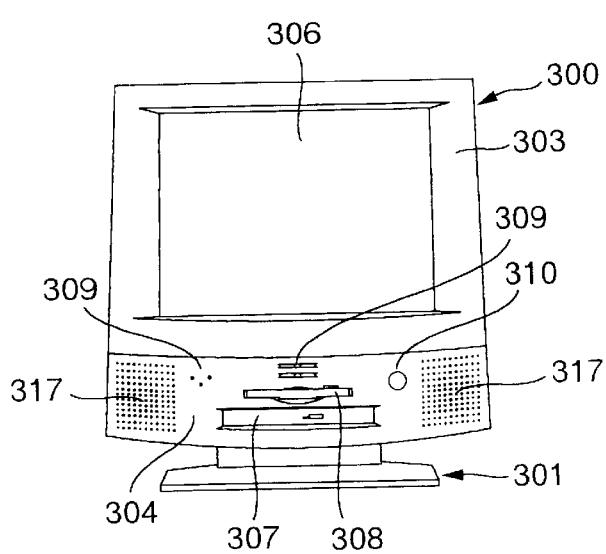
FIGS. 43A–43D are external views of the information processing apparatus according to the eighth embodiment of the present invention.
Figure 43B:
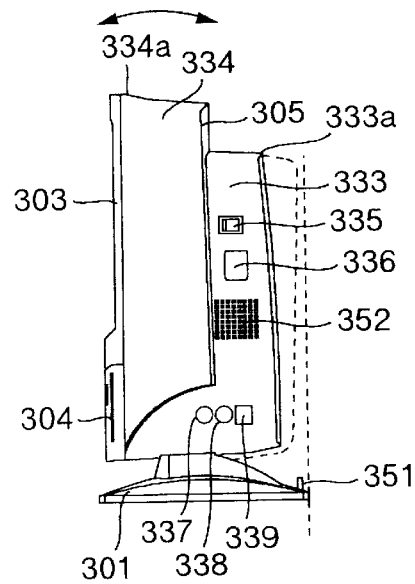
Figure 43C:
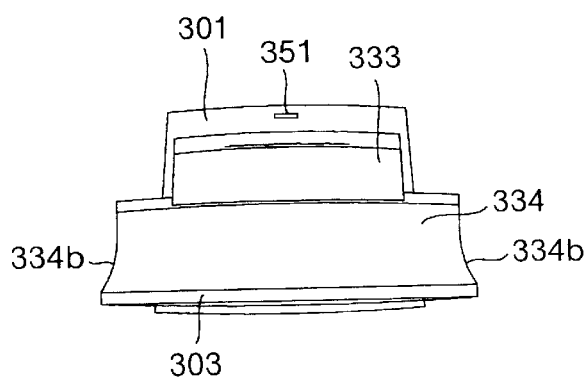
Figure 43D:
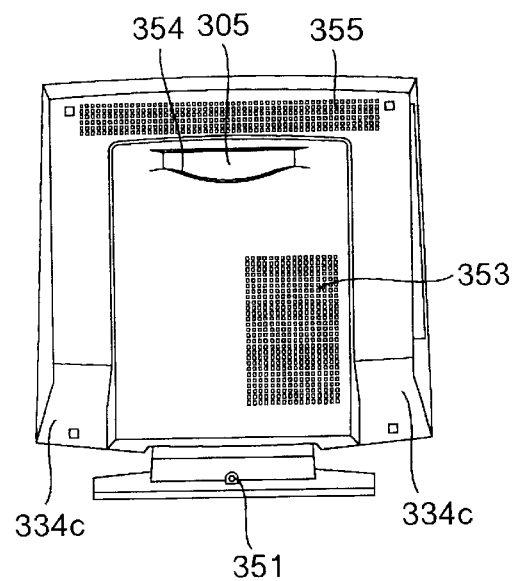
Figure 44A:
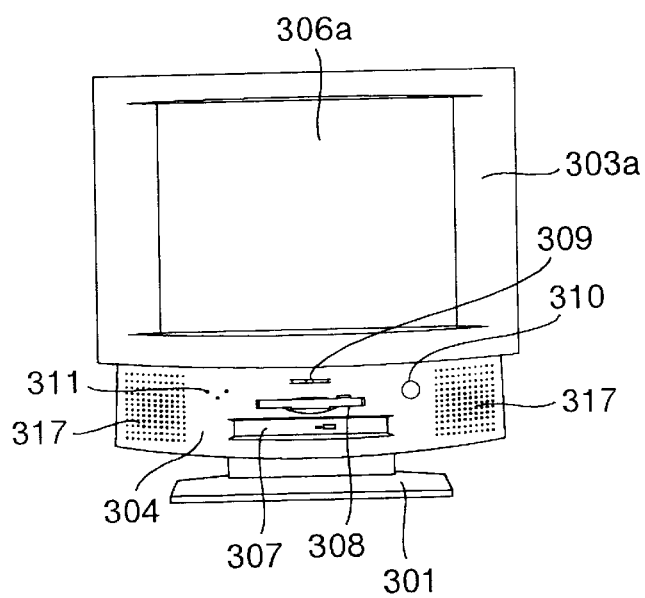
FIGS. 44A–44D are external views when a large-sized liquid crystal display device of the information processing apparatus according to the eighth embodiment of the present invention is attached.
Figure 44B:
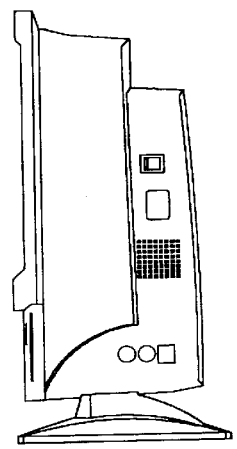
Figure 44C:
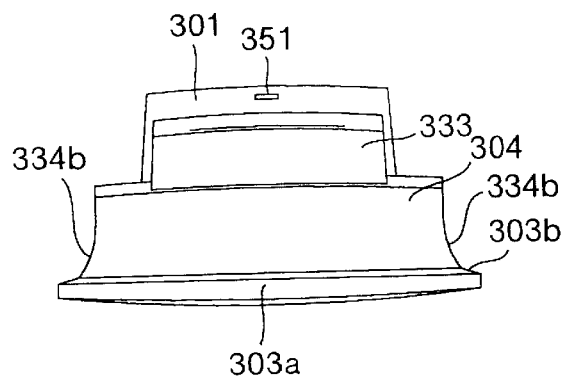
Figure 44D:
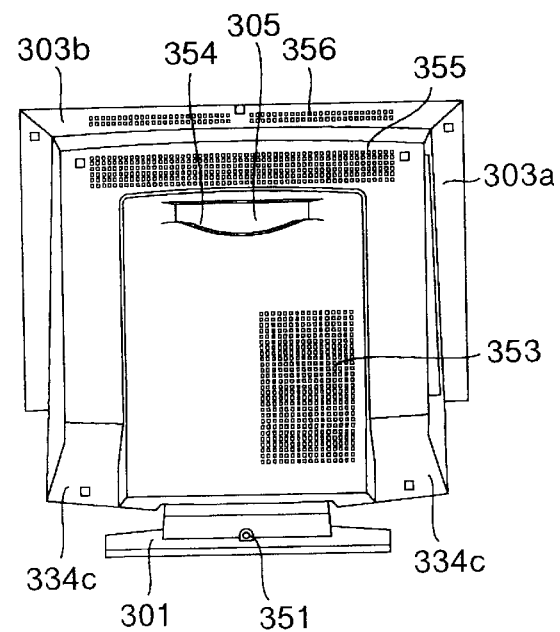

In FIG. 43B, on the upper portion on the right side surface of the rear casing 333, a main power source switch 335 and a power source connector 336 are arranged adjacent to each other. On the lower portion on the right side surface, the connectors for input/output devices to be relatively frequently used such as a keyboard interface connector 337, a mouse interface connector 338 and a USB interface connector 339 are arranged. The main power source switch 335 is arranged on the difficult-to-operate rear casing 333 so as to thereby prevent the power source from being turned off due to an erroneous operation. The power source connector 336 is arranged on the side surface of the rear casing 333, whereby, during an attachment of an AC cable to the connector 336, the depth thereof can be smaller than that of the connector arranged on the rear surface. Thus, when the device is placed on the table, the wider work space can be ensured in front of the device. Moreover, in this embodiment, the side surface of the rear casing 333 is difficult to see due to the front casing 334. Thus, since the wires are not less seen by the user, an installation environment can be improved. The connectors to be more frequently used are arranged on the right side surface, whereby the right hand operation is enhanced.

In FIG. 47, on the left side surface of the front casing 334, arranged is an openable/closable and removable cover 341 (see FIG. 40) for covering a connector portion 340 to be connected to the external equipment, the expansion board or the like. The connector portion 340 is provided with, for example, a printer interface connector 342, a LAN interface connector 343, an FG terminal 344 and an expansion slot 345. Therefore, the attachment/removal of connectors can be facilitated, compared to the connector portion 340 arranged on the rear surface. On the lower portion on the left side surface of the rear casing 333, arranged are a GAME/MIDI interface connector 346, a line output connector 347, a line input connector 348 and a microphone connector 349 to be less frequently used.

Referring to the back side views of FIGS. 47 and 43C, in this embodiment, the device is thinly formed in a depth direction. At the center on the upper portion on the rear surface of the rear casing 333, a concave grip portion 350 is thus provided. In the conventional information processing apparatus, the grip portions are disposed on both the sides of the body, whereby the body is generally carried by both the hands. According to this embodiment, the body can be carried by one hand. That is, according to this embodiment, the grip portion 350 is held by one hand, whereby the body portion 300 can be supported and carried between the hand and the body of a carrier. In such a manner, the body can be carried while the front surface having the most damage-prone liquid crystal display device 306 is protected by the body of the user. Moreover, since the body can be held by one hand, the associated devices such as the keyboard can be carried by the other hand.

Referring to FIGS. 43B and 43C, in this embodiment, an earthquake-measure/antitheft fixing portion 351 is disposed at the center on the rear portion of the stand portion. This fixing portion 351 can fix the stand portion 301 which is most difficult to see for the user and requires the most to fix. In this embodiment, as shown in FIG. 43B, one part of the bottom plate 360, which constitutes the bottom surface of the stand portion 301 and is made of the strong member, is cut and stood, whereby the fixing portion 351 is formed as a protrusion with the opening. A chain, a padlock or the like is allowed to pass through the opening so that the stand portion 301 can be fixed. The present invention is not limited to this example. The fixing portion 351 has only to be capable of fixing the stand portion 301 to the installed equipment.

Next, the exhaust of this embodiment will be described with reference to FIGS. 40 and 43A–43D. This embodiment comprises three fans, that is, a fan (not shown) mounted in the power source unit 329, a fan (not shown) mounted in the CPU and the fan 330. Thus, the heat generated by the internal devices in the body portion 300 is exhausted.

The fan mounted in the power source unit 329 exhausts the heat from a heat exhaust vent 352 disposed on the right side surface of the rear casing 333 adjacent to the fan. At this time, since a plurality of intake vents are disposed in the box of the power source unit 329 as shown in FIG. 51, the heat in the power source unit 329 is exhausted while the heat in the devices around the unit 329 is also exhausted at the same time. The fan 330 exhausts the heat by the use of the rear surface of the rear casing 333 adjacent to the fan 330, the inside of the concave grip portion 350 located on the upper portion of the rear casing 333 (see FIGS. 47 and 48) and vents 353, 354, 355 disposed on the rear surface side of the overhang portion located on the upper portion of the front casing 334. As shown in FIG. 42C, the fan thinner than the power source unit 329 is used as the fan 330. The fan 330 is inclined within the range of the depth of the power source unit 329. Thus, without enlarging the size of the body portion, it is possible to improve a heat exhaust effect of the three disk drives located on the lower chassis 314. In this embodiment, an outer air is taken in from the vent 353 disposed on the rear surface of the rear casing 333, and the heat is discharged from the other two vents 354 and 355. The heat may be exhausted via the reverse route. When the large-sized liquid crystal display device 306a shown in FIGS. 44A–44D is employed, a vent 356 is also disposed on the rear surface cover 303b of the upward extruded front surface upper cover 303a.

In such a manner, in this embodiment, the fan 330 is disposed on the lower portion of the body portion 300, whereby the balance of weight is improved. The vents are disposed on a box surface near the fan and on the upper portion of the body portion 300 (on the upper portion of each stage when stages are provided), whereby the heat exhaust effect is improved. Furthermore, the vents are disposed on a vertical surface near the upper end of the body portion 300 and on the difficult-to-see grip portion 350, whereby a deposit of dusts can be reduced, cleanability can be improved and an entrance of external contaminant from the upper portion can be reduced.

Referring to FIGS. 48–51, the maintainability and assembly efficiency will be described below. In this embodiment, as shown in FIG. 48, screws are removed at four corners, whereby the rear cover 305 can be removed from the shield metal 326 and the front surface lower cover. Next, as shown in FIG. 49, a plurality of screws are removed, whereby the exposed shield metal 326 is removed from the upper chassis 315 and the lower chassis 314. The internal devices are then exposed so that various maintenance can be performed.

For example, as shown in FIG. 50, the removal of the shield metal allows the mother board 328 to be exposed. Thus, the increased memory can be mounted to a memory board socket 357 mounted on the mother board 328. As shown in FIG. 51, when the expansion board 358 is mounted, the expansion board 358 is inserted from the upper portion by the use of the connector portion 340 which is the wall surface of the upper chassis 315, whereby the expansion board 358 can be easily attached.

In such a manner, according to this embodiment, the rear cover 305 of the body portion 300 and the shield metal 326 are only removed, whereby the mother board 328 can be exposed. Therefore, the expansion memory and the expansion board can be easily mounted. Moreover, in this case, without laying the whole device, the mounting operation can be performed with the device installed. Thus, the wide work space is not required. Furthermore, since the mother board 328 is located at the high position near the height of worker's eyes, the worker is not forced to take an unnatural attitude (for example, to stoop and look down the device) but can perform a work.

In this embodiment, although the floppy disk drive and the CD-ROM disk drive are adopted, the present invention is not limited to this example.

As described above, according to the present invention, by making full use of thin and light characteristics of the liquid crystal display device, the whole information processing apparatus system including the display device can be thinned/compacted and have the excellent installation space properties, whereby the ease of use can be improved. This is extremely valuable.

What is claimed is:

1. An information processing apparatus comprising:
    a body casing having a thin shape in a depth direction and having a front surface;
    a disk drive device having a horizontally long disk insert slot on said front surface, having a disk drive casing longer in a depth direction, and having a disk memory reading mechanism in said disk drive casing; and
    a liquid crystal display arranged in a vertical direction and being thin in said depth direction,
    wherein said disk insert slot is located on a front surface side of said body casing on a lower portion of said body casing, and said disk drive device is arranged so that the depth direction of said disk drive casing may be directed in the depth direction of said body casing, and
    said liquid crystal display is vertically arranged in said body casing so that a front surface of said liquid crystal display may be located over said disk drive device and on the front surface side of said body casing, and
    a support device is disposed under said body casing, and said body casing is movably mounted on said support device.

2. The information processing apparatus according to claim 1, wherein a second disk drive device is further arranged on the lower portion of said body casing,
    said second disk drive device has the horizontally long disk insert slot on the front surface, a second disk drive casing longer in the depth direction and the disk memory reading mechanism in said disk drive casing, and
    said second disk drive device is arranged so that said disk insert slot may be located on the front surface side of said body casing and the depth direction of said disk drive casing may be directed in the depth direction of said body casing, and the insert slot of said second disk drive is located in parallel to the insert slot of said first disk drive and is horizontally located on the front surface side of said body casing.

3. The information processing apparatus according to claim 2, wherein
    the insert slot of said first disk drive is opened,
    said second disk drive device has a tray for ejecting/inserting a disk memory, and
    said first disk drive device is arranged on said second disk drive device.

4. An information processing apparatus comprising:
    a body casing having a thin shape in a depth direction and having a front surface;
    a disk drive device having a horizontally long disk insert slot on said front surface, having a disk drive casing longer in a depth direction, and having a disk memory reading mechanism in said disk drive casing;
    a liquid crystal display arranged in a vertical direction and being thin in said depth direction;
    a front chassis vertically arranged; and
    a lower chassis connected to a lower portion of said front chassis perpendicularly to said front chassis,
    wherein said front chassis is vertically arranged on a front surface side in said body casing, and said lower chassis is arranged in said body casing in a direction toward a deeper portion from said front chassis,
    said disk drive device is arranged on the lower portion of said front chassis in said body casing so that said disk insert slot may be located on the front surface side of said body casing and the depth direction of said disk drive casing may be directed in the depth direction of said body casing, and
    said liquid crystal display is arranged over said disk drive device and between an inner side of the front surface side of said body casing and said front chassis.

5. The information processing apparatus according to claim 4, wherein
    said front chassis and said lower chassis have a bent side, and said front chassis and said lower chassis are connected to each other in L shape seen from a side surface.

6. The information processing apparatus according to claim 5, wherein
    said lower chassis has an oblong first housing space formed by the bent side,
    said front chassis has a lengthwise second device housing space formed by the bent side, and
    said disk device is arranged in said first device housing space.

7. The information processing apparatus according to claim 6, wherein
    a plurality of transversally laid disk devices are vertically arranged in said first device housing space, and
    a main board is arranged in parallel to said liquid crystal display in said second device housing space.

8. An information processing apparatus comprising:
    a body casing having a thin shape in a depth direction and having a front surface;
    a disk drive device having a horizontally long disk insert slot on said front surface, having a disk drive casing longer in a depth direction, and having a disk memory reading mechanism in said disk drive casing;

a liquid crystal display arranged in a vertical direction and being thin in a depth direction;

a main board having a semiconductor circuit for processing information, wherein said disk drive device is arranged on a lower portion of said body casing so that said disk insert slot may be located on a front surface side of said body casing and the depth direction of said disk drive casing may be directed in the depth direction of said body casing, said liquid crystal display is vertically arranged in said body casing so that a front surface of said liquid crystal display may be located over said disk drive device and on the front surface side of said body casing, said main board is arranged in parallel to said liquid crystal display in said body casing and further behind said liquid crystal display; and a stand for supporting said body casing, wherein the lower portion of said body casing is movably mounted on said stand portion through a connecting portion.

9. The information processing apparatus according to claim 8, wherein said body casing has a rear case for opening a back side thereof, and said rear case is removably mounted.

10. The information processing apparatus according to claim 8, wherein said main board has a semiconductor chip on one surface thereof and a wiring surface on the other surface thereof, and said main board is arranged so that said wiring surface may be located opposite to said liquid crystal display.

11. An information processing apparatus comprising:

a chassis including a front chassis and a lower chassis, said front chassis being vertically arranged, and said lower chassis being connected to a lower portion of said front chassis and being transversally arranged;

a disk drive device having a horizontally long disk insert slot on a front surface, having a disk drive casing longer in a depth direction, and having a disk memory reading mechanism in said disk drive casing; and a liquid crystal display arranged in a vertical direction and being thin in said depth direction, wherein said front chassis is vertically arranged on a front surface side, and said lower chassis is arranged on the lower portion of said front chassis in a direction toward a deeper portion from said front chassis, said disk drive device is arranged on the lower portion of said chassis so that said disk insert slot may be located on a front surface side and the depth direction of said disk drive casing may be directed in the depth direction of said body casing, said liquid crystal display is mounted on said front chassis over said disk drive device, a front surface upper case is mounted on said chassis to cover a front surface of said liquid crystal display, and a front surface lower case is fixed on said chassis under said front surface upper case to cover the front surface of said disk drive device.

12. The information processing apparatus according to claim 11, wherein said chassis is supported by the stand portion movably mounted to the lower portion of said chassis through the connecting portion.

13. An information processing apparatus comprising a drive device and a liquid crystal display device in a body casing, wherein an internal device housing space is provided in said body casing by a front chassis, a lower chassis and a shield panel, said front chassis being made of a conductive material located on the front portion of said body casing, said lower chassis being made of the conductive material located on the lower portion of said body casing, and said shield panel being made of the conductive material for covering said lower chassis and the rear portion of said front chassis, and said liquid crystal display device is arranged on the front portion of said front chassis, and said disk device, said main board and said power source unit are arranged in said internal device housing space.

14. An information processing apparatus comprising a drive device and a liquid crystal display device in a body casing, wherein said body casing includes a front chassis, a lower chassis and a shield panel, said front chassis being made of the conductive material located on the front portion of said body casing, said lower chassis being made of the conductive material located on the lower portion of said body casing, and said shield panel being made of the conductive material for covering said lower chassis and the rear portion of said front chassis, said lower chassis has an oblong first housing space formed by the bent side, said front chassis has a lengthwise second device housing space formed by the bent side, said shield panel has a lengthwise third housing space on an upper position of said lower chassis and on a rear position of said front chassis, and said liquid crystal display device is arranged on the front portion of said front chassis, said disk device is arranged in said first housing space, said main board is arranged in said second housing space, and said power source unit is arranged in said third housing space.

15. An information processing apparatus comprising:

a body casing having a thin shape in a depth direction;

a liquid crystal display arranged in a vertical direction and being thin in said depth direction;

a front chassis vertically arranged; and a main board having a semiconductor circuit for processing information, wherein said front chassis is vertically arranged on a front surface side of said body casing, said liquid crystal display is arranged between an inner side of the front surface side of said body casing and said front chassis, said main board is provided at a back of said front chassis so that said main board is arranged between the inner side of a back side of said body casing and said front chassis, said liquid crystal display and said main board are mounted with a space therebetween in said front chassis, and wherein said body casing has a rear case for opening the back side thereof, and said rear case is removably mounted.

16. An information processing apparatus comprising a main board and a liquid crystal display device in a body casing, wherein said body casing has a casing structure being thin in a depth direction and a chassis vertically arranged in an inner front side of the body casing, said liquid crystal display device is mounted to said chassis and disposed on a front surface of said body casing, said main board is mounted to said chassis and is arranged in parallel to said display device at a rear of said chassis, and said body casing includes, on one side surface thereof, an input/output terminal portion having an input/output terminal mounted on said main board.

17. An information processing apparatus comprising a main board and a liquid crystal display device in a body casing, wherein said body casing has a casing structure being thin in a depth direction and a chassis vertically arranged in an inner front side of the body casing, said chassis constitutes a front surface of a receiving space provided with said main board, said liquid crystal display device is mounted to said chassis and is disposed on the front surface of said body casing, said main board is mounted to said chassis and is arranged in parallel to said display device at a rear of said chassis, and said body casing includes, on one side surface thereof, an input/output terminal portion constituting one side surface of said receiving space.

18. An information processing apparatus comprising:

a body casing having a liquid crystal display device on a front surface thereof; and a stand portion for supporting said body casing, wherein said body casing has a casing structure being thin in a depth direction and has a chassis vertically arranged in an inner front side of the body casing, said liquid crystal display device is mounted to said chassis and is disposed on the front surface of said body casing, said main board is mounted to said chassis and is arranged in parallel to said display device at a rear of said chassis, and said body casing includes, on one side surface thereof, an input/output terminal portion having an input/output terminal mounted on said main board.

19. An information processing apparatus comprising:

a body casing having a liquid crystal display device on a front surface thereof; and a stand portion for supporting said body casing, wherein said body casing has a casing structure being thin in a depth direction and has a chassis vertically arranged in an inner front side of the body casing, said liquid crystal display device is mounted to said chassis and is disposed on the front surface of said body casing, said main board is mounted to said chassis and is arranged in parallel to said display device at a rear of said chassis, and said body casing includes, on one side surface thereof, an input/output terminal portion constituting one side surface of said receiving space.

* * * * *